July 4, 1961

E. HEDENSKOOG ET AL 2,991,078

COMPLETELY AUTOMATIC PIN SETTING AND BALL
RETURN MECHANISM FOR BOWLING ALLEY

Filed Aug. 4, 1953

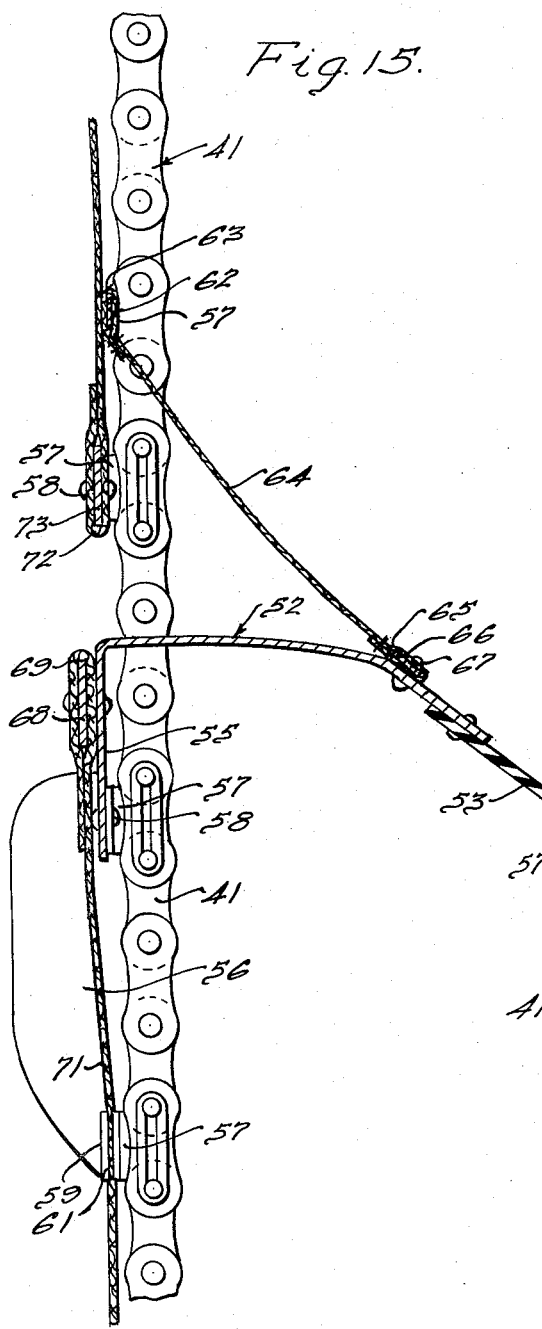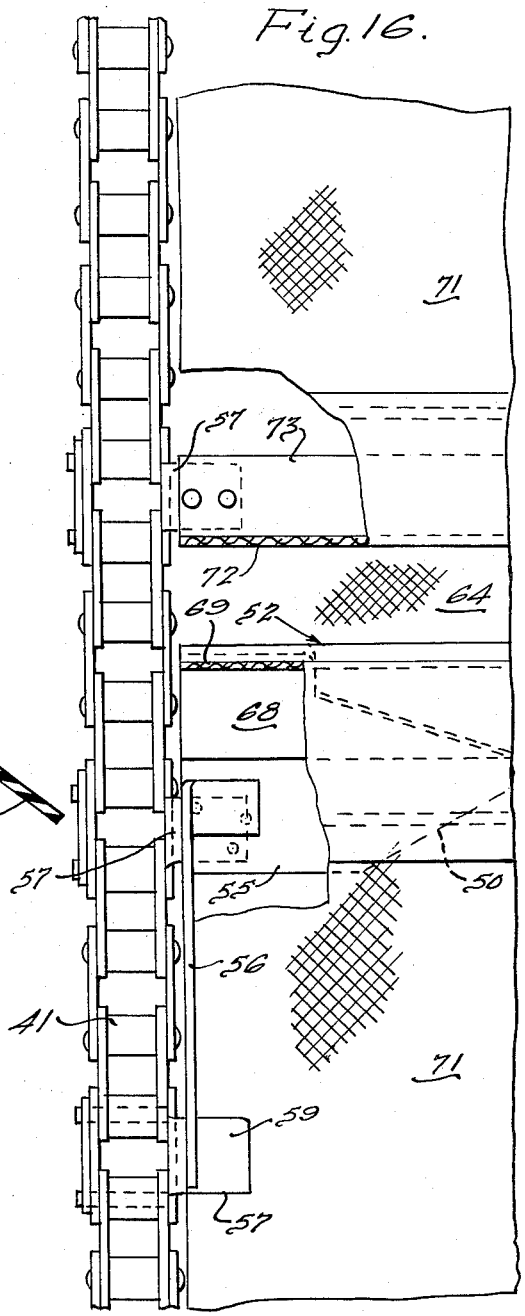

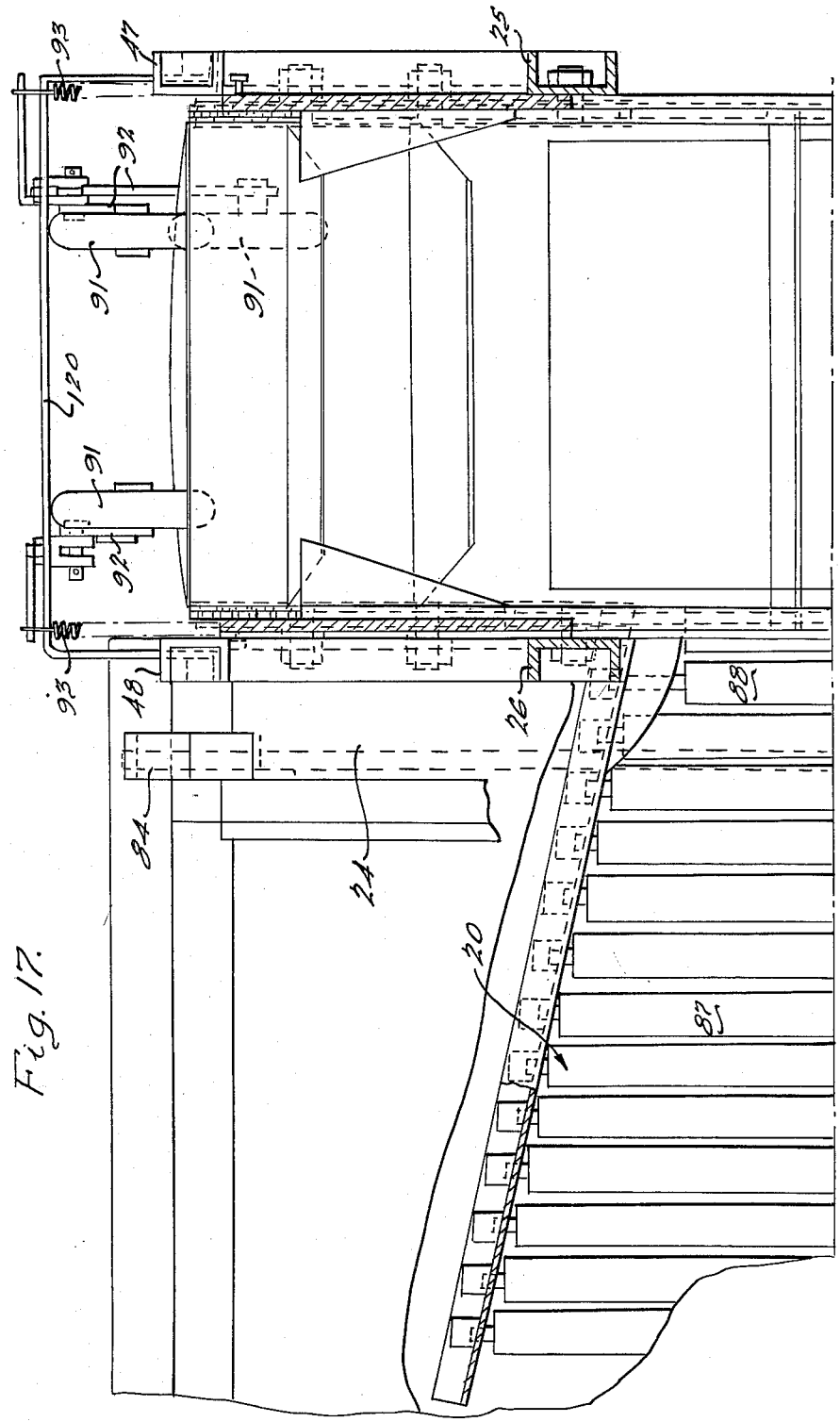

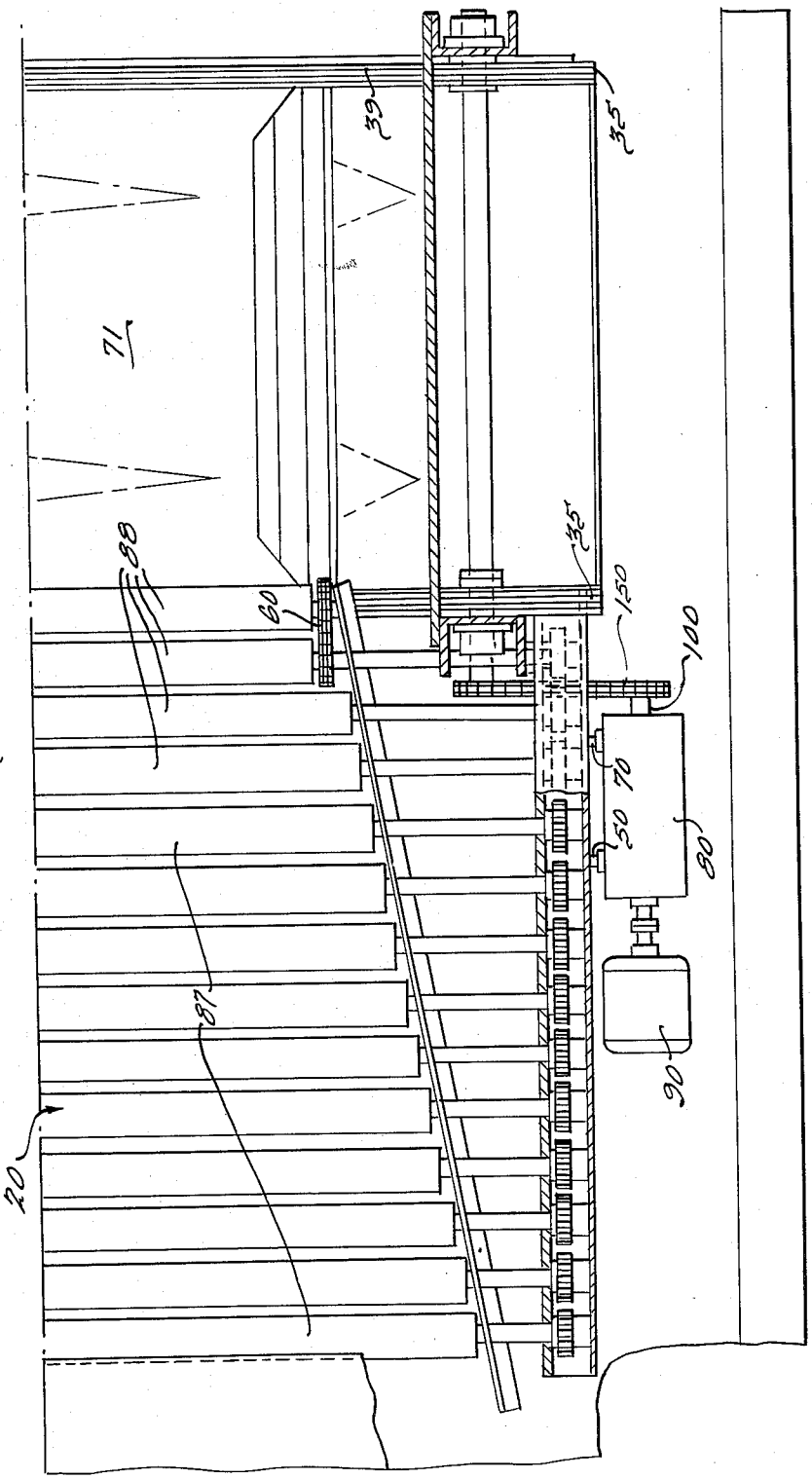

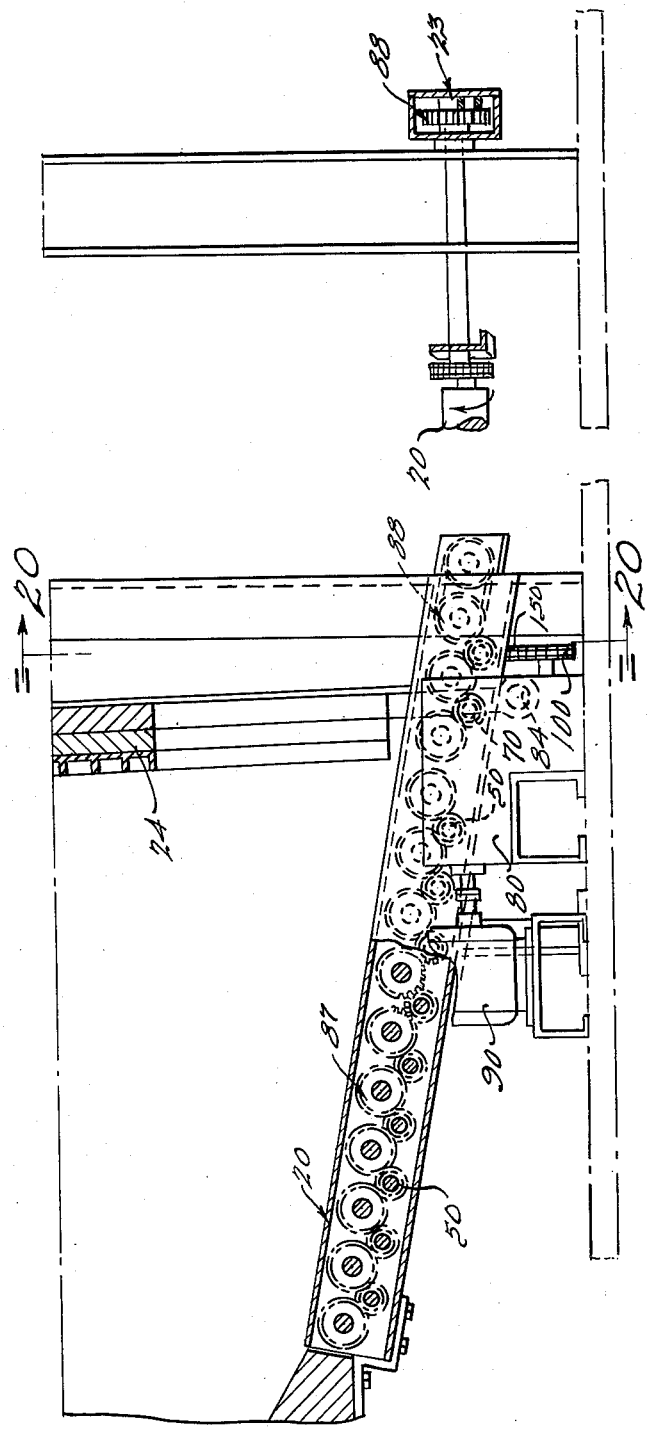

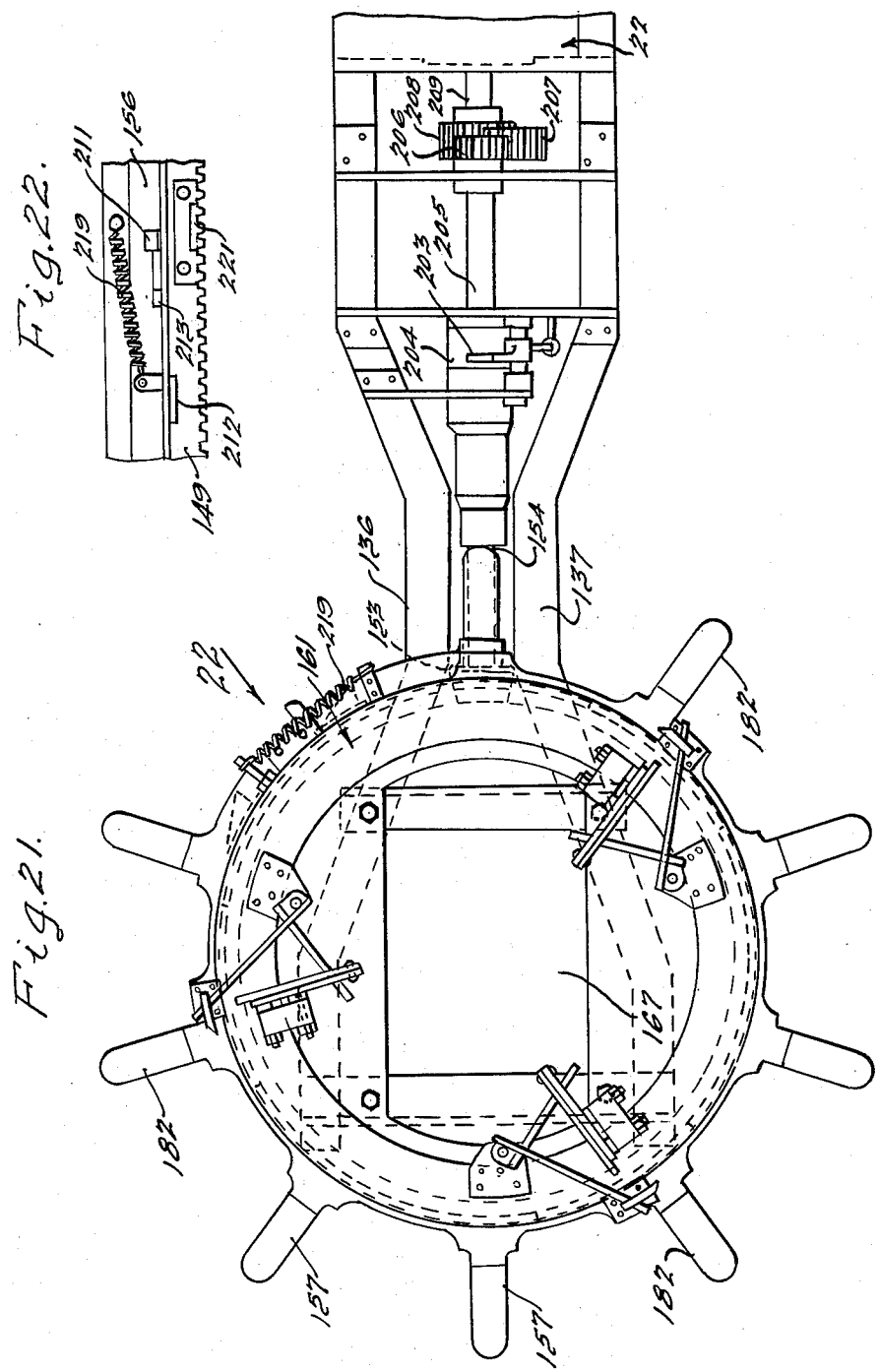

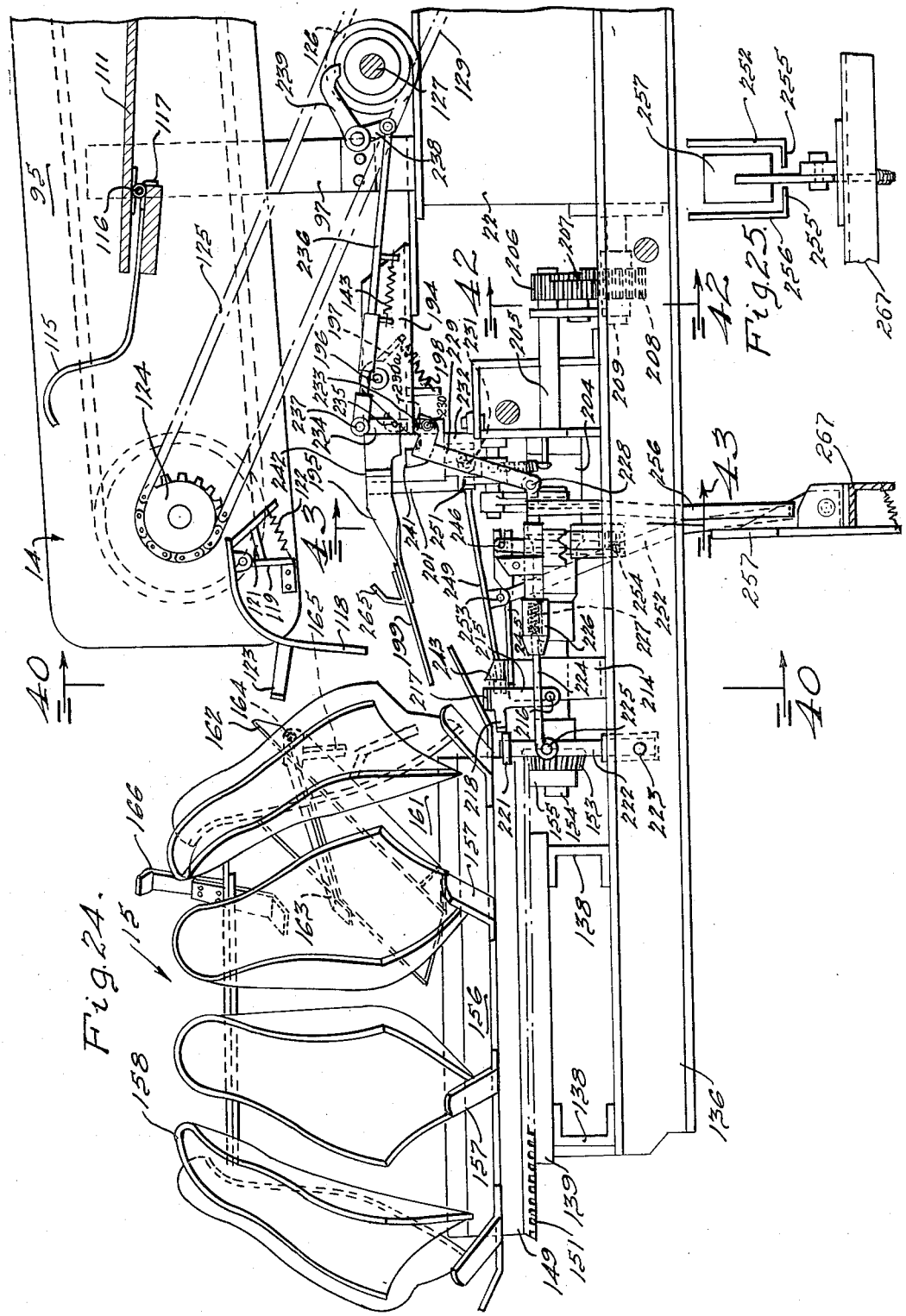

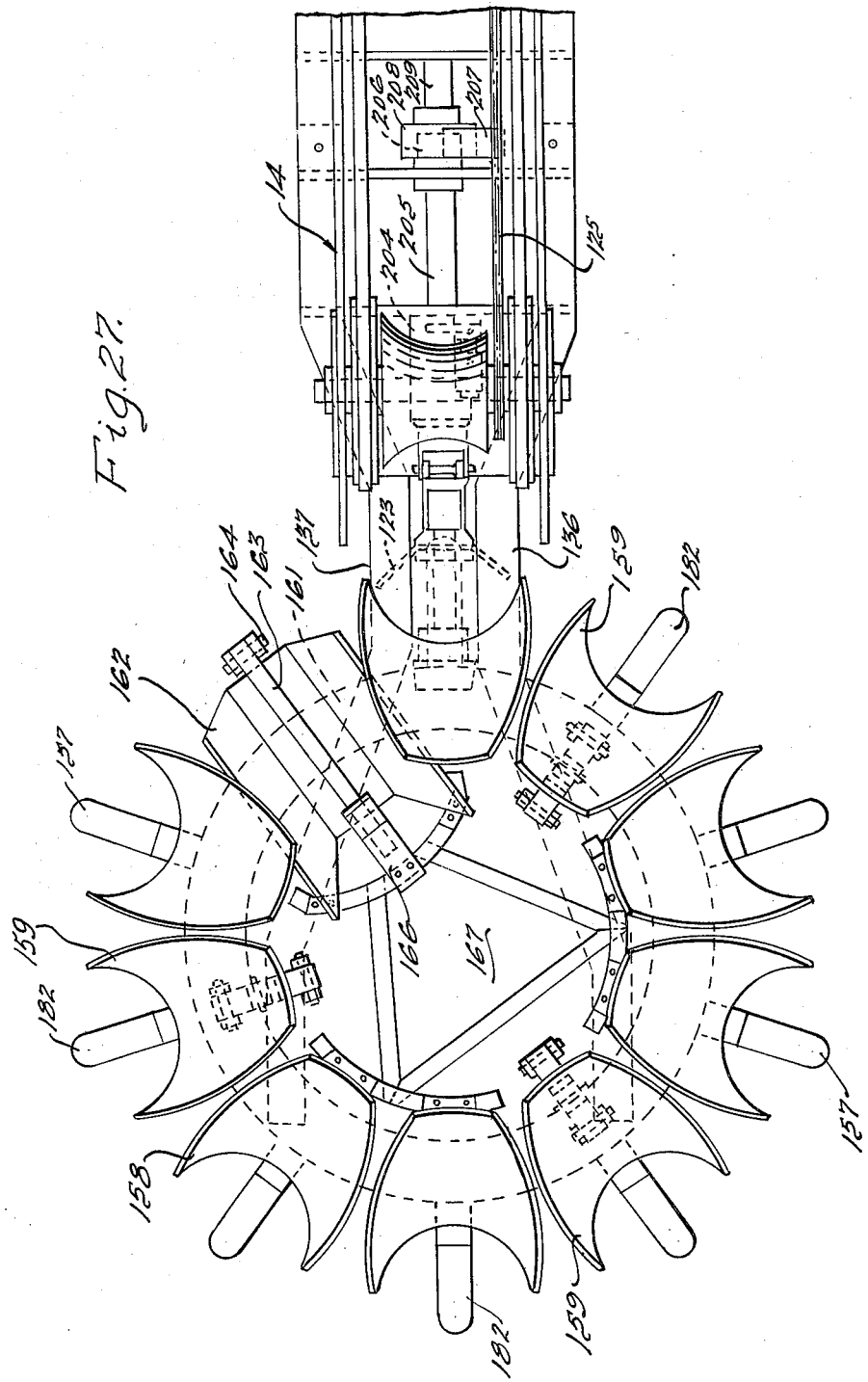

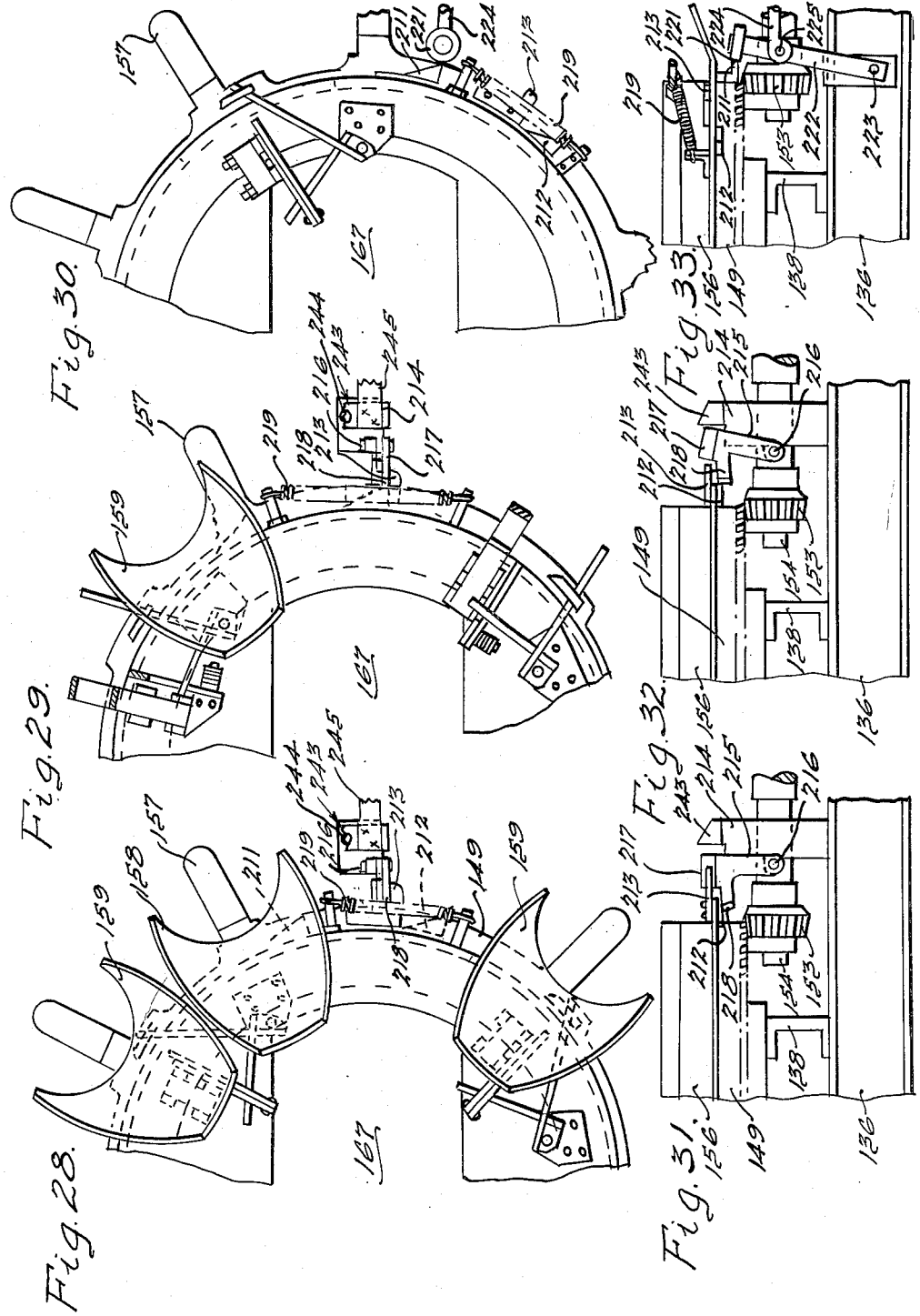

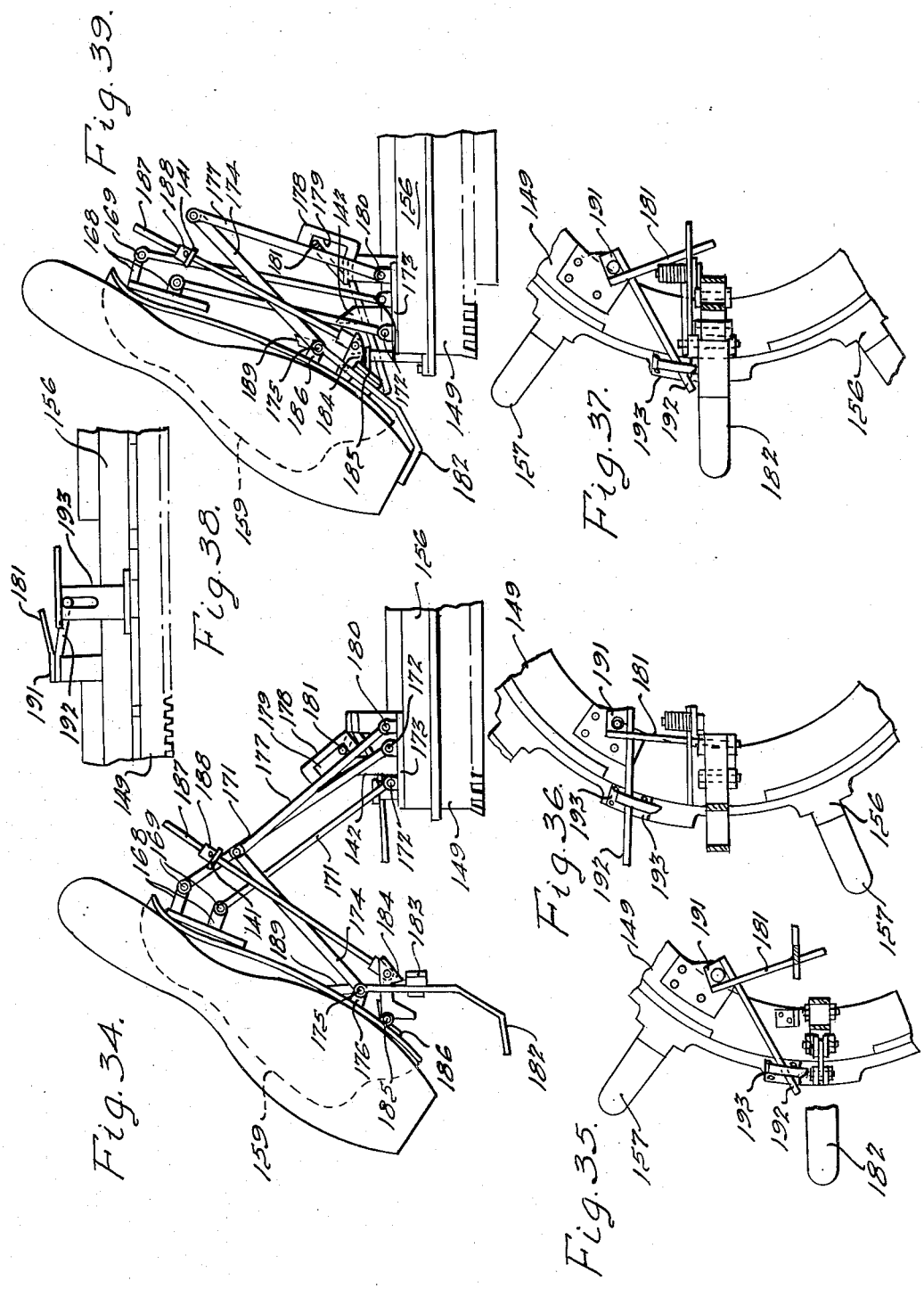

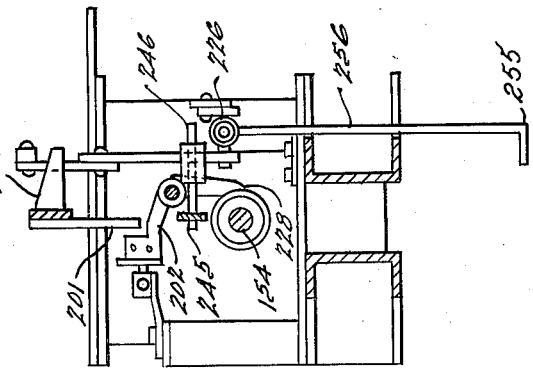
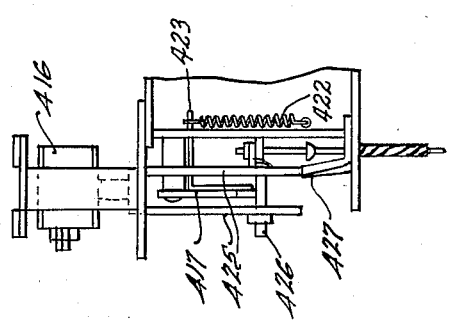
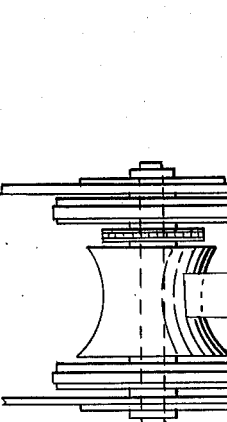
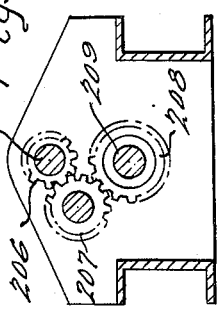

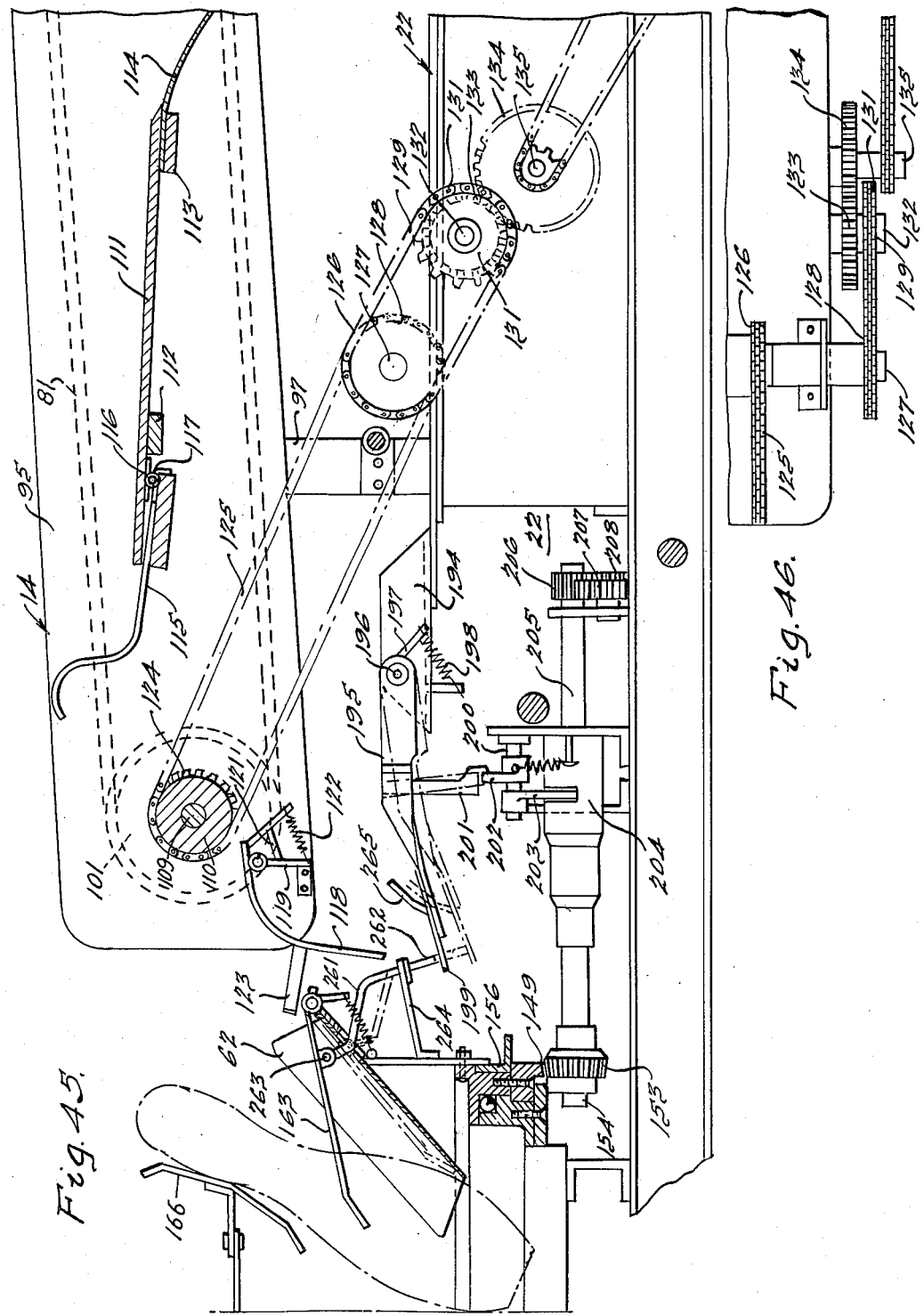

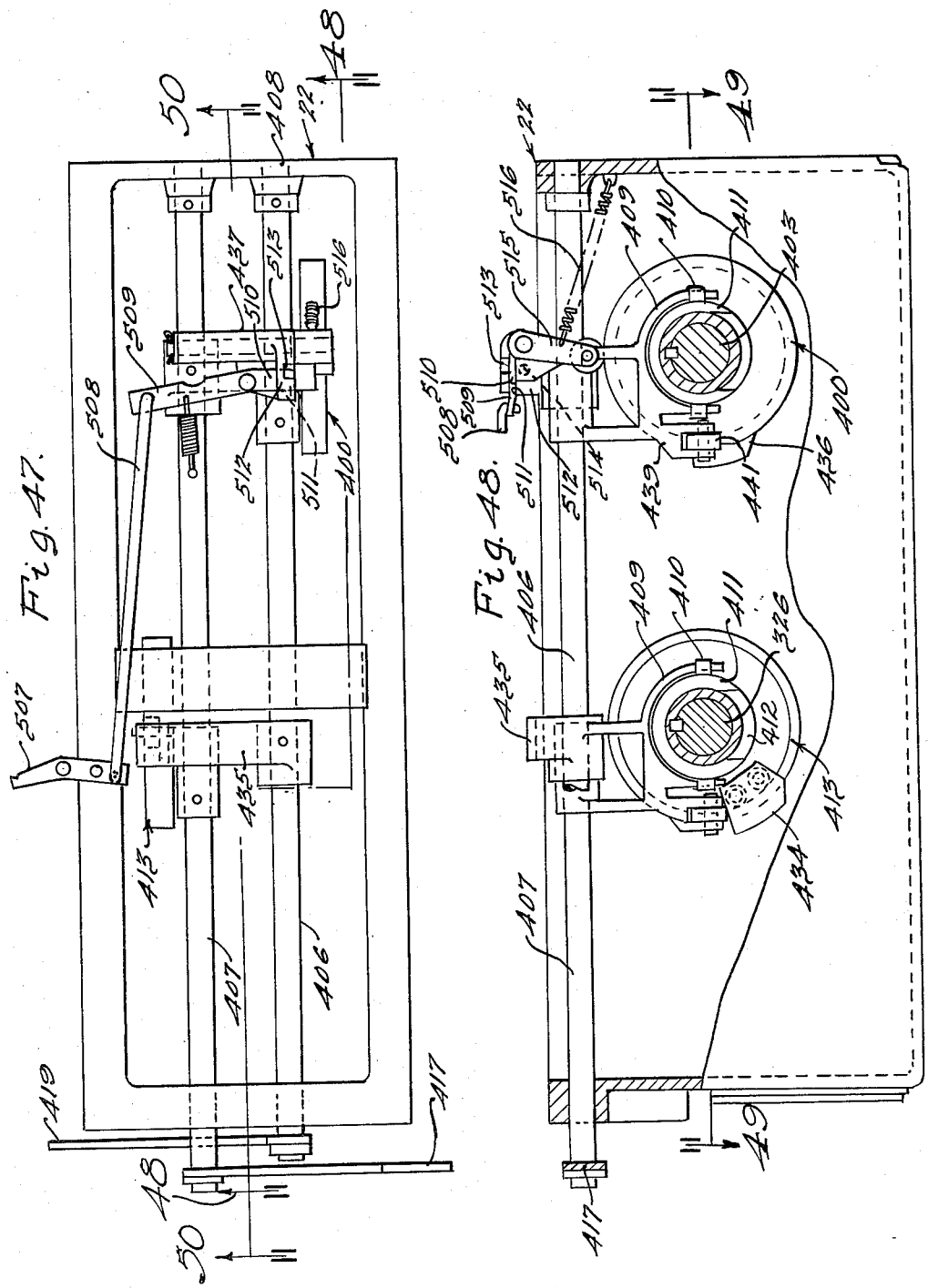

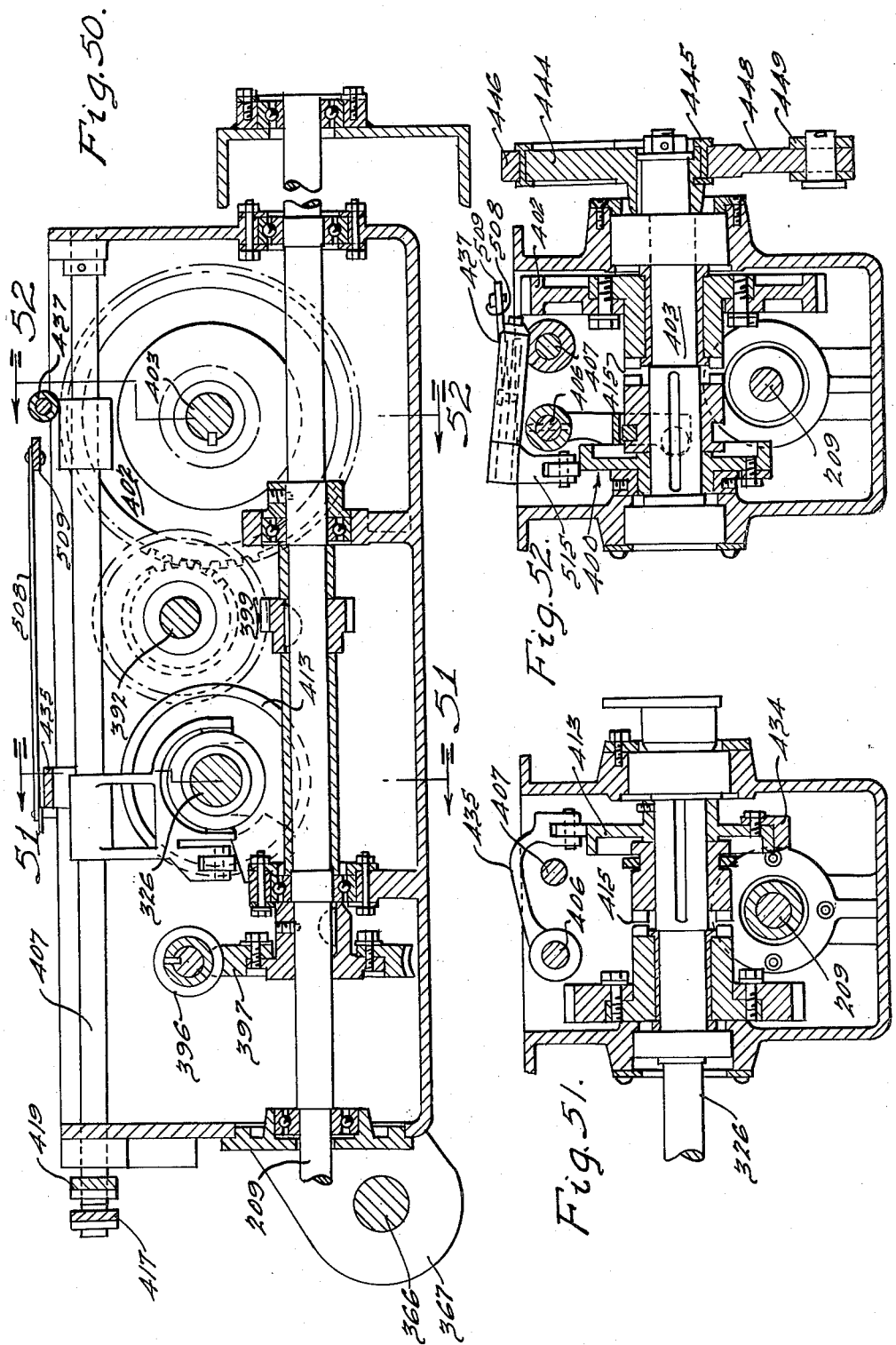

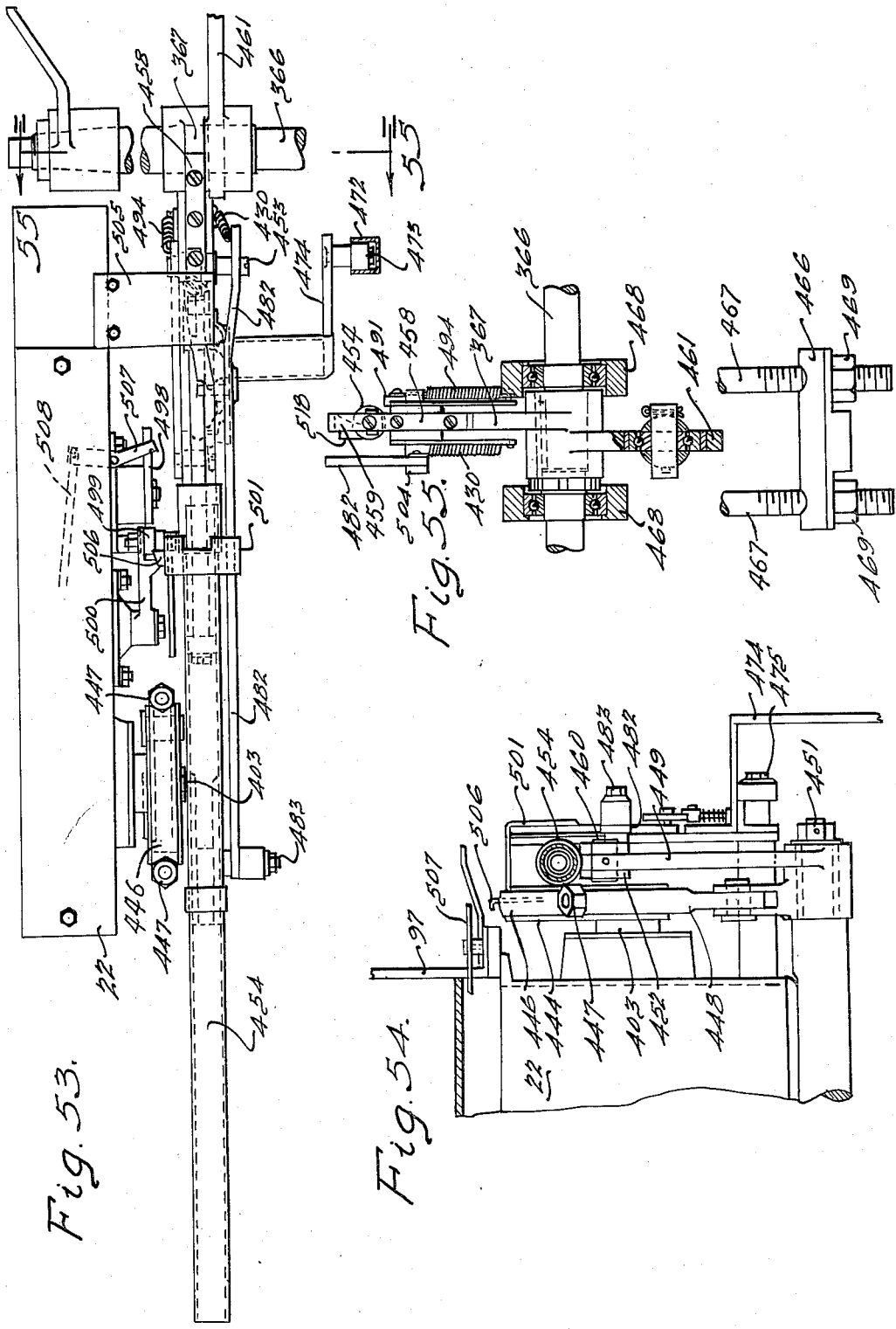

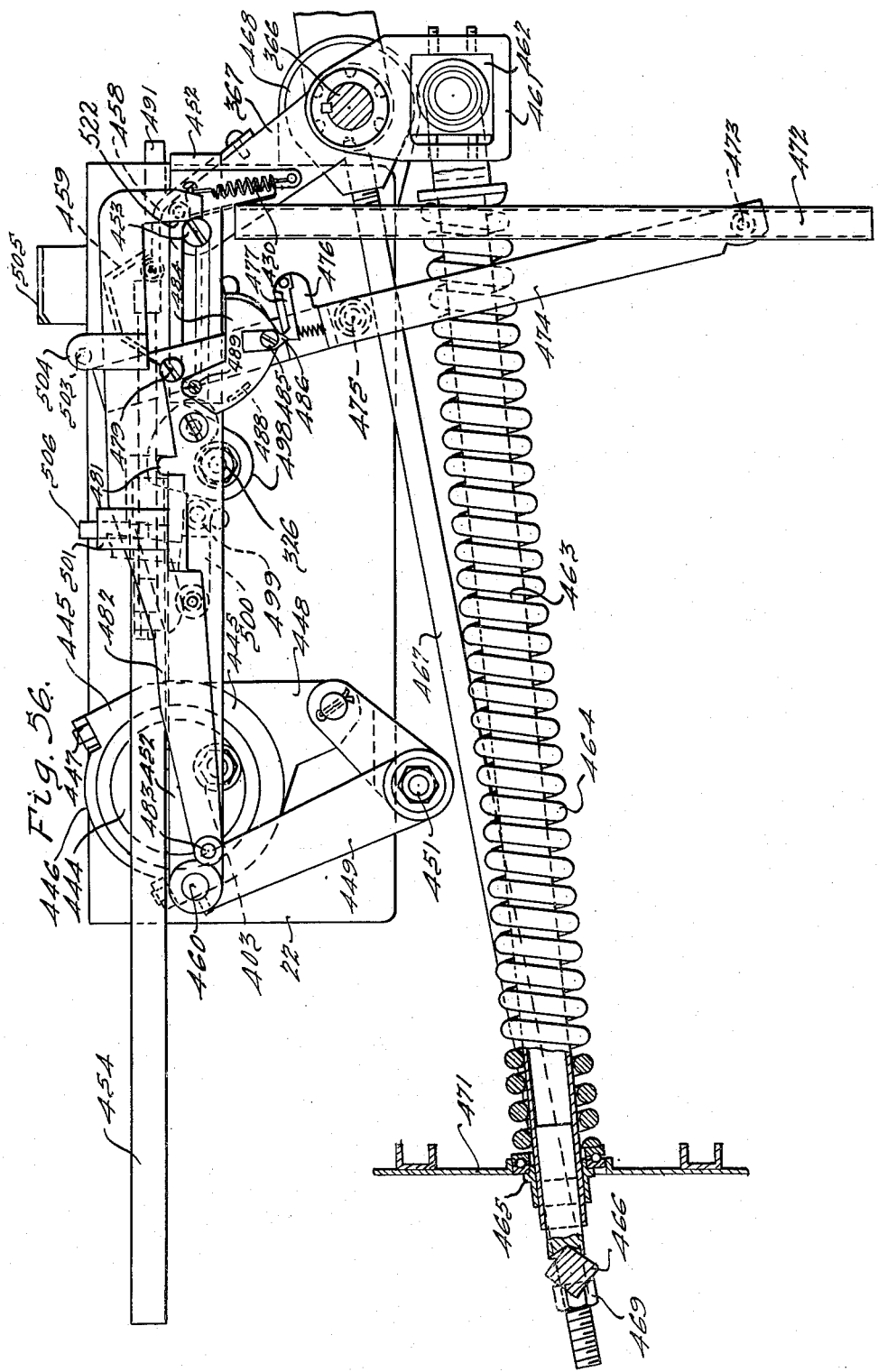

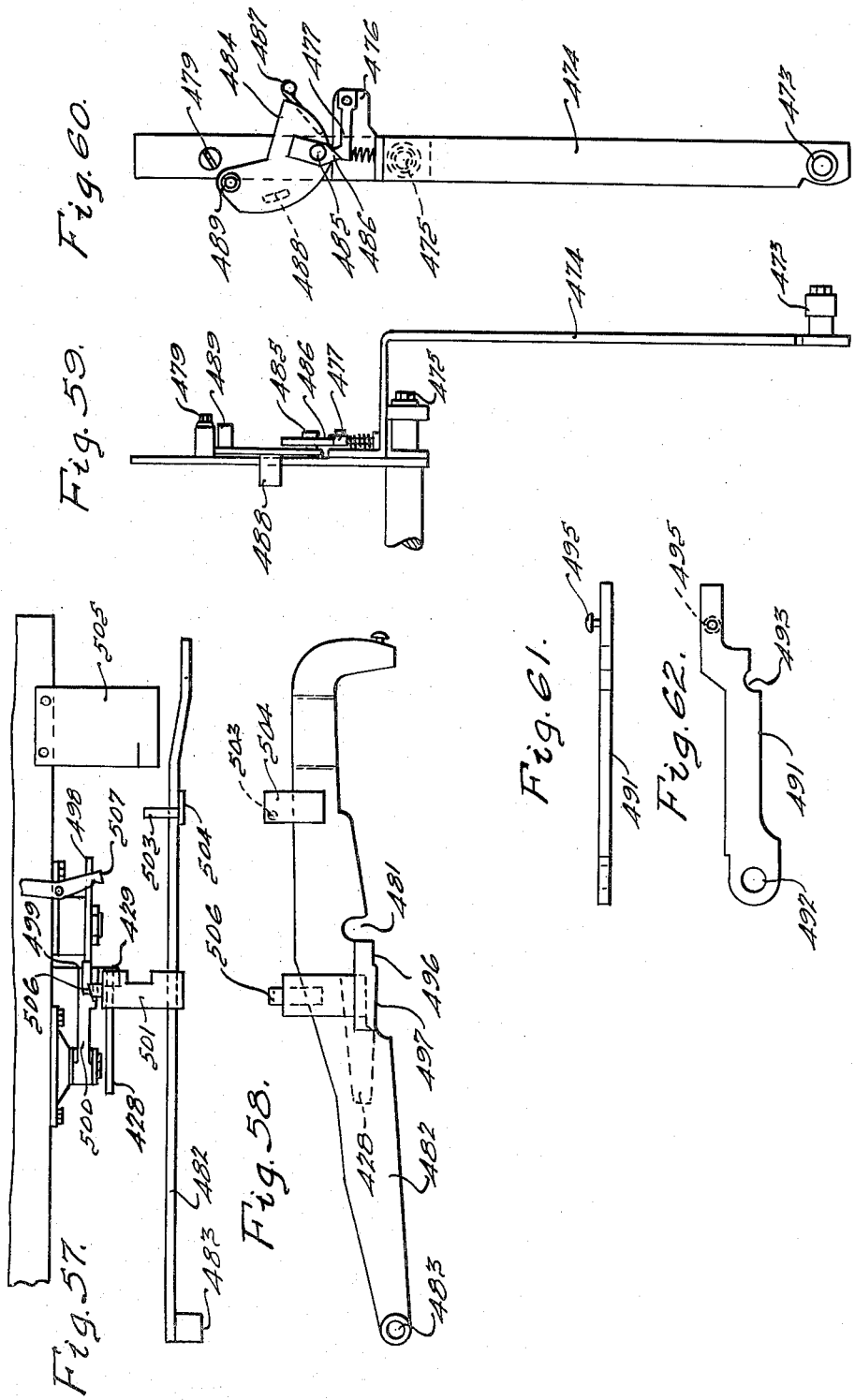

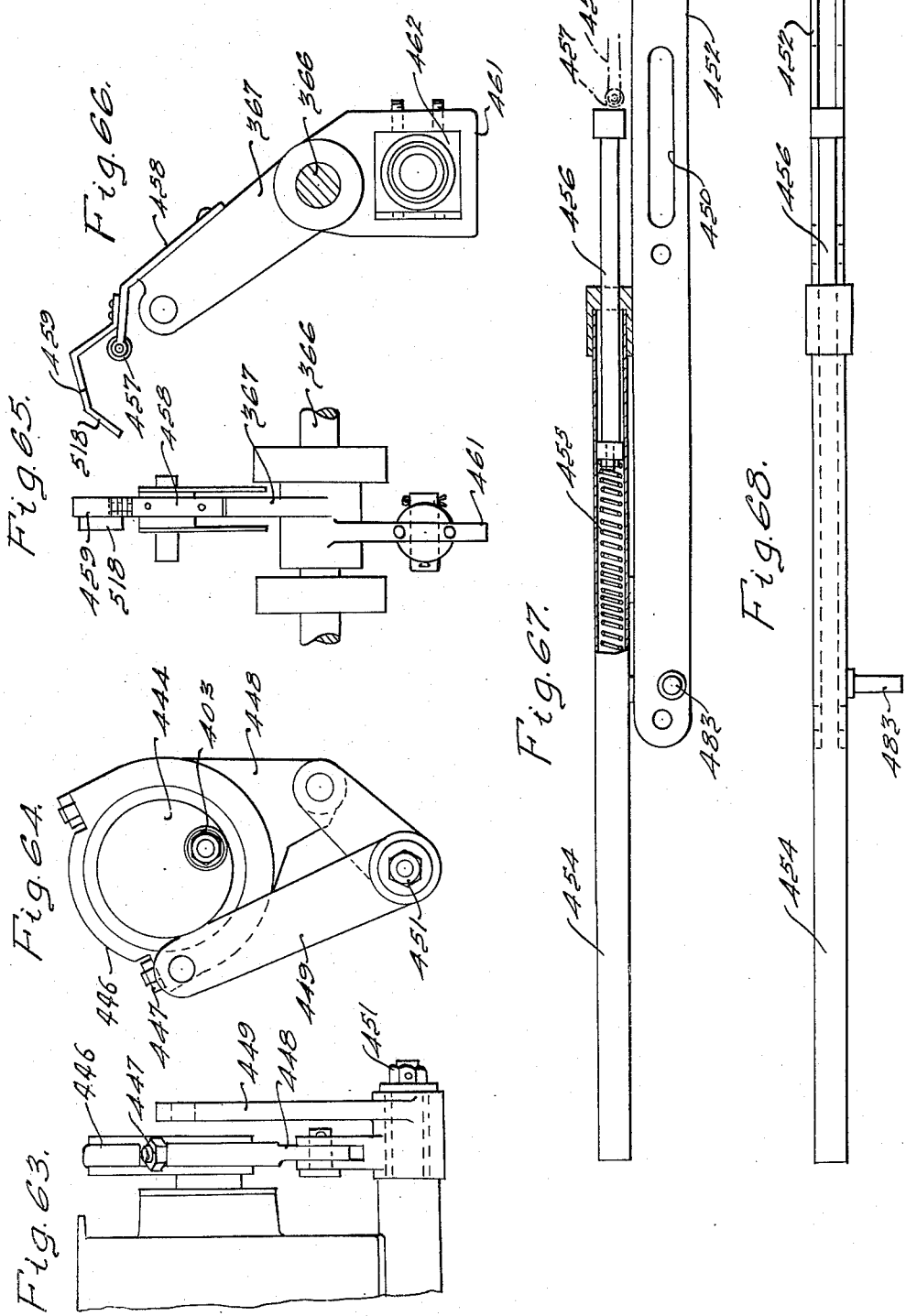

Fig. 73.

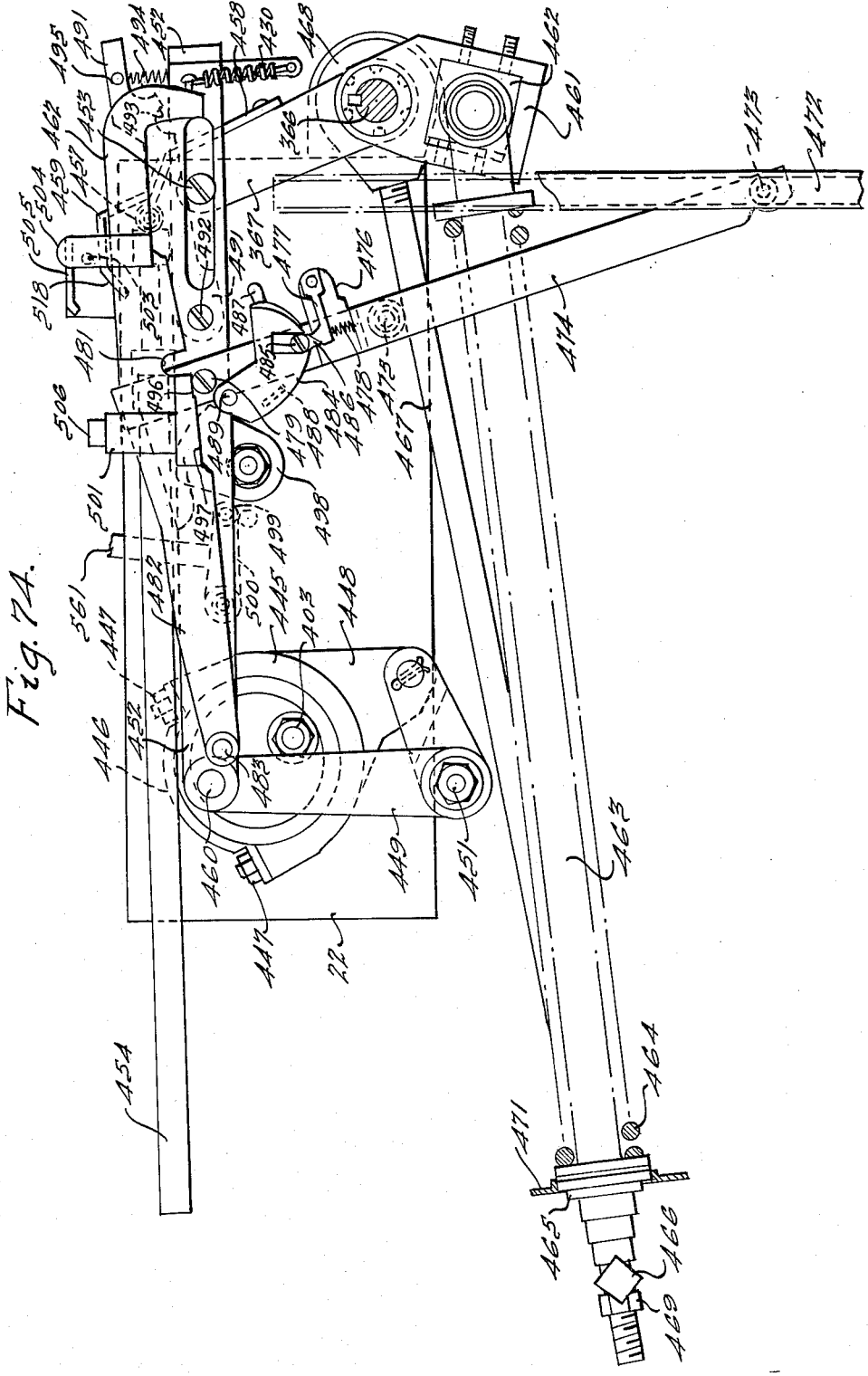

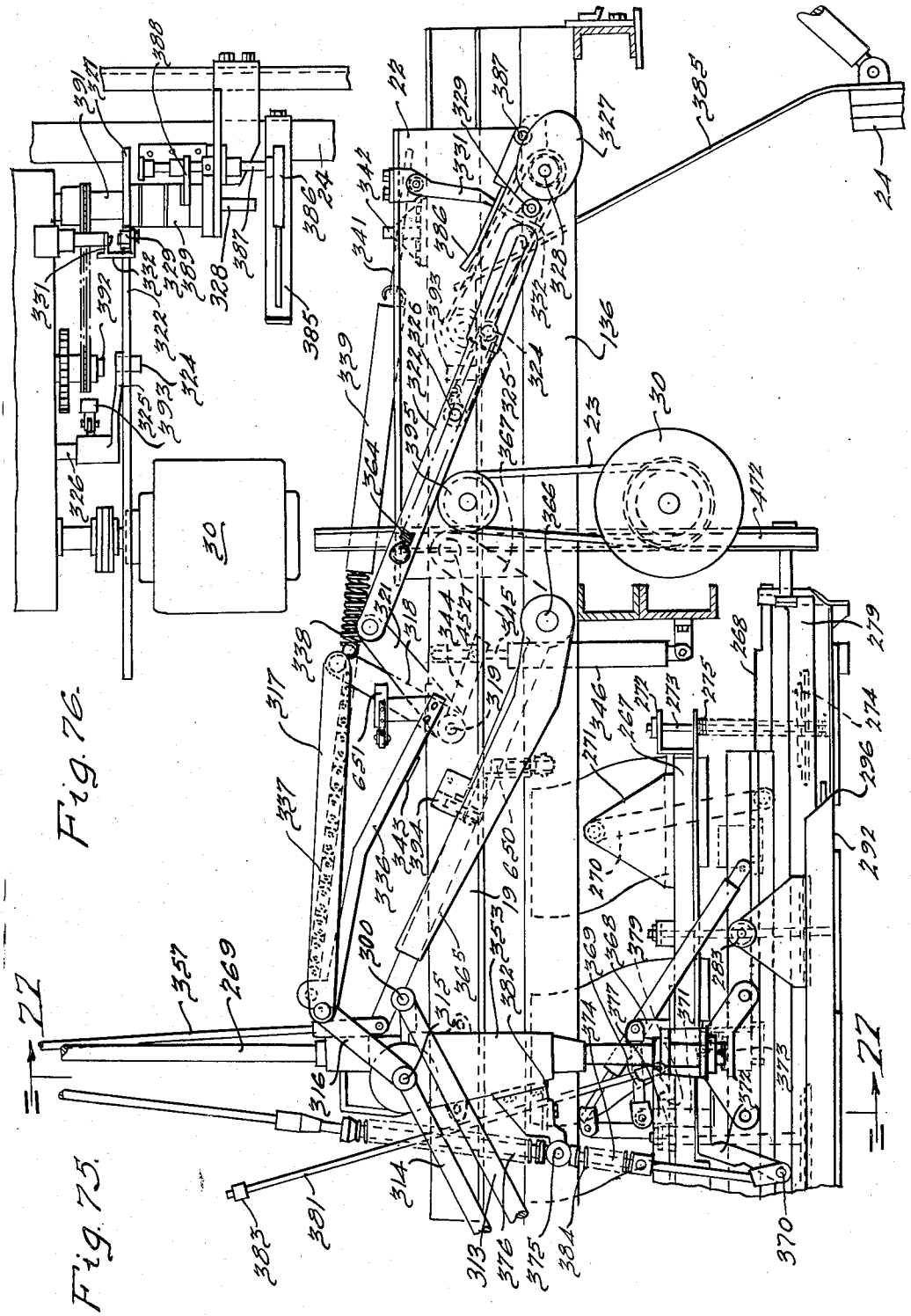

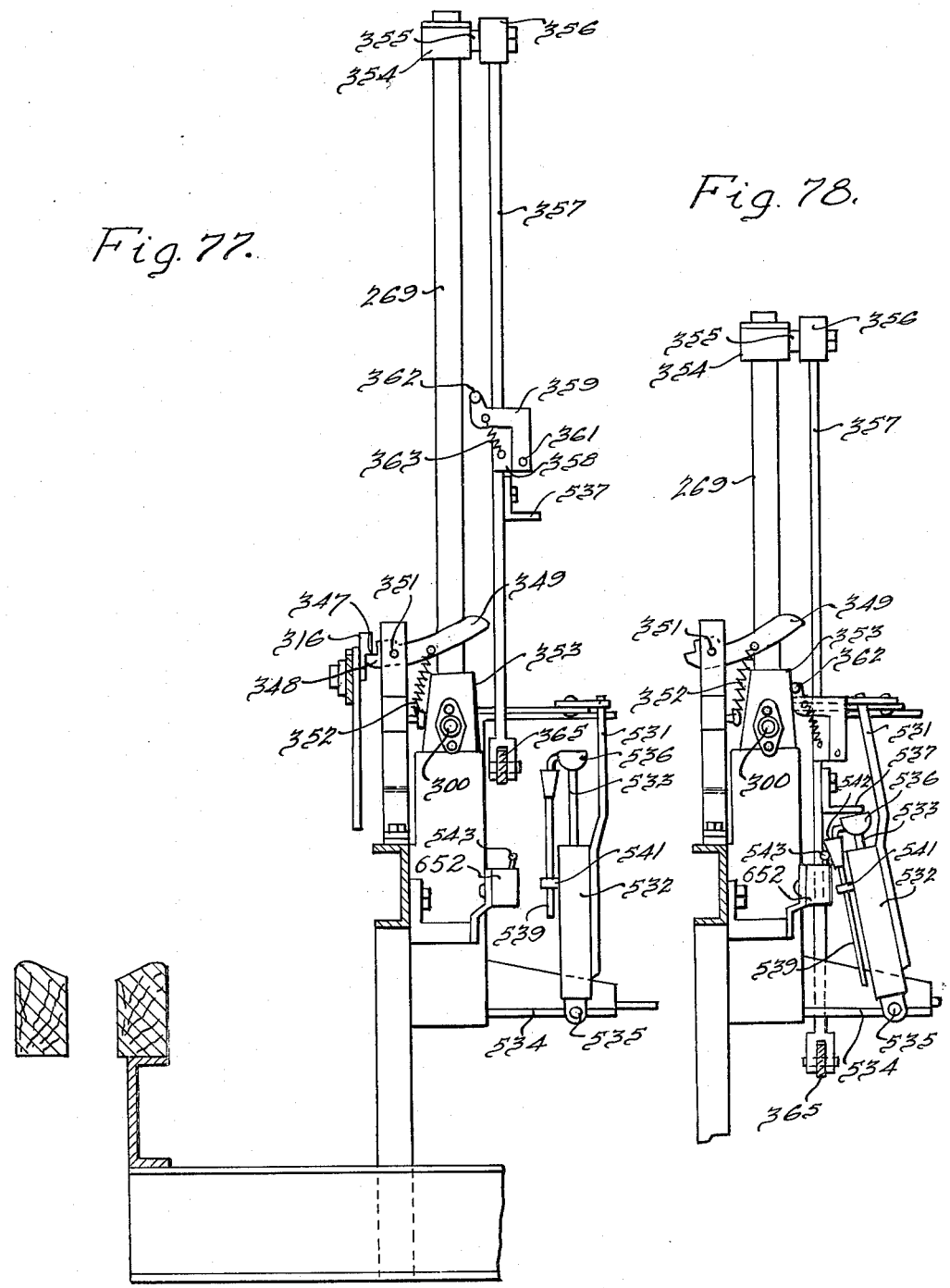

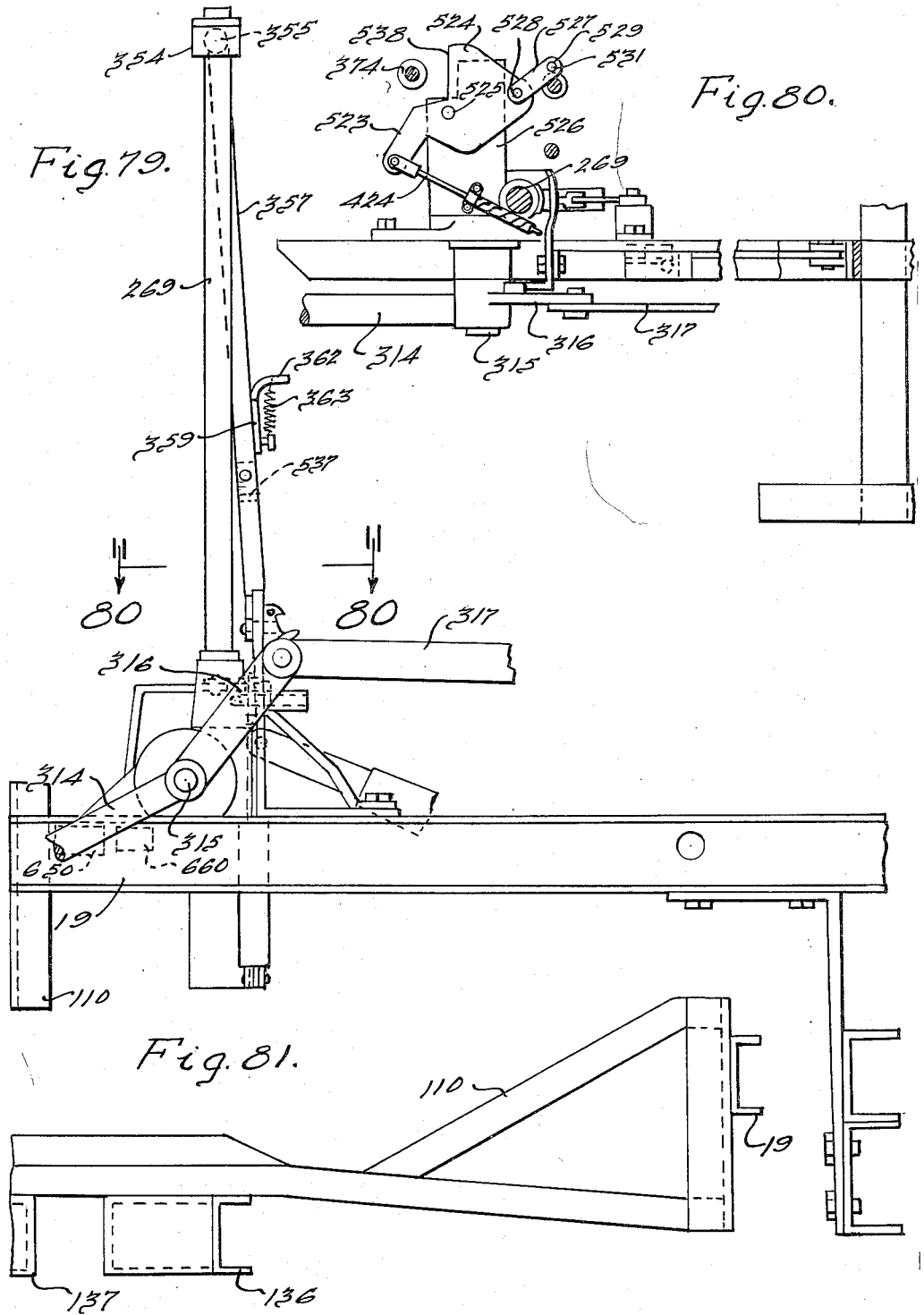

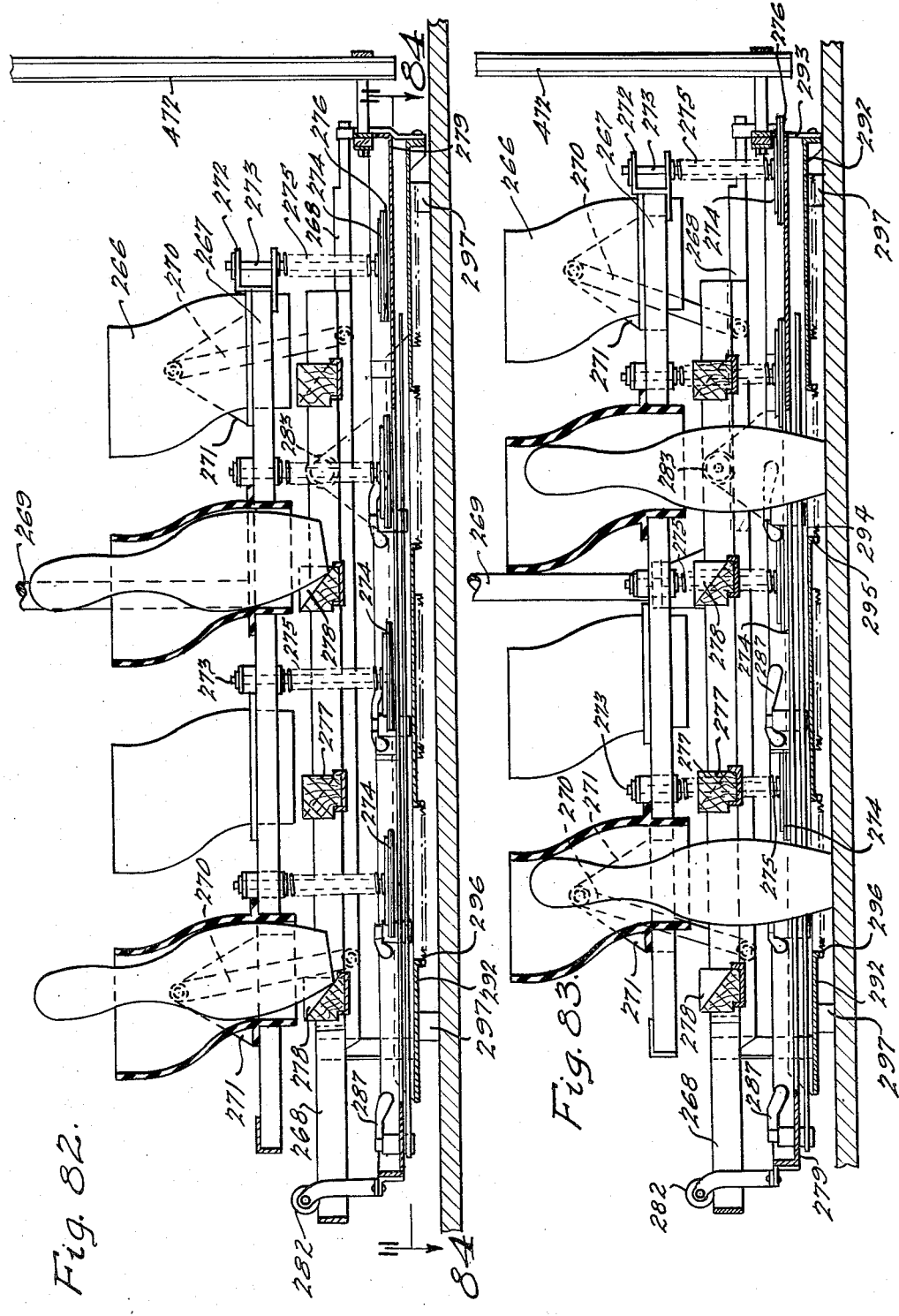

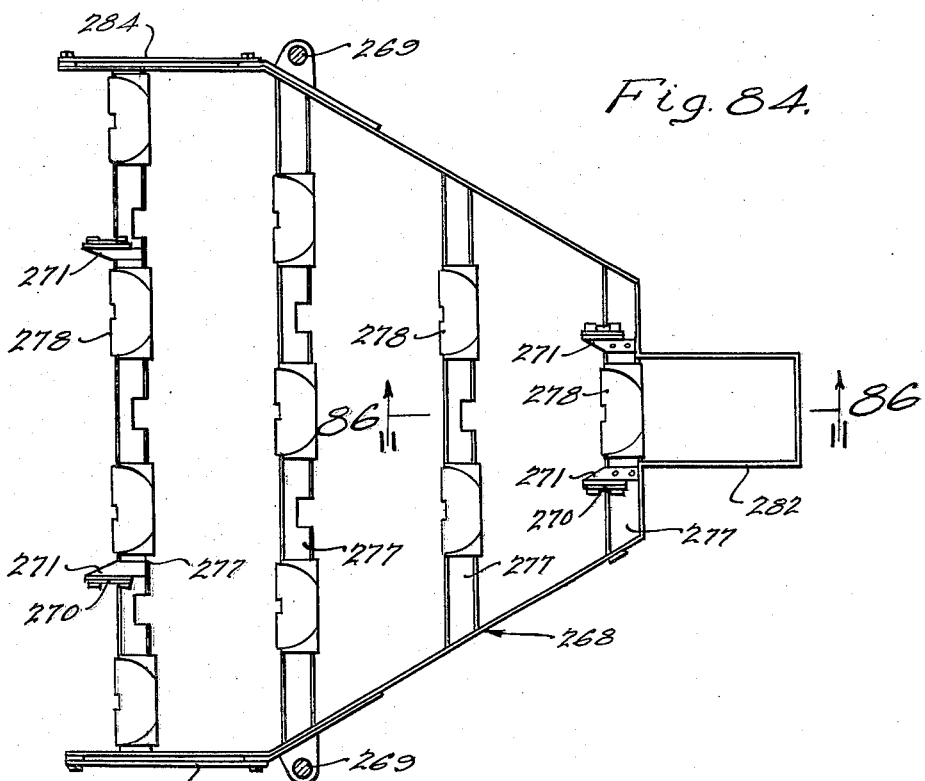
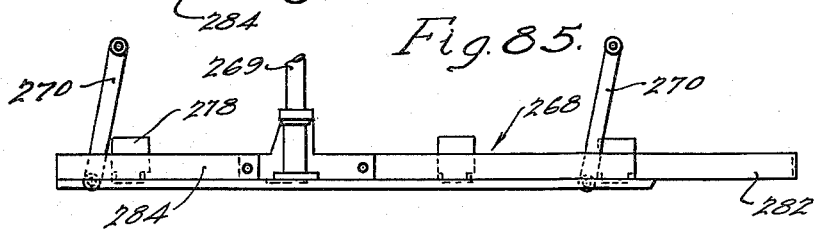
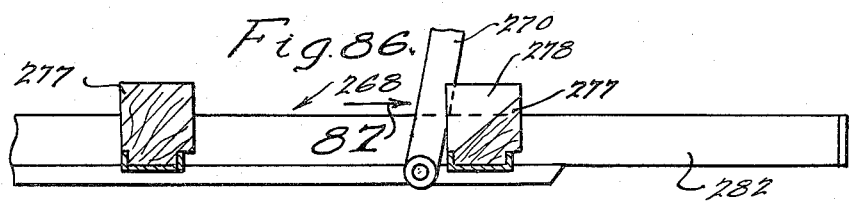
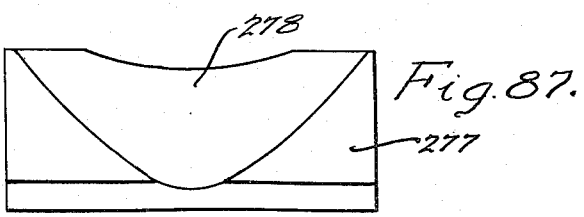

July 4, 1961 E. HEDENSKOOG ET AL 2,991,078
COMPLETELY AUTOMATIC PIN SETTING AND BALL
RETURN MECHANISM FOR BOWLING ALLEY
Filed Aug. 4, 1953 53 Sheets-Sheet 48
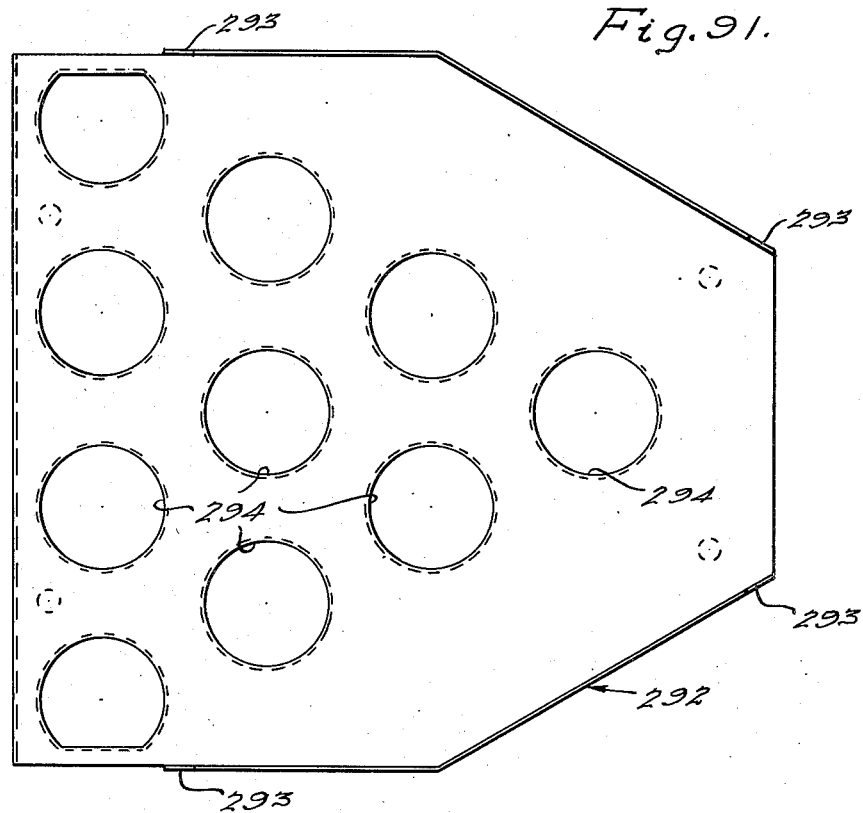
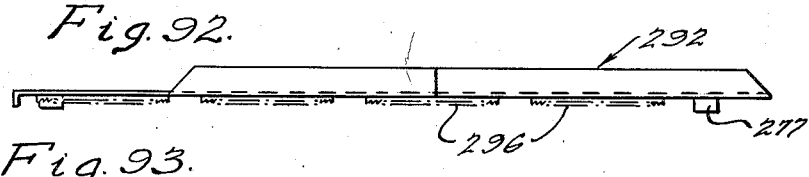
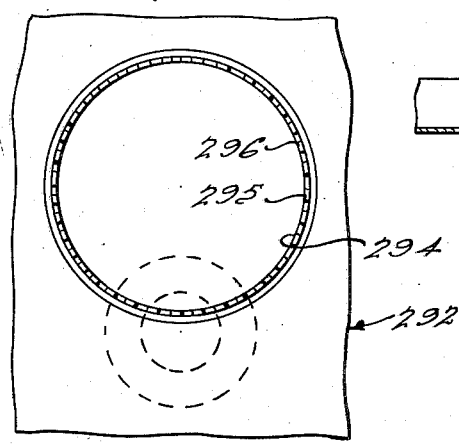
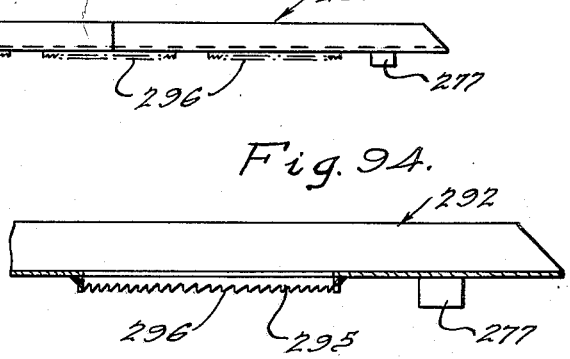

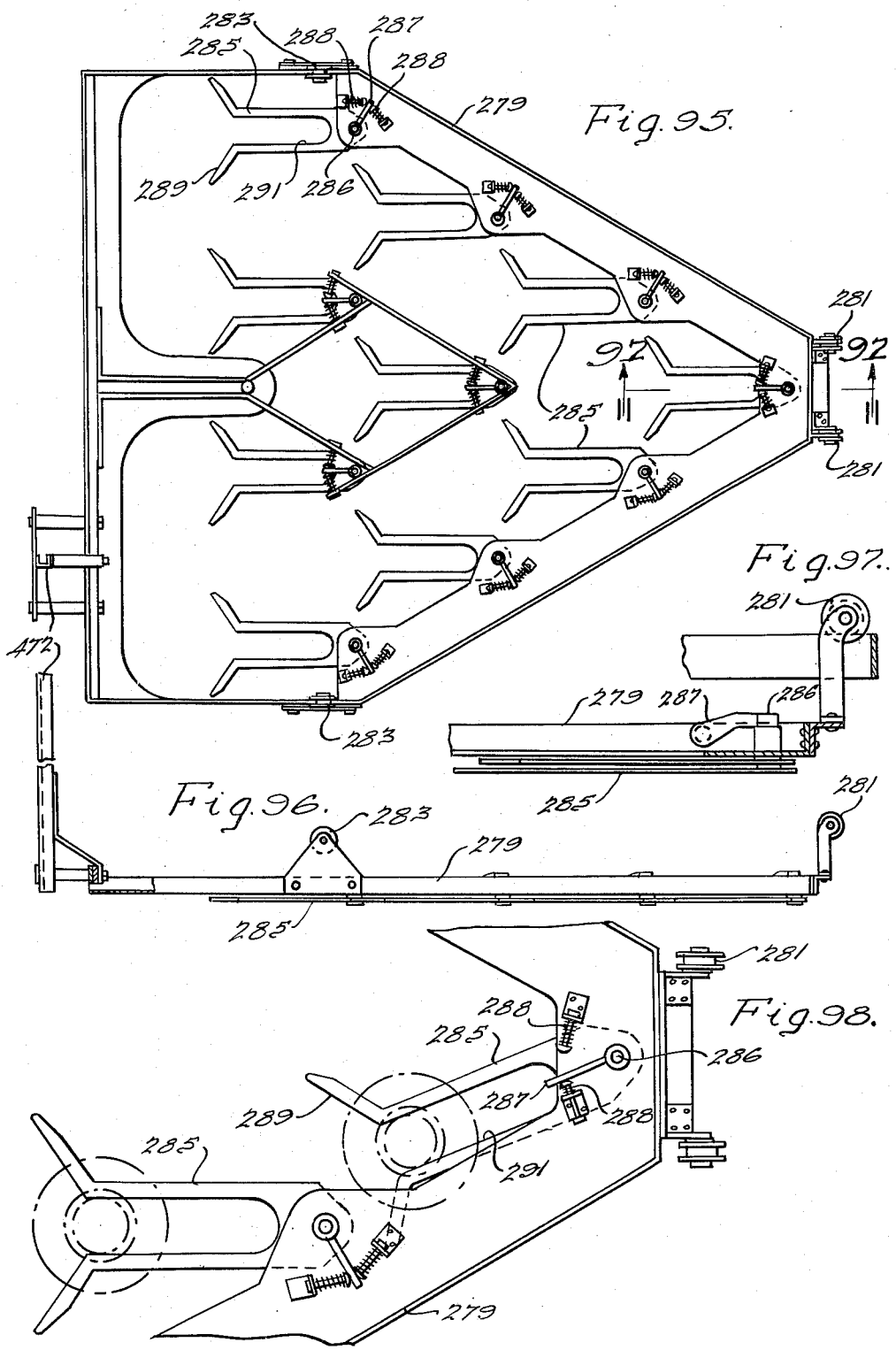

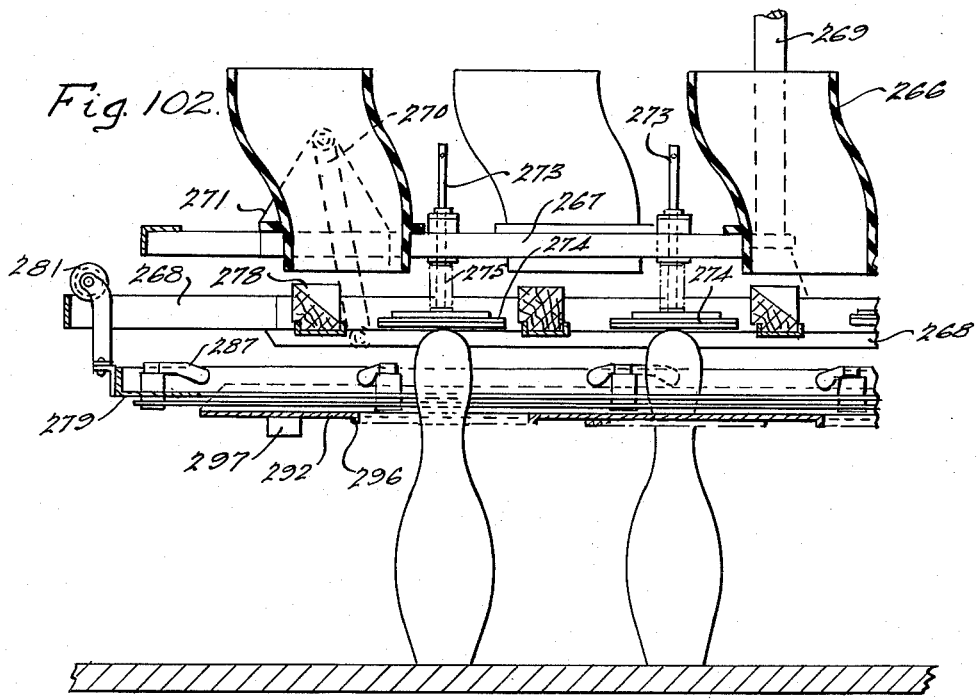
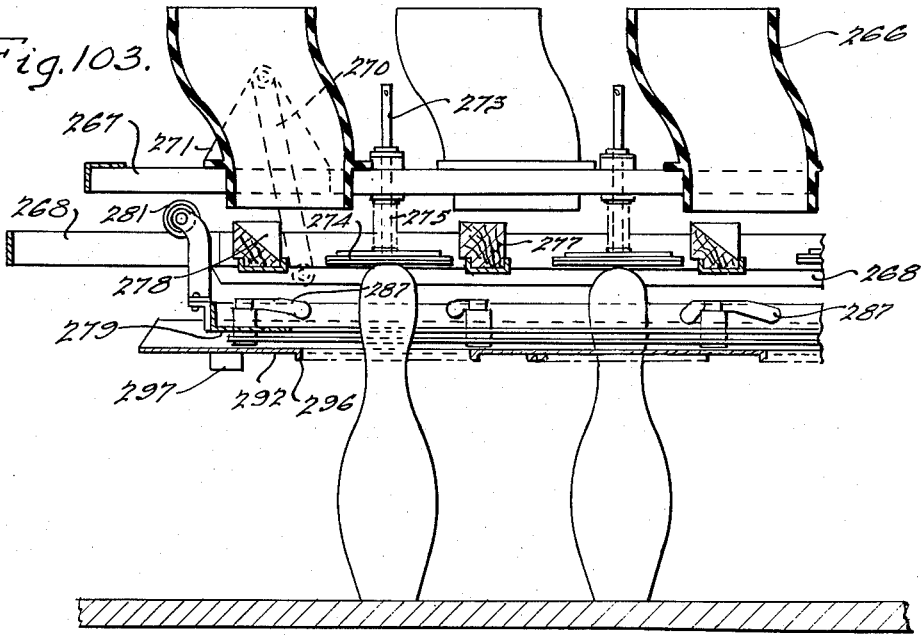

July 4, 1961
E. HEDENSKOOG ET AL
2,991,078
COMPLETELY AUTOMATIC PIN SETTING AND BALL
RETURN MECHANISM FOR BOWLING ALLEY
Filed Aug. 4, 1953
53 Sheets-Sheet 52
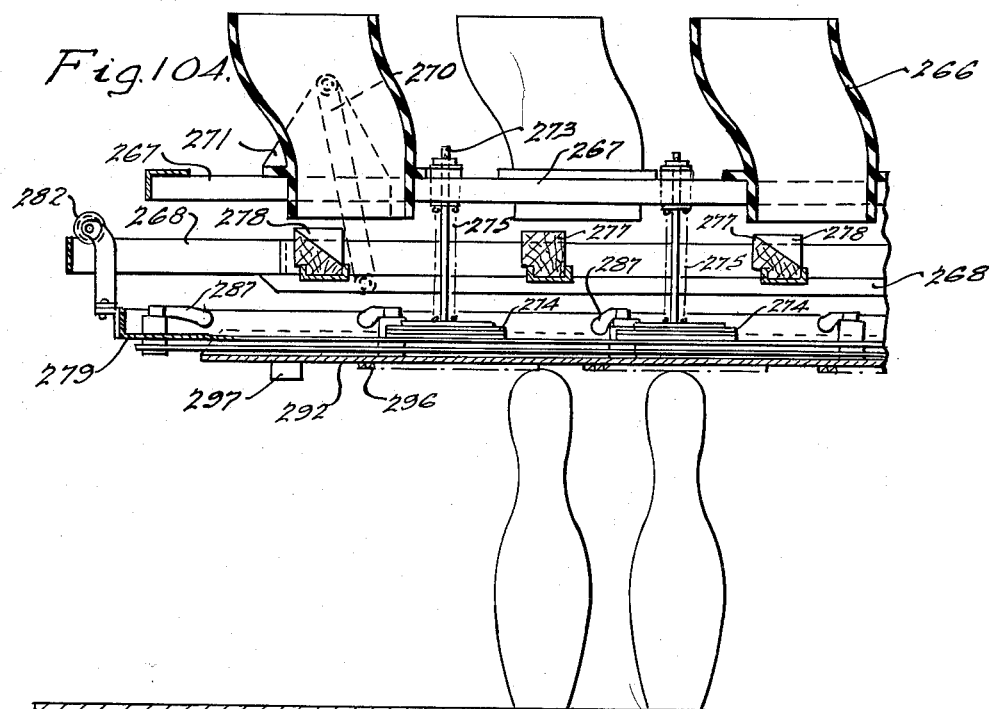
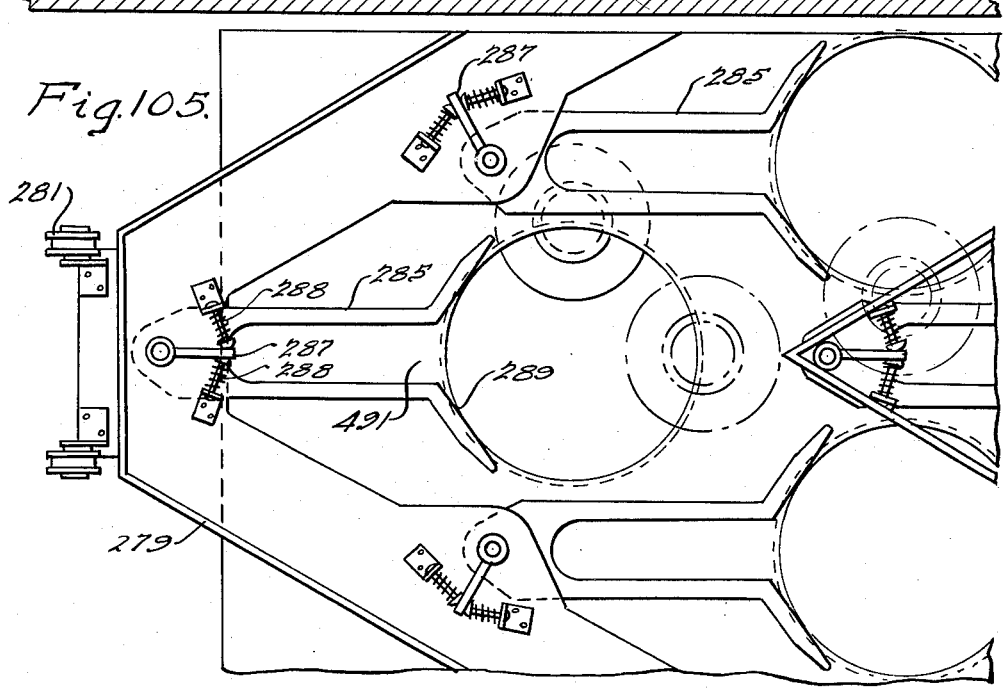

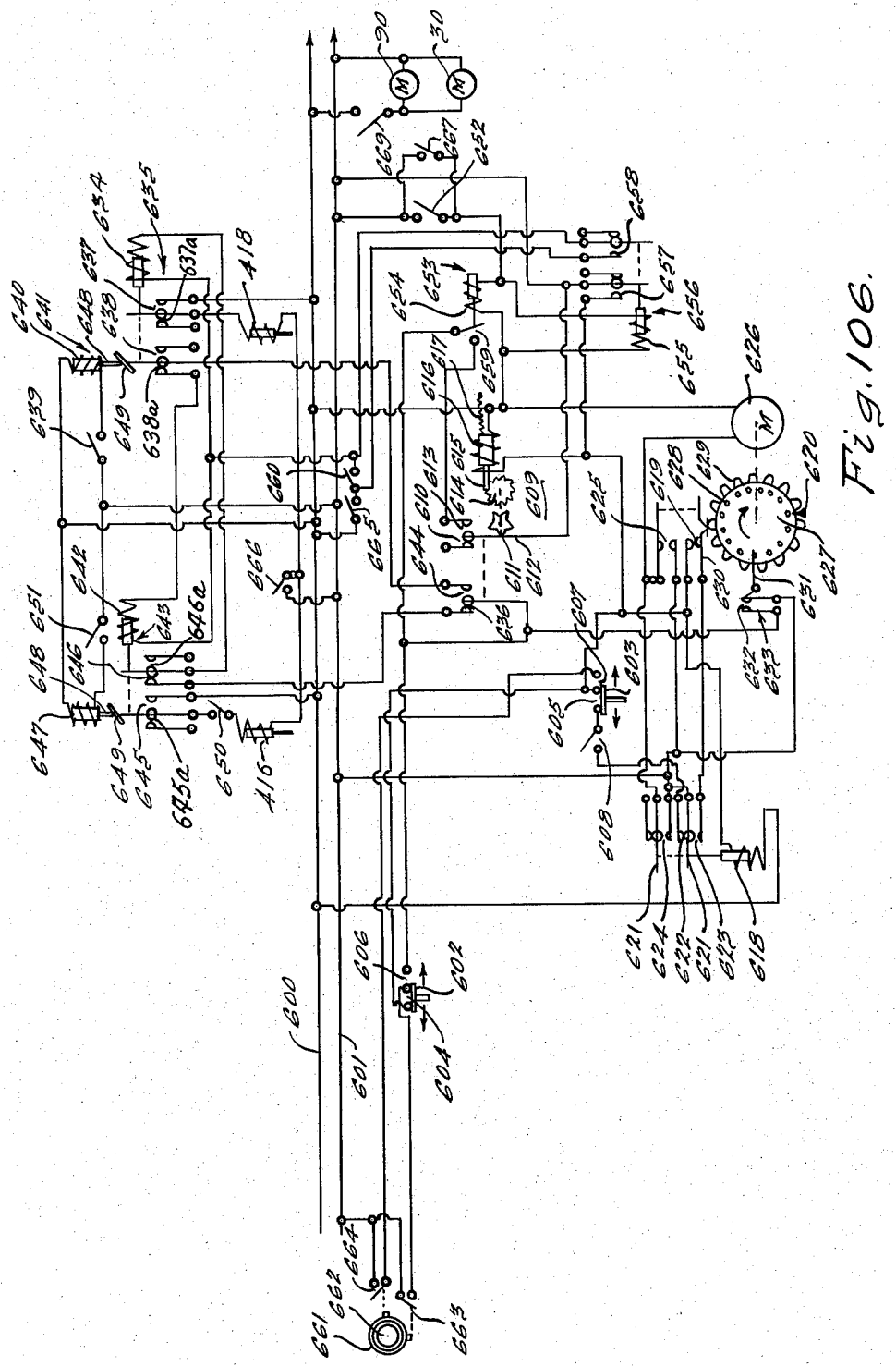

United States Patent Office 2,991,078
Patented July 4, 1961

2,991,078
COMPLETELY AUTOMATIC PIN SETTING AND BALL RETURN MECHANISM FOR BOWLING ALLEY
Ernest Hedenskoog, Donald A. Norberg, and Alvin E. Johnson, Muskegon, Mich., assignors, by mesne assignments, to The Brunswick Automatic Pinsetter Corporation, a corporation of Delaware
Filed Aug. 4, 1953, Ser. No. 372,366
11 Claims. (Cl. 273—43)

This invention relates to bowling pin setting machines, and particularly to a bowling pin setting machine of the automatic type which returns the ball and resets the pins in a required manner.

The machine of the present invention is compact so that it may be mounted in the pit of the presently installed bowling alleys without changing the dimensions of the pit or requiring added depth to the floor or height to the ceiling.

The device embodies a plurality of rollers located in the alley pit in extension of the alley bed which are driven to advance the ball and pins delivered from the alley to an endless belt which raises the ball to a return rail and the pins to a delivery mechanism which directs them into a pin-receiving magazine. The delivery mechanism has means for turning the pins end for end so that they are always delivered butt end first, and a chute is associated therewith which receives broken parts of pins from the group and ejects them therefrom. The magazine has cups for supporting nine of the pins in a circle about a central opening through which a tenth pin is delivered when the nine pins are ejected from the magazine. In an alley for setting ten pins, six of the pins are positioned on a circle, the seventh pin is located on the center of the circle, and three additional pins are disposed outwardly of the circle, one at the head and two, the number 7 and 10 pins, at the rear corners to form a triangle. The magazine is so constructed that when the nine pins are to be delivered therefrom, six of the pins slide downwardly into cups on a setting rack disposed above a spotting rack, while the supports for the three remaining pins move outwardly before the pins are released so that the pins will slide into the number 1, 7 and 10 cups outside of the circle formed by the other six pins. The tenth pin is released from the delivery device to pass through the central opening of the magazine to be delivered to the central cup of the setting rack.

Two sets of pins are employed in the machine, one set being held in the magazine while the other set is in play. When a first ball is thrown and a strike occurs, the sweep is dropped to brush all of the pins remaining on the alley or gutters into the pit and the pins in the receiving cups are set upon the alley by the lowering of the setting and spotting racks. The ball and pins are raised, the former being delivered to the return rails while the pins are delivered to the delivering mechanism for again filling the nine cups of the magazine and retaining the tenth pin for later delivery through the central opening thereof. Should the ball thrown result in a spare, the spotting rack will move downwardly and the mechanism provided thereon for picking up the standing pins will engage the pins beneath the heads thereof and the rack will be raised, holding the pins thereon in the position in which they were picked up. The sweep is then lowered for brushing any remaining pins from the alley and gutters and the rack is again lowered to accurately reset the pins in the exact positions which the pins had before they were raised, which may be off-spot positions. The throwing of the second ball produces the operation of the sweep to brush all of the pins, whether they are standing or not, into the pit and the second set of pins delivered to the cups of the setting rack are then set upon the alley.

Suitable mechanism and switches are provided for producing the desired sequential movement of the various elements of the device, including means detecting a strike when thrown by the first ball, so that the alley may be immediately swept and a new set of pins placed on the alley without the mechanism attempting to first pick up the pins when none are standing. The elevating mechanism for the ball and pin is operated continuously and the passing of the ball into the mechanism is the means which energizes the rack and sweep operation thereafter. The device is entirely mechanical except for the circuits and interlocking switches so that very little service is required for maintaining the machine operative because of the mechanical mechanisms and the simplicity of the various operating units.

Accordingly, the main objects of the invention are: to provide a self-contained pin and ball delivering mechanism in combination with rack means for setting the pins upon the alley and sweep means for removing the pins therefrom; to provide a bowling pin setting machine having a continuously operating conveyor which raises the balls and pins to points of delivery which are located at different heights on the machine; to provide a magazine having nine cups disposed in a circle which are filled with pins from the delivering mechanism, with a tenth pin deliverable through an aperture at the center of the circle on which the cups are disposed at the time three of the cups move outwardly to deliver the three pins to the corner positions of the rack; to provide a combined setting and spotting rack with means for receiving and holding a set of pins while a second set is in play, having means thereon for clamping the pins to the alley surface when moved down to engage the pin heads after a spare has been made so that gripping fingers on a mechanism on the rack may engage the pins and raise them from the surface to permit the pins to be swept from the surface and gutters; to provide a bowling pin setting device with interconnecting means which produces the resetting of standing pins after a spare or the setting of a new set of pins after a strike has been made, and, in general, to provide a self-contained bowling pin setting machine which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIG. 15 is an enlarged, broken sectional view of the structure illustrated in FIG. 1, taken on the line 15—15 thereof;

FIG. 16 is a broken view of the structure illustrated in FIG. 15, as viewed from the left-hand side thereof;

FIG. 17 is an enlarged, broken sectional view of the structure illustrated in FIG. 4, taken on the line 17—17 thereof;

FIG. 18 is an enlarged, broken sectional view of the structure illustrated in FIG. 4, taken on the line 18—18 thereof;

FIG. 19 is a broken side view of the structure illustrated in FIG. 18;

FIG. 20 is a sectional view of the structure illustrated in FIG. 19, taken on line 20—20 thereof;

FIG. 21 is an enlarged sectional view of the structure illustrated in FIG. 1, taken on the line 21—21 thereof;

FIG. 22 is an enlarged broken view, in elevation, of the structure illustrated in FIG. 21, as viewed from the point 22;

FIG. 24 is an enlarged view of a portion of the structure illustrated in FIG. 1;

FIG. 25 is an end view of the bottom portion of the structure illustrated in FIG. 24;

FIG. 27 is a plan view of the structure illustrated in FIG. 26;

FIG. 28 is a broken view of the structure illustrated in FIG. 27, showing the cup operating mechanism;

FIG. 29 is a view of the structure illustrated in FIG. 28, with the operating mechanism in actuated position;

FIG. 30 is a view of the structure illustrated in FIG. 29, with the operating mechanism retracted and the structure advanced;

FIG. 31 is a view in elevation of the structure illustrated in FIG. 28;

FIG. 32 is a view in elevation of the structure illustrated in FIG. 29;

FIG. 33 is a view in elevation of the structure illustrated in FIG. 30;

FIG. 34 is an enlarged view of one of the pin supporting cups illustrated in FIG. 27, with the operating mechanism in extended position;

FIG. 35 is a view of the operating mechanism illustrated in FIG. 34, when in retracted position;

FIG. 36 is a view of the operating mechanism illustrated in FIG. 35, shown in extended position;

FIG. 37 is a view of the operating mechanism illustrated in FIG. 36, shown in retracted position, with the structure advanced;

FIG. 38 is a view in elevation of the structure illustrated in FIG. 37, as viewed from the left-hand side thereof;

FIG. 39 is a view in elevation of the structure illustrated in FIG. 34, with the structure in retracted position;

FIG. 40 is a sectional view of the structure illustrated in FIG. 24, taken on the line 40—40 thereof;

FIG. 41 is a side view, with parts broken away, of the structure illustrated in FIG. 40;

FIG. 42 is a sectional view of the structure illustrated in FIG. 24, taken on the line 42—42 thereof;

FIG. 43 is a sectional view of the structure illustrated in FIG. 24, taken on the line 43—43 thereof;

FIG. 45 is a view of the structure illustrated in FIG. 44, showing another position thereof;

FIG. 46 is a broken plan view of the structure illustrated in FIG. 45;

FIG. 47 is a sectional view of the structure illustrated in FIG. 4, taken on the line 47—47 thereof;

FIG. 48 is a sectional view of the structure illustrated in FIG. 47, taken on line 48—48 thereof;

FIG. 50 is an enlarged sectional view of the structure illustrated in FIG. 47, taken on the line 50—50 thereof;

FIG. 51 is a sectional view of the structure illustrated in FIG. 50, taken on the line 51—51 thereof;

FIG. 52 is a sectional view of the structure illustrated in FIG. 50, taken on the line 52—52 thereof;

FIG. 53 is a plan view showing the rack and sweep operating mechanisms which are actuated by the structure illustrated in FIG. 49;

FIG. 54 is an end view of the structure illustrated in FIG. 53;

FIG. 55 is a sectional view of the structure illustrated in FIG. 53, taken on the line 55—55 thereof;

FIG. 56 is an enlarged view in elevation of the operating mechanism illustrated in FIG. 2;

FIG. 57 is a plan view of the structure illustrated in FIG. 56, with parts removed;

FIG. 58 is a view in side elevation of a link employed with the structure illustrated in FIG. 57;

FIG. 59 is an end view of a link assembly employed with the structure illustrated in FIG. 56;

FIG. 60 is a side view of the structure illustrated in FIG. 59;

FIG. 61 is a plan view of a link employed with the structure illustrated in FIG. 56;

FIG. 62 is a view in side elevation of the link illustrated in FIG. 61;

FIG. 63 is an end view of the cam and associated links illustrated in FIG. 56;

FIG. 64 is a view in side elevation of the structure illustrated in FIG. 63;

FIG. 65 is an end view of the operating shaft employed with control mechanism illustrated in FIG. 56;

FIG. 66 is a view in side elevation of the structure illustrated in FIG. 65;

FIG. 67 is a view in side elevation, with parts broken away, of a longitudinally movable link employed with the structure illustrated in FIG. 66;

FIG. 68 is a plan view of the structure illustrated in FIG. 67;

FIG. 73 is a view of the structure illustrated in FIG. 56, showing a fifth position of operation;

FIG. 74 is a view of the structure illustrated in FIG. 56, showing a sixth position of operation;

FIG. 75 is an enlarged broken view of the rack and sweep mechanism, when in raised position, of the machine illustrated in FIG. 1;

FIG. 76 is a broken plan view of the structure illustrated in FIG. 75;

FIG. 77 is an enlarged sectional view of the structure illustrated in FIG. 75, taken on the line 77—77 thereof, with parts shown in extended position;

FIG. 78 is a view of the structure illustrated in FIG. 77, with the parts in retracted position;

FIG. 79 is a side view of the structure illustrated in FIG. 77;

FIG. 80 is a sectional view of the structure illustrated in FIG. 79, taken on the line 80—80 thereof;

FIG. 81 is a plan view of a portion of the structure illustrated in FIG. 79;

FIG. 82 is a view in elevation of the pin setting rack when lowered into engagement with the alley surface;

FIG. 83 is a view of the structure illustrated in FIG. 82 when moved to pin delivering and setting position;

FIG. 84 is a sectional view of the structure illustrated in FIG. 82, taken on the line 84—84 thereof;

FIG. 85 is a view in elevation of the structure illustrated in FIG. 84;

FIG. 86 is an enlarged sectional view of the structure illustrated in FIG. 84, taken on the line 86—86 thereof;

FIG. 87 is an enlarged broken view of the structure illustrated in FIG. 86, as viewed from the point 87 thereof;

FIG. 91 is a view of the plate of the rack, having openings therein, for interrupting the downward movement of the rack when a pin has moved too great a distance from spot position;

FIG. 92 is a side view of the structure illustrated in FIG. 91;

FIG. 93 is an enlarged, broken bottom view of the structure illustrated in FIG. 91;

FIG. 94 is a side view of the structure illustrated in FIG. 93;

FIG. 95 is a plan view of the frame of the rack which carries the pin pickup fingers;

FIG. 96 is a side view of the structure illustrated in FIG. 95;

FIG. 97 is an enlarged, broken sectional view of the structure illustrated in FIG. 95, taken on the line 97—97 thereof;

FIG. 98 is an enlarged broken view of the structure illustrated in FIG. 95, with the fingers shown moving into engagement with pins left standing on the alley after a spare is made;

FIG. 102 is a broken sectional view of the rack illustrated in FIG. 99 when empty and engaging the heads of pins standing after a spare was made;

FIG. 103 is a view of the rack as illustrated in FIG. 102 after the tray supporting the pickup fingers has been advanced to have the fingers engage the pins as illustrated in FIG. 98;

FIG. 104 is a view of the rack structure illustrated in FIG. 102 when stopped in its downward descent by engaging a pin which has moved too great a distance from "on spot" position;

FIG. 105 is a broken plan view of the plate when engaging the heads of pins when moved too great a distance from "on spot" position, and FIG. 106 is a wiring diagram showing the circuits and various switches, relays, solenoids and the like, which are employed on the bowling pin resetting machine.

Figure 1:
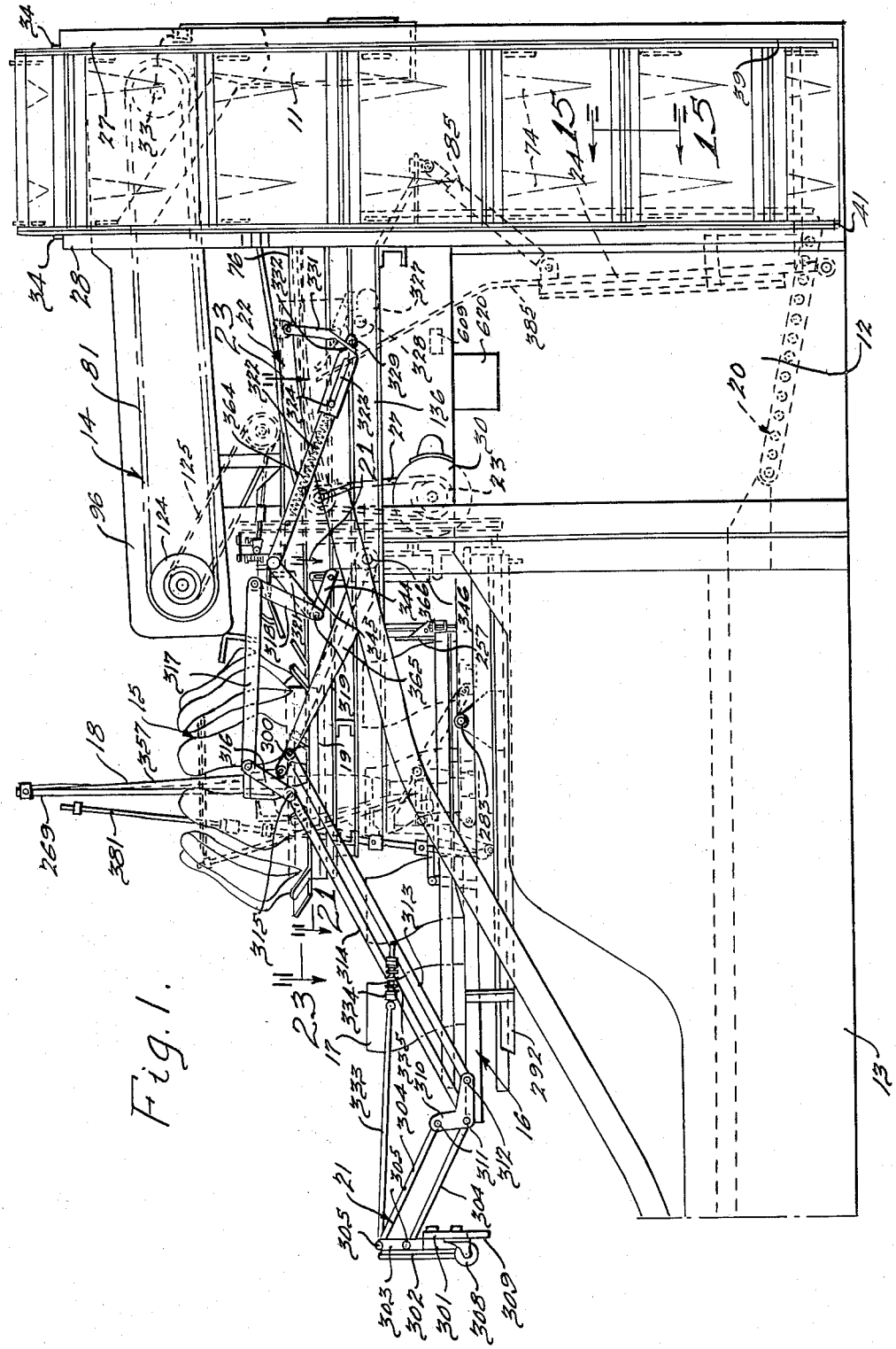
FIGURE 1 is a side elevational view of a bowling pin setting machine embodying features of the present invention.
Figure 2:
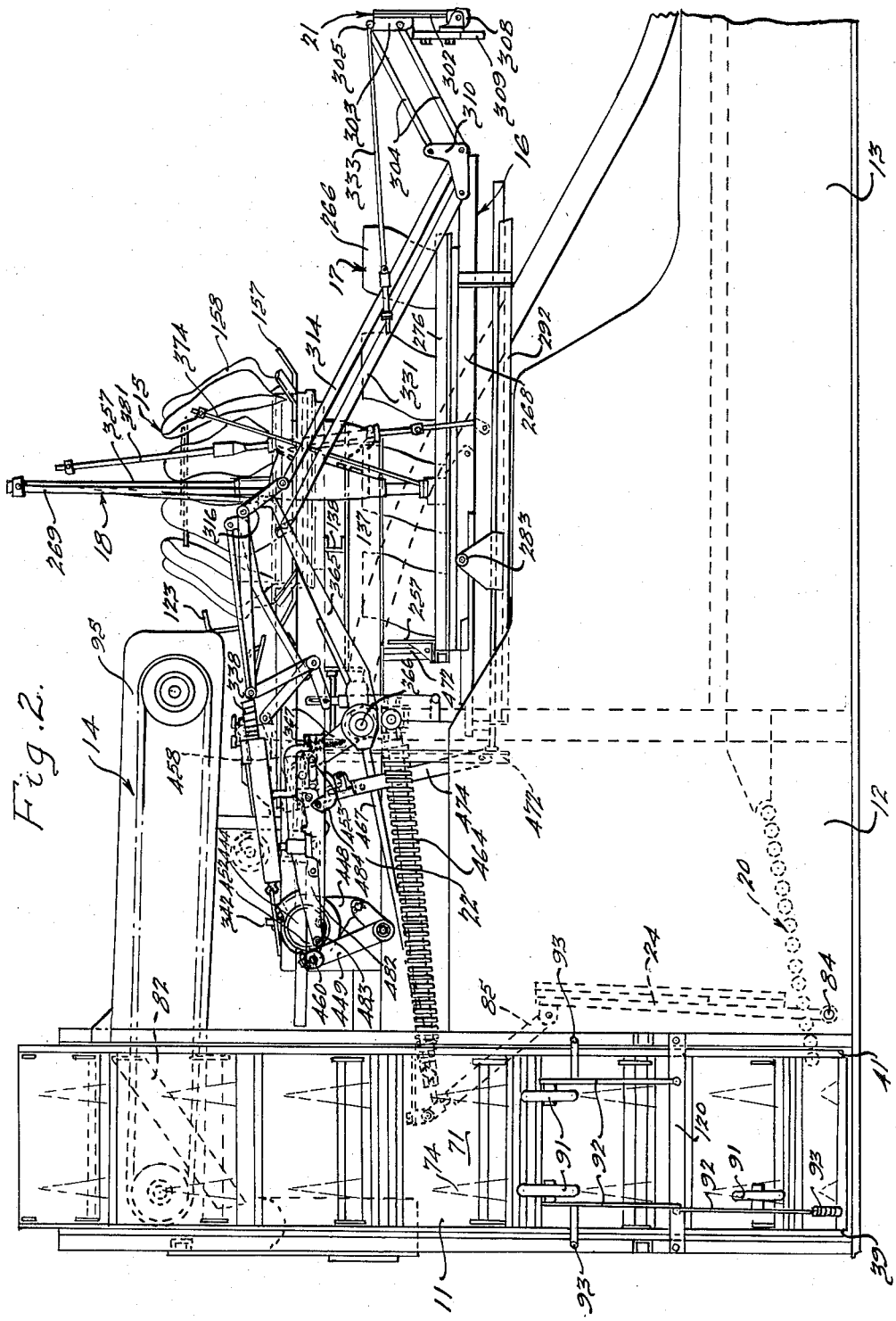
FIG. 2 is a view of structure, similar to that illustrated in FIG. 1, showing the opposite side thereof.
Figure 3:
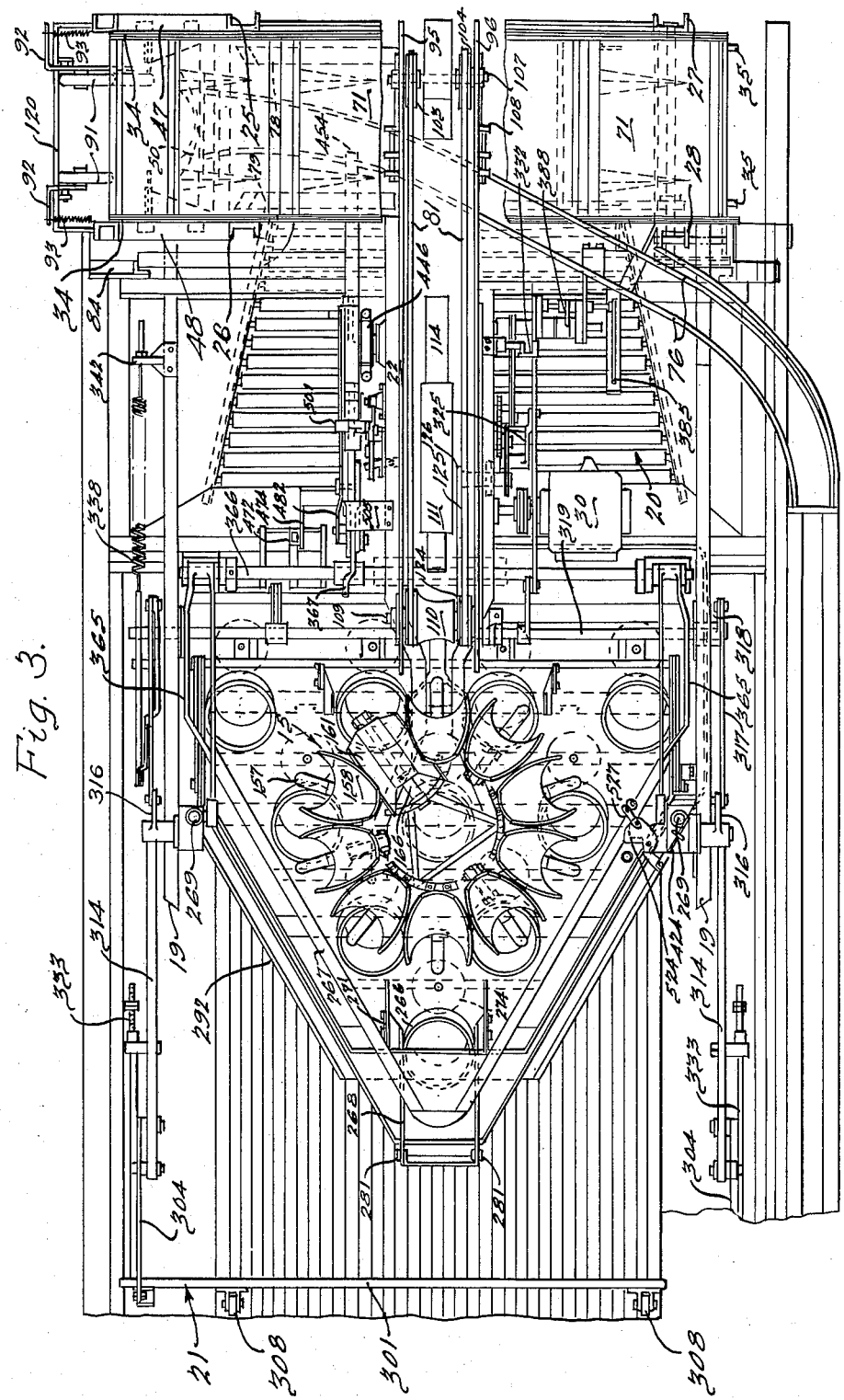
FIG. 3 is a plan view of the machine illustrated in FIGS. 1 and 2.

Referring to FIGS. 1, 2, and 3, the bowling machine of the present invention embodies a ball and pin lift 11 at the rear of the pit 12 of a bowling alley 13. The pin and ball lift 11 delivers pins to a pin delivering mechanism 14 that directs pins seriatim to a turret type distributor 15 which receives and supports nine pins in circular arrangement, with the pins disposed head up at an angle to the vertical. A central opening through the distributor 15 is provided for receiving a tenth pin from the delivery mechanism in position to set upon the number 5 spot of the alley. Beneath the distributor a setting rack 16 is provided, having a plurality of pin receiving cups 17 thereon in position to receive the nine pins from the periphery of the distributor 15 and the tenth pin which passes centrally therethrough. A rack supporting mechanism 18 is mounted upon supporting channels 19 and constructed to raise and lower the setting rack 16 toward and away from the alley bed. A guard and sweep mechanism 21 is mounted upon the supporting channels 136 and 137 for movement onto the alley bed and toward and from the pit beneath the rack for guarding the rack, for sweeping deadwood into the pit 12, and for preventing pins from moving forwardly on the alley.

A gear box driving mechanism 22 is mounted upon the supporting channels mounted on channels 136 and 137 and is driven by a belt 23 from a driving motor 30. The gear box provides power for raising and lowering the rack, for operating the trays thereon, for raising and lowering and operating the sweep 21, for rotating the distributor, and for driving the pin delivering mechanism 14. A pin and ball advancing mechanism 20 is mounted in the bottom of the pit for aiding in the fast delivery of the pins and balls to the pin and ball lift 11. A ball and pin striking cushion 24 is mounted in the pit for operating certain controls, as will be explained in detail hereinafter.

Pin and ball lift

The pin and ball lift mechanism 11, as illustrated in FIGS. 1 to 20 inclusive, embodies channel section uprights 25 and 26 located at the right-hand side of the machine and uprights 27 and 28 located at the left-hand side of the machine, as viewed from the rear thereof. The uprights are secured to transverse channel members 29 of the supporting frame and are attached by angle brackets 31 to the floor 32. A channel member 33 braces the uprights near the top, and bars 34 connect the top portions of the pairs of uprights 25 and 27 and 26 and 28. Sprocket wheels 35, 36, 37 and 38 are mounted on shafts which are bearinged on the uprights near the top and bottom thereof, as illustrated more specifically in FIG. 4. The sprocket wheels are mounted between the uprights and are employed for supporting and driving chains 39 and 41 at opposite sides of the conveyor mechanism. Sprocket wheels 42 are supported on the supporting bars 34 for engagement with the sprocket chains 39 and 41. A pair of sprocket wheels 43 is mounted on supporting brackets 44 attached to the uprights 25 and 26. Pairs of sprocket wheels 45 and 46 are journaled in bearings secured to angularly disposed channel elements 47 and 48 mounted on the uprights 25 and 26.

The sprocket wheels 35 and 38 provide a straight downward path for the chains 39 and 41 at the left-hand side of the machine. Sprocket wheels 35 and 36 provide a horizontal path from left to right at the bottom of the pit. Sprocket wheels 36, 46 and 45 provide an angular travel to the right and upward for the chains, and sprocket wheels 45 and 43 provide a vertical upward path for the chains. Sprocket wheels 43 and 37 provide an upward angular path for the chains toward the left, as viewed in FIG. 4, while sprocket wheel 42 provides an upwardly sloping path for the chains at the top of the assembly and the sprocket wheels 42 and 38 provide a downwardly sloping path therefor. The chains have a plurality of pin and ball carriers 52 which are curved upwardly when the carriers are at the right side of the machine. The carriers have a nonmetallic strip 53 riveted or otherwise secured on the outer edges thereof and have right-angle flanges 55 to which outwardly extending arms 56 are secured at each side. The arms 56 are secured at one end to laterally extending flanges 57 on certain of the chain links by suitable means, herein illustrated as by rivets 58. The opposite ends 59 of the arms 56 are free but are positioned to strike a resilient pad 61 of leather, rubber, plastic or the like, which is attached to flanges 57 of other of the chain links. A similar flange 57 supports a rod 62 which extends through a hem 63 of a strip of canvas 64, the hem 65 on the opposite edge receiving a rod 66 which is secured by rivets 67 or other suitable means, to the carrier 52. The end 59 of the arms 56 prevents the counterclockwise rotation of the carrier, while the strip 64 prevents the clockwise rotation thereof and the pins from jamming between the carriers in the vicinity of the sprockets 36, 45 and 46. The extending flange 55 supports a rod 68 which is riveted or otherwise secured thereto for the purpose of securing a hem 69 of a canvas strip 71 thereacross, the opposite hem 72 of the strip being secured by a rod 73 attached to a flange 57 of the link by rivets 58.

Figure 6:
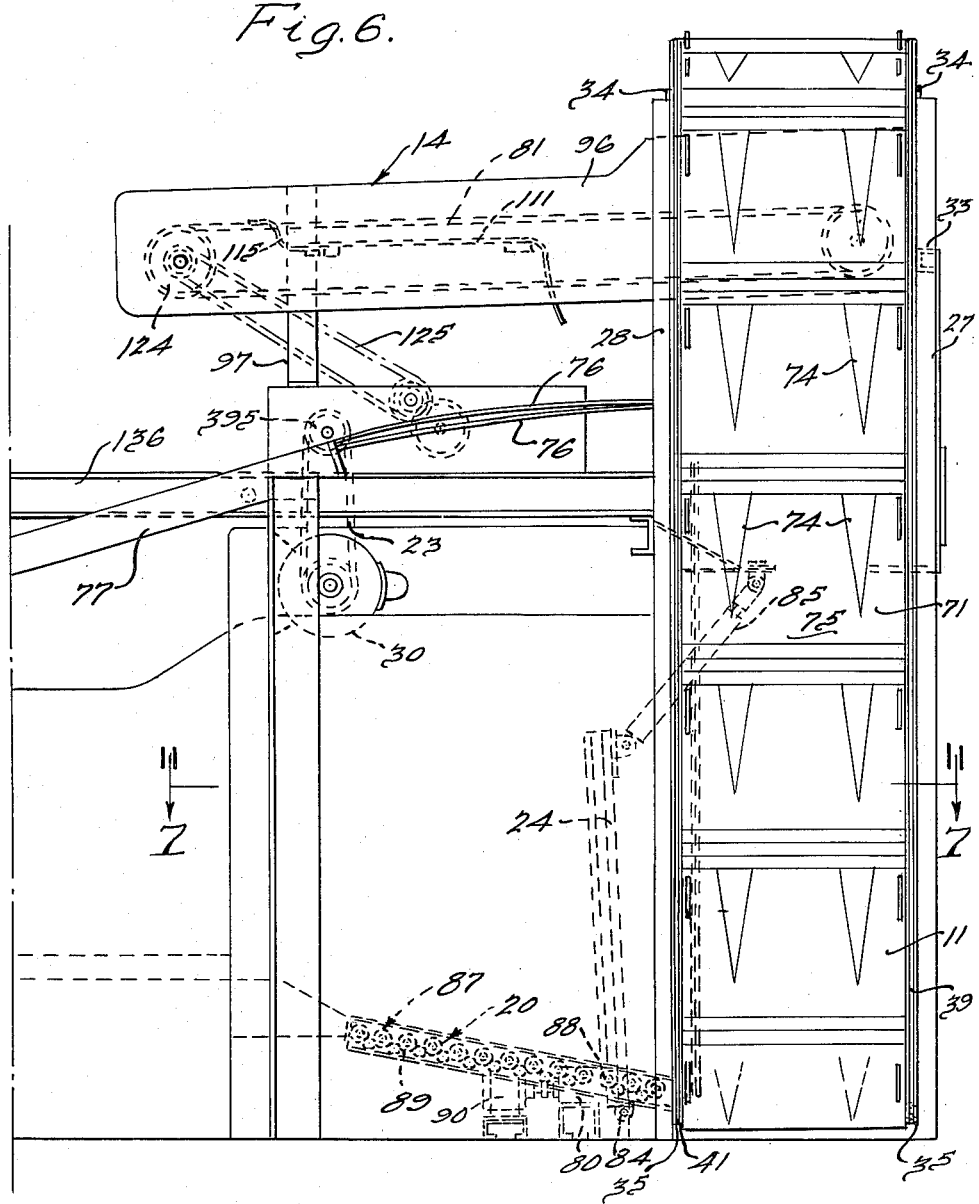
FIG. 6 is an enlarged side view of the machine illustrated in FIG. 1.
Figure 7:
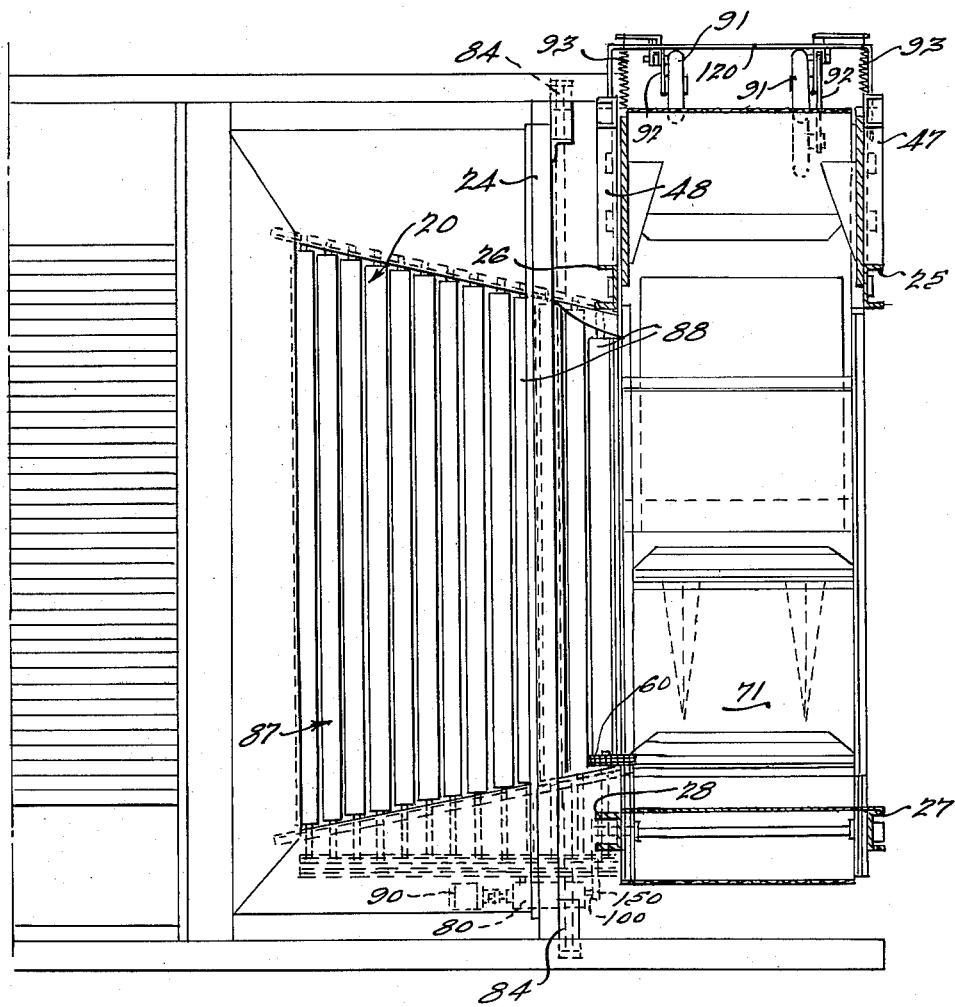
FIG. 7 is a sectional view of the machine illustrated in FIG. 6, taken on the line 7—7 thereof.
Figure 8:
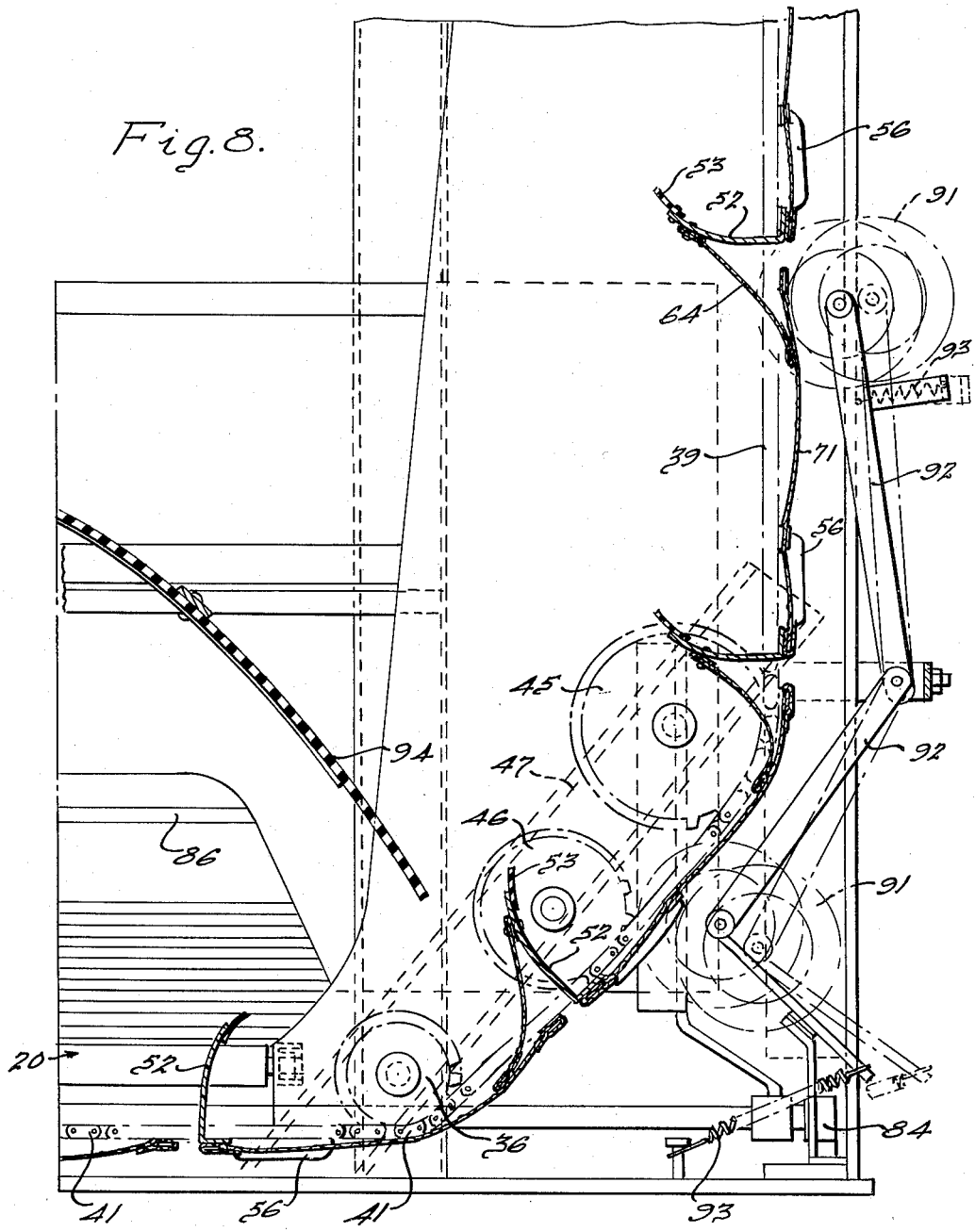
FIG. 8 is an enlarged, broken view of the lower right-hand corner of the structure illustrated in FIG. 4.
Figure 9:
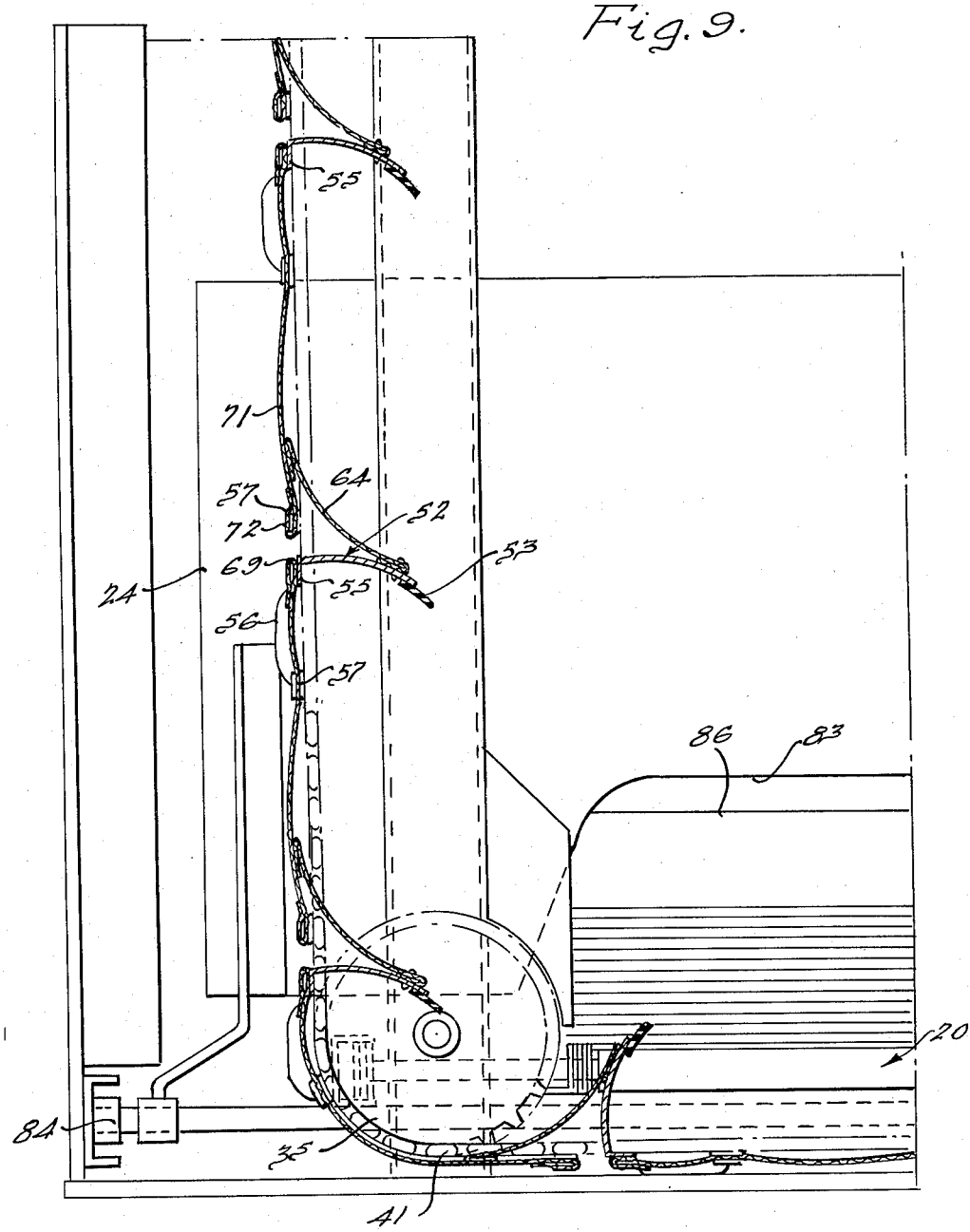
FIG. 9 is an enlarged broken view of the lower left-hand corner of the structure illustrated in FIG. 4.
Figure 10:
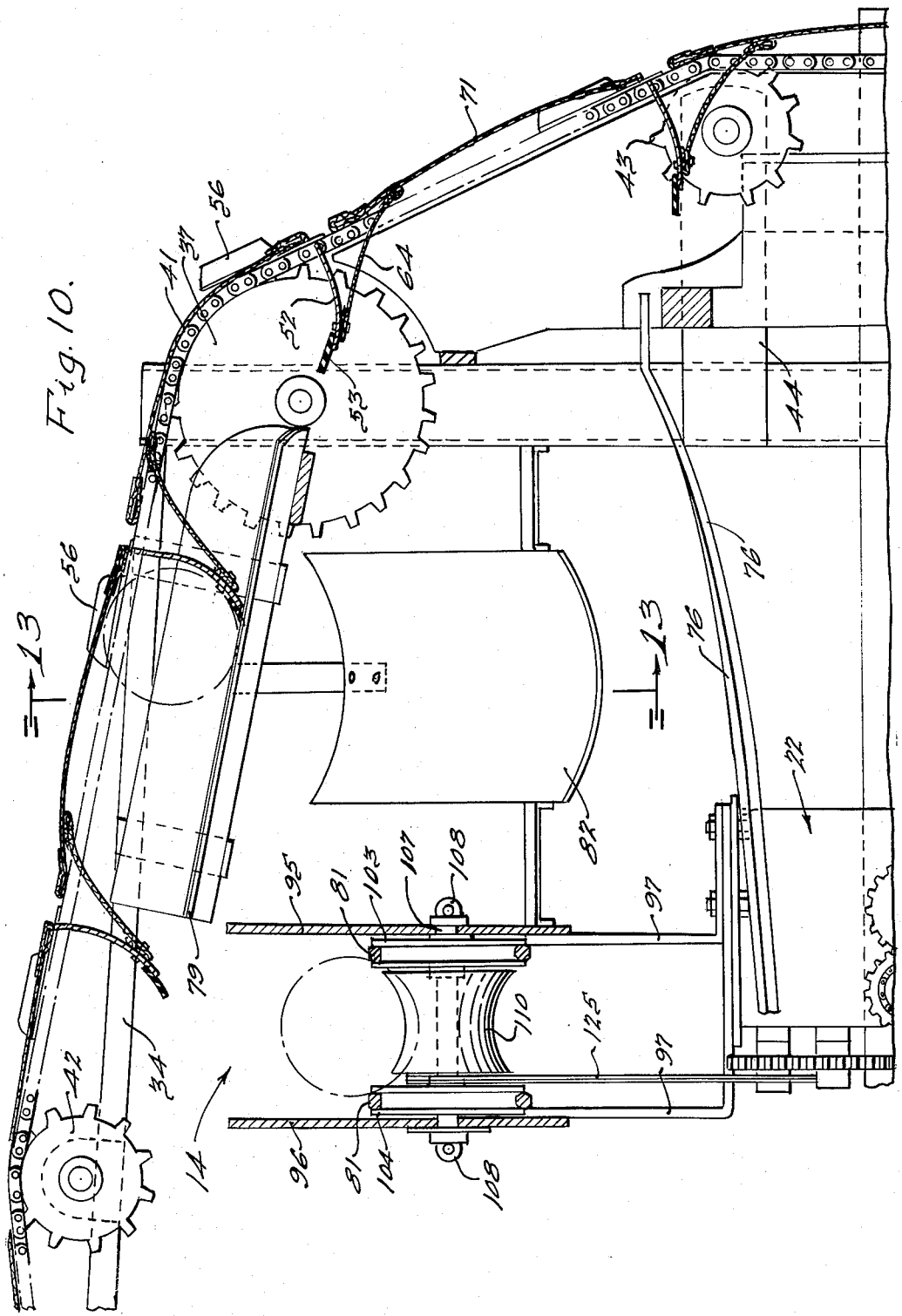
FIG. 10 is an enlarged broken view of the upper right-hand corner of the structure illustrated in FIG. 4.
Figure 11:
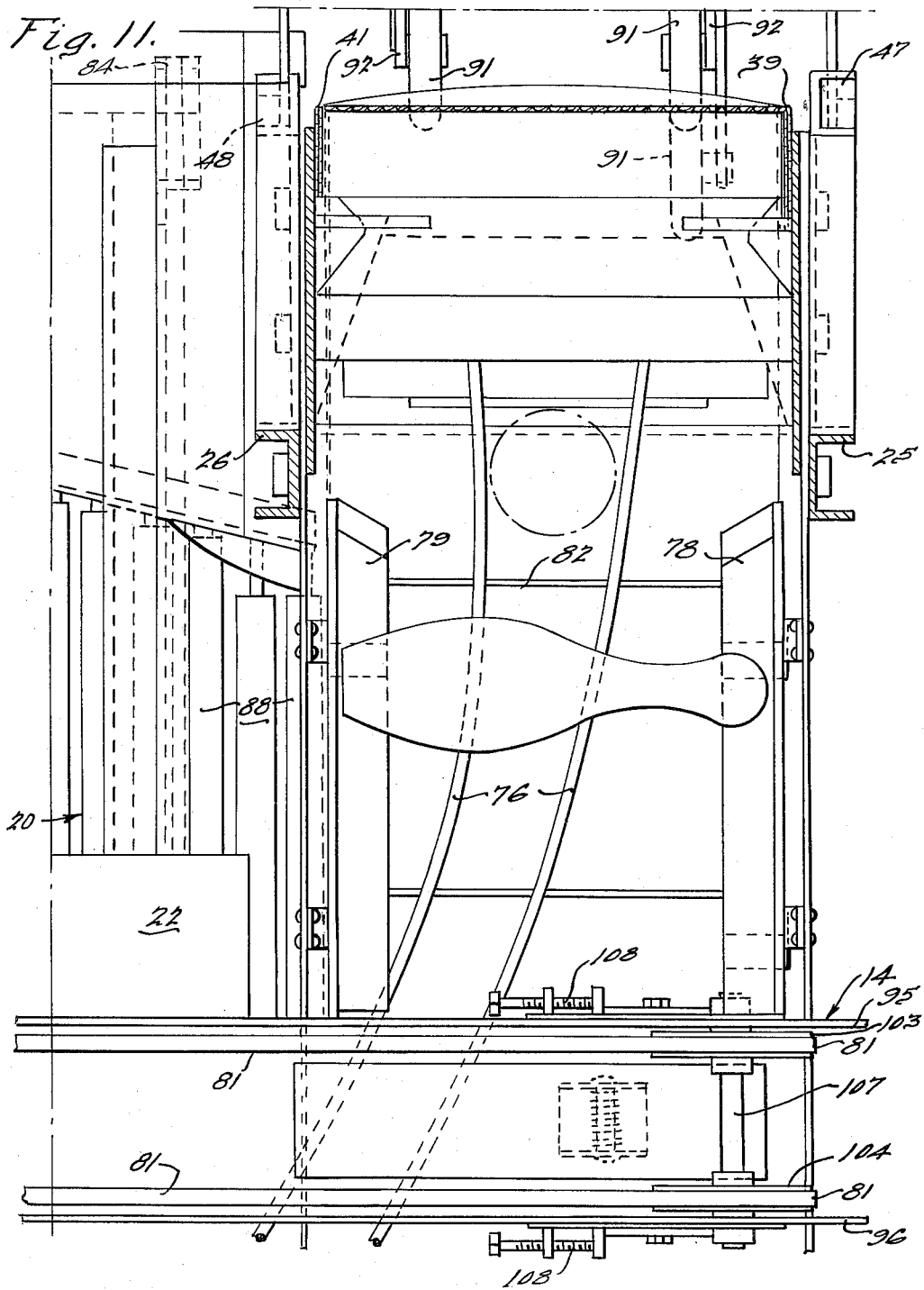
FIG. 11 is an enlarged, broken sectional view of the structure illustrated in FIG. 4, taken substantially on line 11—11 thereof.
Figure 12:
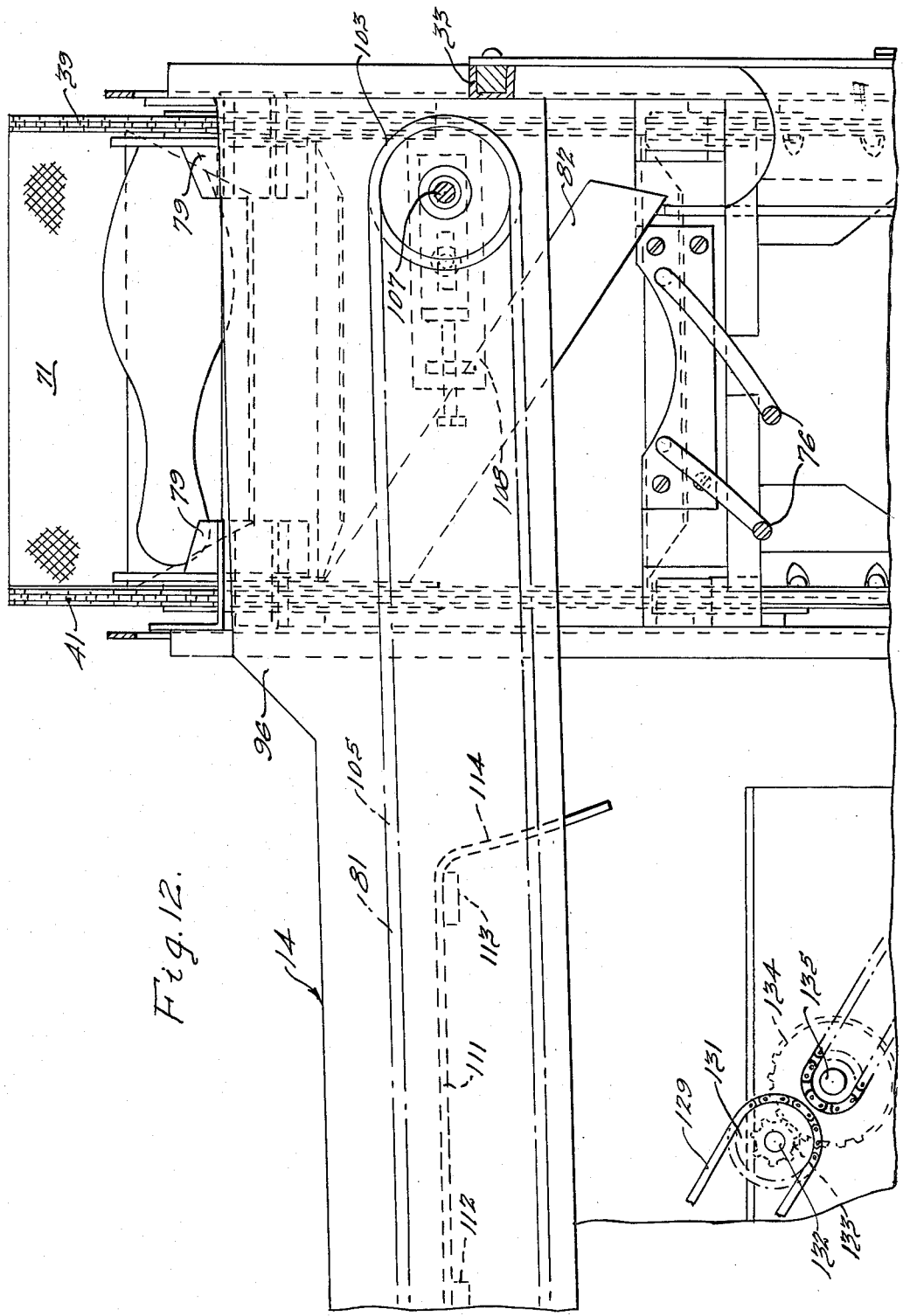
FIG. 12 is an enlarged, broken view of the structure illustrated in FIG. 6.
Figure 13:
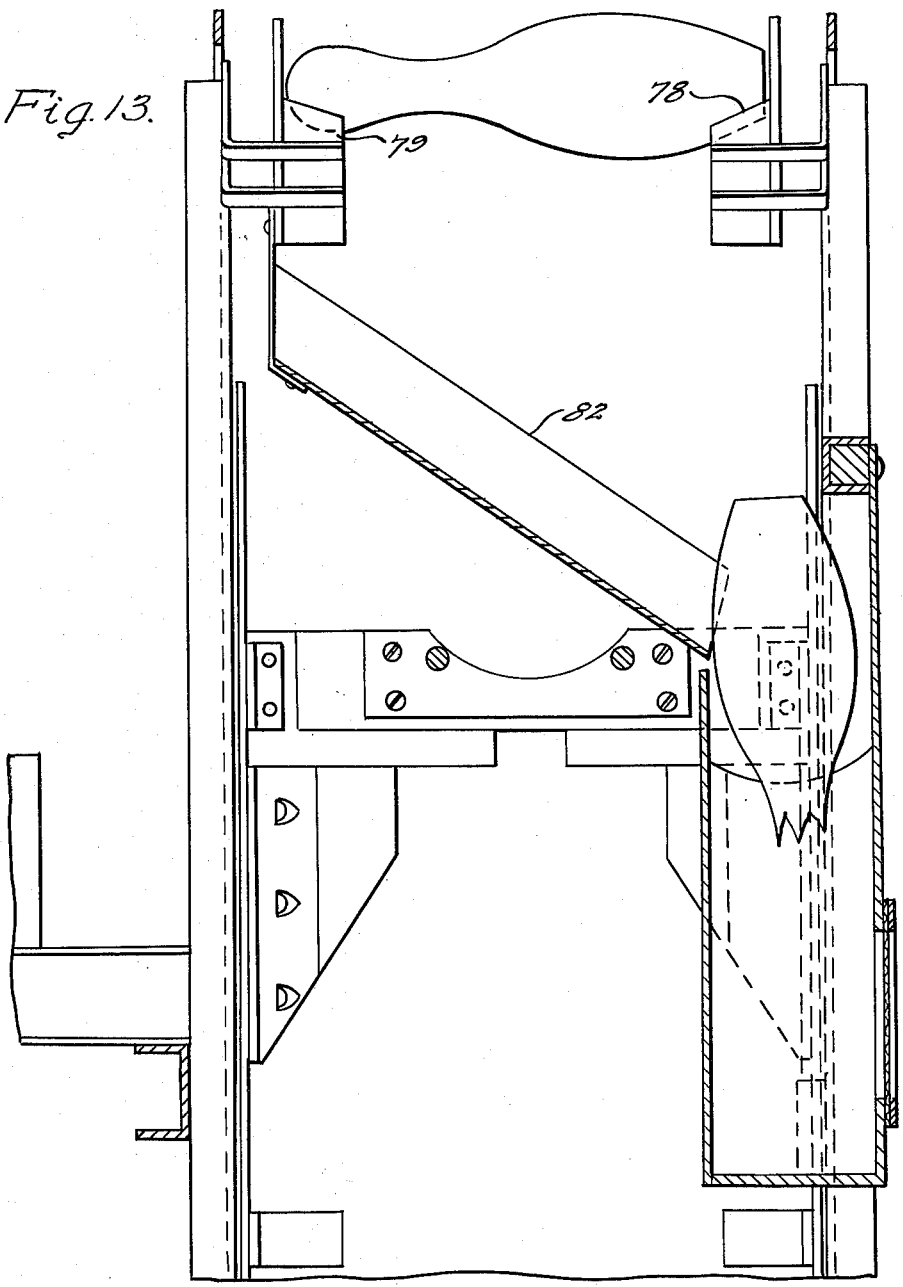
FIG. 13 is a broken sectional view of the structure illustrated in FIG. 10, taken on the line 13—13 thereof.
Figure 14:
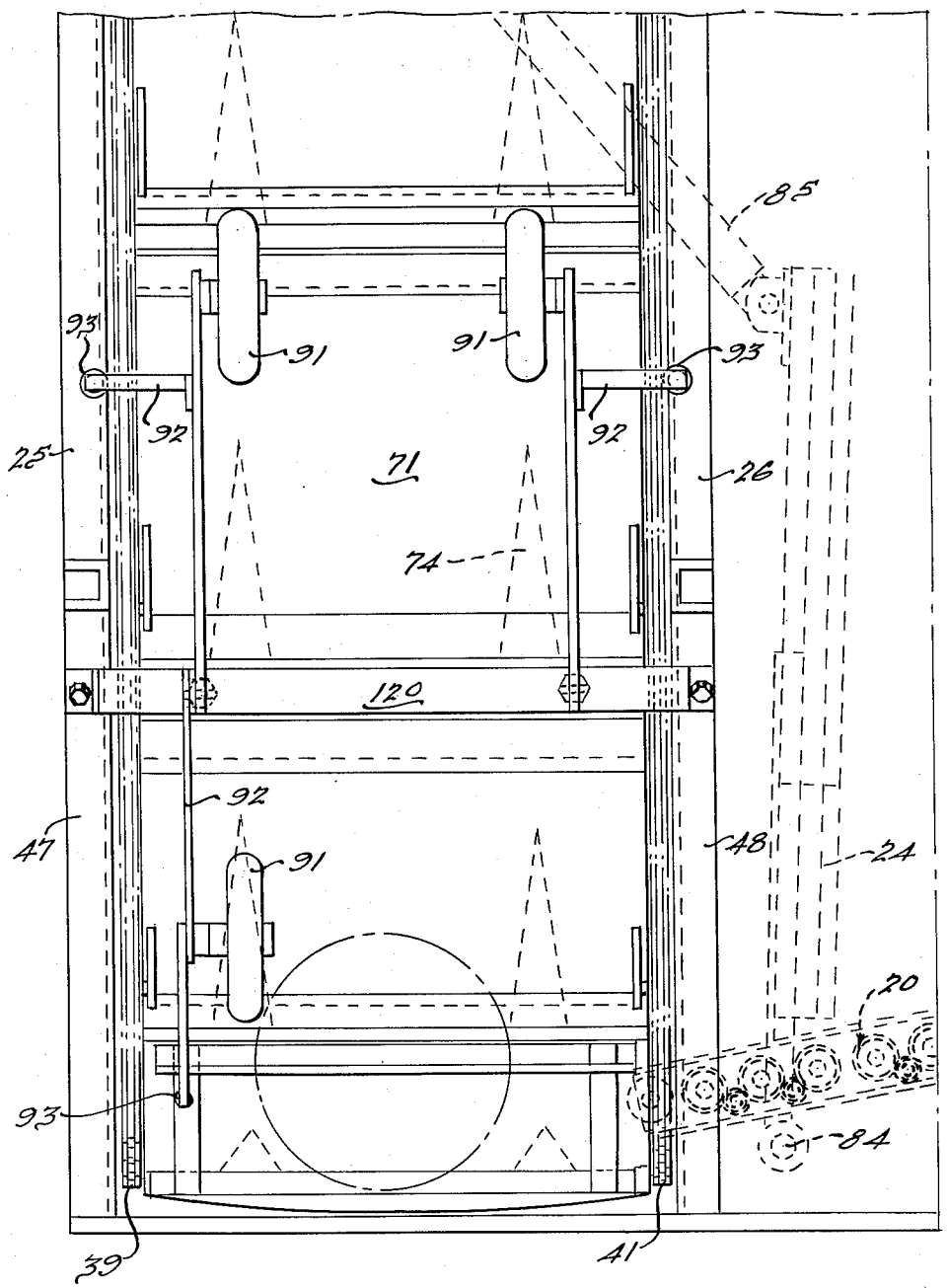
FIG. 14 is a broken view of the structure illustrated in FIG. 4, as viewed from the right-hand side thereof.

As will be noted in FIG. 6, the top edge of each canvas strip 71 is pleated at 74 to provide fullness near the bottom at the point 75 to permit the canvas to pocket outwardly when the carrier 52 supports a bowling ball. A notch 50 is provided in the flange 55 (see FIG. 16) for centering the ball on the carrier and to permit its pocketing into the canvas. The chains between the sprockets 43 and 37, as pointed out hereinabove, slope to the left from the vertical so as to change the center of gravity of the ball relative to the carrier and to cause it to roll from the carrier and be delivered onto a pair of spaced rods 76 which deliver the ball to a ball return rack 77. The pins, when raised by the carriers, are delivered between the sprockets 37 and 42 onto a pair of spaced supporting members 78 and 79, on either of which the head or butt may engage. The carriers 52 advance the pins off of the supporting elements 78 and 79 and onto a pair of spaced belts 81 of the pin delivering mechanism 14. Beneath the supporting elements 78 and 79, a broken pin ejector chute 82 is provided onto which broken pins will fall from the supporting elements 78 and 79 and be directed away from the machine. When a pin is split lengthwise, such a pin will fall from between the belts 81 in the pin delivering mechanism.

The cushion 24 at the back of the pit has an opening 83 therein through which the pins and ball pass onto the conveyor. The cushion is supported at each side on pivots 84, and a hydraulic shock absorber 85 supports the top end of the cushion, permitting a backward and forward movement thereof. Near the top of the opening 83, a laterally extending pivoted bar 86 is provided, of a height to cause the bar to be struck by a ball passing from the pit onto the conveyor. The bar 86 operates a limit switch for starting the operation of the pin resetting mechanism immediately after the ball passes into the pit.

Figure 4:
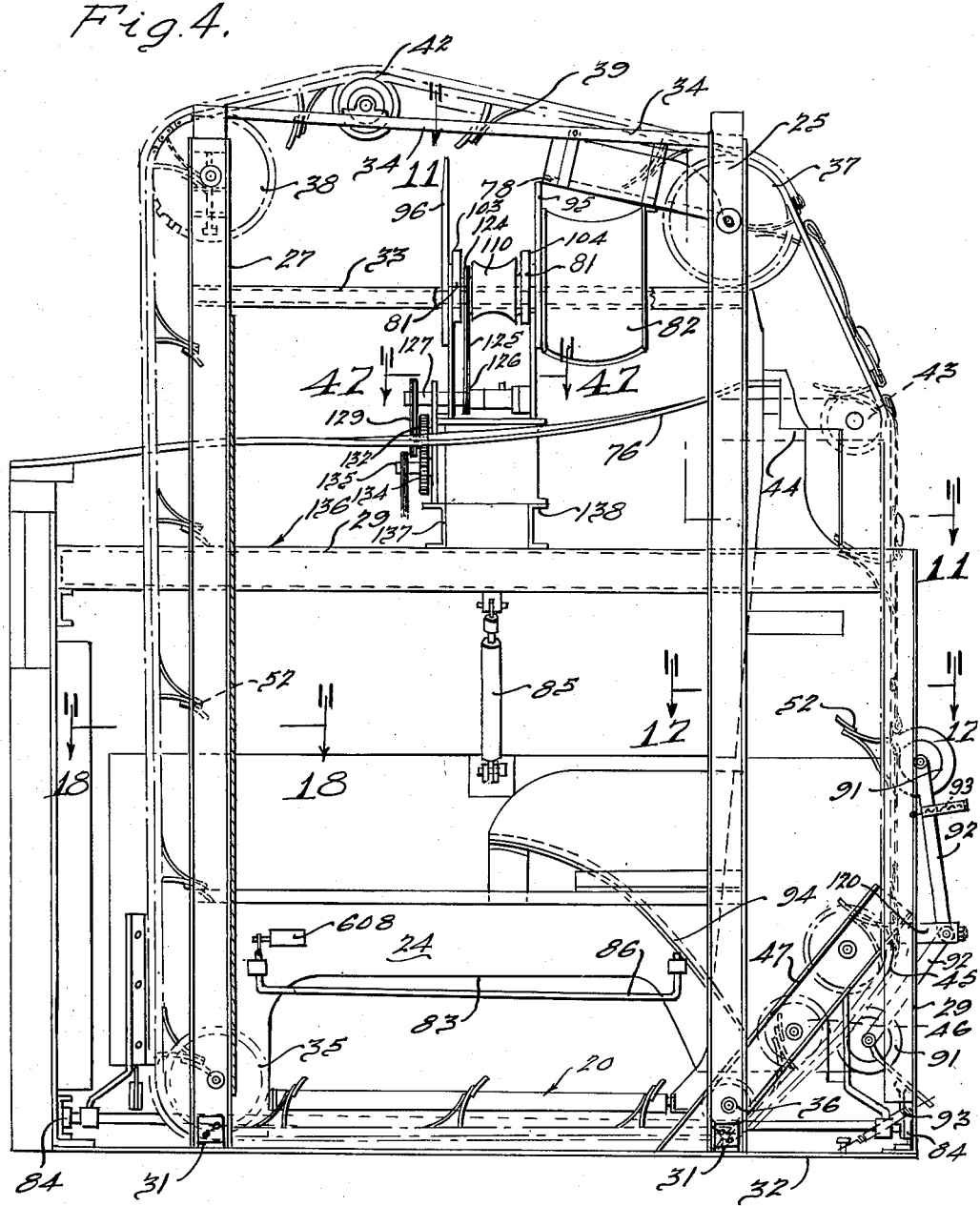
FIG. 4 is a rear end view of the machine illustrated in FIG. 1.
Figure 5:
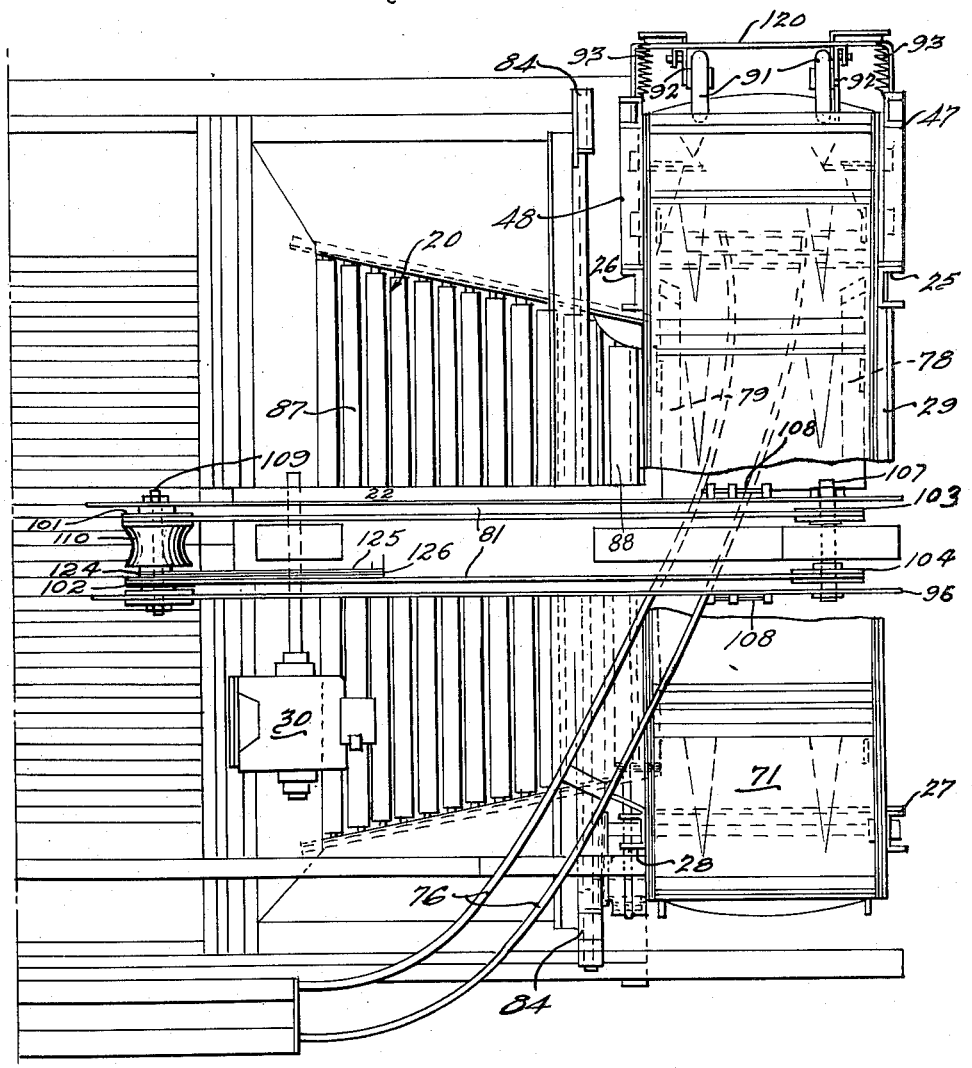
FIG. 5 is an enlarged plan view of the rear end of the machine illustrated in FIG. 1.

The pin and ball advancing mechanism 20 within the pit is made up of a plurality of rollers 87 which slope toward the opening 83, the first four rollers 88 of which travel at high speed in the order of 600 r.p.m. as compared to the driven speed of the remainder of the rollers 89 which are driven at a substantially lower speed in the order of 60 r.p.m. As is evident from FIG. 18, the two rollers 88 adjacent to the pit are interconnected by a sprocket and chain drive 60, one of these rollers and the other two being connected by gears and driven by a shaft 70 from a gear box 80. The rollers 89 are interconnected by gears and are driven at the slower speed from a shaft 50 of the gear box 80 which is driven by a motor 90. A shaft 100, extending from the end of the gear box 80, drives through a chain and sprocket drive 150 to drive the shaft which supports the sprockets 35 of the ball and pin lift mechanism 11. The ball and pins in this manner are rapidly propelled onto the conveyor to reduce the time required to deliver a new set of pins to the pin distributor. In order to prevent the interlocking of the pins at the rear of the pit and to assure a single pin to be properly received and raised by the carriers 52, a plurality of wheels 91 are mounted, as illustrated in FIG. 4, at the lower portion of the conveyor in engagement with the canvas strips 71 thereof. The wheels are mounted on arms 92 pivoted to a bracket 120 which is supported on the channel elements 47 and 48. The arms 92 are biased by springs 93 to have the wheels apply a predetermined tension to the canvas, to thereby act as pushers for dislodging pins from pins properly engaged by the carriers. This assures an early and proper engagement of the pins with the carriers to aid in the rapid delivering of the pins to the delivering mechanism. A partition of rubber or like flexible material 94 is mounted across the pit for receiving the pins which are dislodged by the wheels 91 to interrupt their fall and direct them to the next adjacent carrier as it is moved upwardly by the chains.

*Pin delivering mechanism*

The pin delivering mechanism 14 comprises a pair of side walls 95 and 96 supported on brackets 97 on the top of the gear box mechanism 22. The side wall 95 is disposed adjacent to the pin supporting elements 78 and 79, while the side wall 96, of greater height, is spaced therefrom a distance substantially wider than the diameter of the pin. Pairs of spaced pulleys 101 and 102 at the forward end and 103 and 104 at the rearward end, support a pair of belts 81, in spaced relation. The pulleys 103 and 104 are mounted on a shaft 107 which is adjusted by suitable adjusting mechanism 108 for providing the proper tension on the belts. At the forward end a shaft 109, which supports pulleys 101 and 102, supports a toroidal-shaped element 110 therebetween over which the pins are delivered from the pin delivering mechanism 14. Between the walls 95 and 96, a platform 111 is supported on braces 112 and 113. The rear brace supports a resilient strip 114 of leather, rubber, plastic or the like, against which the heads of the pins strike as the pins are advanced in vertical position by the belts 81 toward the delivering end of the mechanism to cause the butts to advance ahead of the heads. The platform 111 maintains the pins substantially horizontal in butt-first relation as they are advanced to the end of the delivering mechanism.

The forward end of the platform 111 has a kick arm 115 mounted on a pivot 116 in engagement with a spring 117, which causes the arm to move upwardly after the butt end has passed thereover for flipping the head end of the pin upwardly into delivering position. To further aid in the delivery of the pin from the delivering mechanism, a pivoted control arm 118 is mounted on a bracket 119 which is engaged by an extension 121 of the arm 118 to limit the clockwise rotation thereof by a spring 122 after a pin has passed over the arm 118 guided between spaced fingers 123 thereon. The shaft 109 between the pulleys 101 and 102, as illustrated in FIGS. 45 and 46, has a sprocket wheel 124 secured thereto which is driven by a chain 125 from a sprocket wheel 126 mounted on a shaft 127. The shaft 127 also has a sprocket wheel 128 mounted thereon engaged by a chain 129 on a sprocket wheel 131 which is secured to a shaft 132. The shaft 132 has a gear 133 thereon driven by a gear 134 from a shaft 135 which is driven from the gear box 22, as will be explained hereinafter.

The gear box 22 which supports the pin delivering mechanism 14 is mounted on the pair of channel elements 136 and 137 as illustrated in FIG. 24. A pair of channel elements 138 is mounted transversely of the members 136 and 137 for supporting an inner bearing race 139. An outer bearing race 149 has a bevel gear 151 secured thereto. The bevel gear 151 is driven by a second bevel gear 153 mounted on a shaft 154 which is supported on a bracket 155 attached to the inner fixed race 139. A ring 156 is rotatably mounted upon the rotatable race 149, having thereon nine sloping outwardly extending fingers 157 which are aligned with nine annularly disposed, inwardly tilted pin-receiving cups 158. Three of the cups 158, indicated by numeral 159, are mounted for outward movement on the race 149. The nine cups 158 are spaced 36° apart, leaving one open space 161 which has its axis 36° either side of a cup 158. At this point an inwardly directed chute 162 is provided, as illustrated in FIG. 27, having mounted thereon an arm 163 pivoted on a pin 164 in position to be struck by a pin passing down the chute. A lever arm 165 is provided on the end of the arm 163 projecting downwardly from the chute. A deflecting element 166 is provided above the chute for aiding in directing the pin down the chute through the central opening 167 of the fixed race 139 and the supporting structure therefor.

In FIGS. 34 to 37 inclusive, the supporting and ejecting mechanism for the movable cups 159 is illustrated. In this arrangement, a pair of arms 168 is fixed to the back of the cup and is secured by pivots 169 to a pair of parallel arms 171 which are secured by pivots 172 on a bracket 173 secured to the rotatable race 149. A link 174 is secured by a pivot 175 to a bracket 176 fixed to the cup 159. The link 174 is pivoted to a link 177 having a bracket 178 thereon forming a slot 179 in which an operating rod 181 extends. The end of the link 177 is secured to the bracket 173 by a pivot 180. A finger 182, similar to the fingers 157, is secured on the pivot 175 and provided with a latching element 183. The latching element is engaged by a detent 184 mounted on a pivot 185 secured to the cup 159 and urged clockwise by a spring 186 into latching position to retain the finger 182 in position to engage a pin resting within the cup. The detent 184 has a rod 187 pivoted thereon in position to slide through an aperture in a bracket 141 on one of the rods 171. The rod 187 is provided with a stop element 188 which is disposed in position to be engaged by the bracket 141 on the rod 171 as the cup moves outwardly, to thereby raise the detent 184 from the latch 183 in the outermost position of the cup to thereby release the finger 182 and permit the pin to slide from the cup. A stop element 189 engages the cup 159 and limits the outward movement of the finger 182. A stop element 142 on the bracket 173 is engaged by link 177 and limits the outward movement of the cup 159. The rod 181 is secured to a pivoted block 191 that is secured to the rotatable race 149. The block 191 supports the rod 181 and a rod 192 at substantially right angles to the rod 181. The rod 192 extends through a slot in a bracket 193 mounted on the rotatable ring 156. When relative rotative movement occurs between the ring 156 and the rotatable race 149, the rods 181 and 192 are rotated about the pivot of the block 191 to have the rod 181 in the slot 179 actuate the link 177 from the position illustrated in FIG. 39 to the position illustrated in FIG. 34, to thereby move the cup 159 to its outermost position. Before reaching this position, the finger 182 is released to swing from engagement with the bottom of the pin, permitting the pin to slide from the cup.

Figure 44:
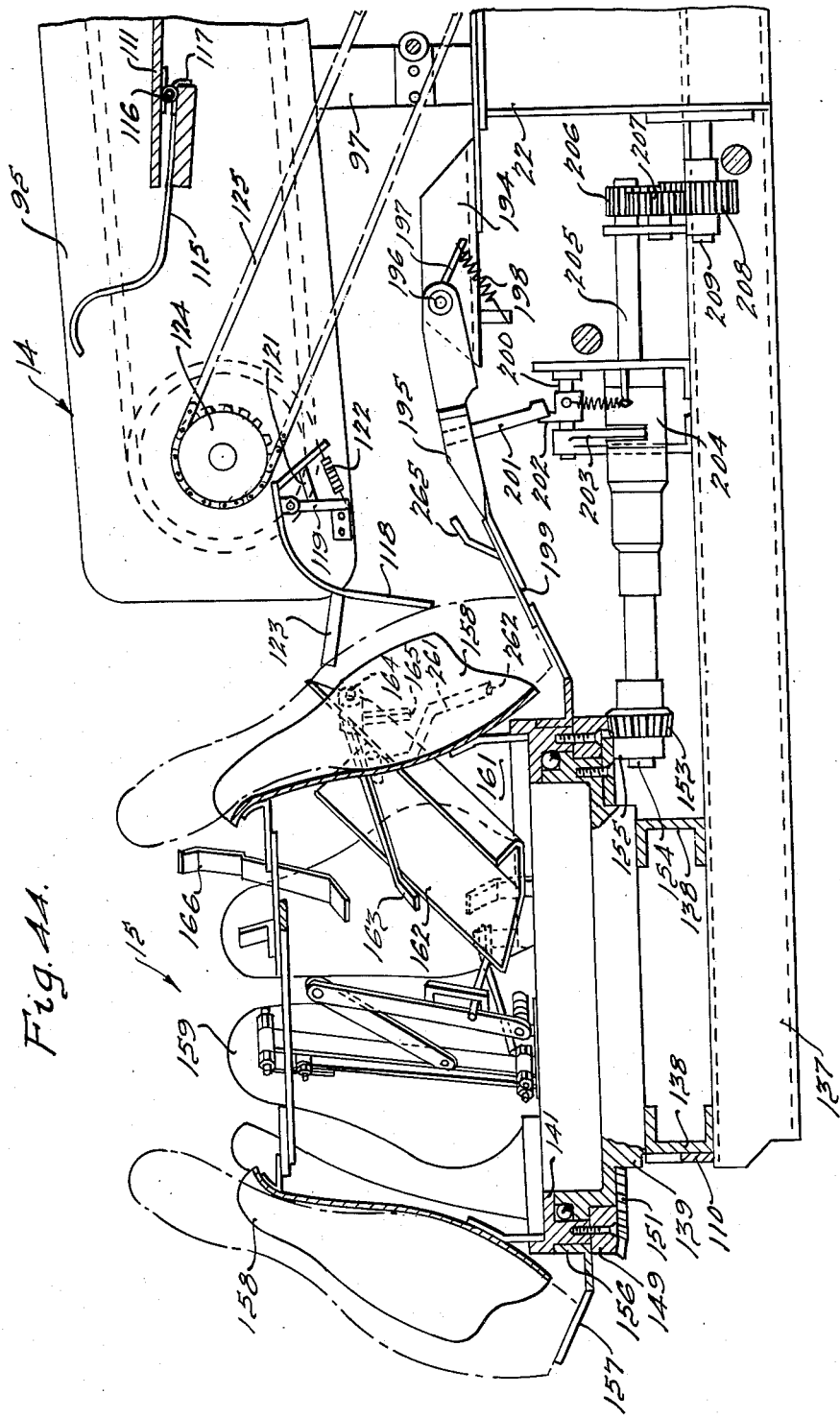
FIG. 44 is a view in elevation, with parts in section, of the structure illustrated in FIG. 26, shown with a pin delivered thereto.

A bracket 194 is mounted on the forward end of the gear box 22 on which an arm 195 is mounted by a pivot 196. The arm is biased in a clockwise direction by an arm 197 engaged by a spring 198. The forward end of the arm 195 has a platform 199 mounted thereon beneath the control arm 118, as illustrated in FIG. 44, in position to be engaged by the butt end of each delivered pin which rocks the arm 195 in a counterclockwise direction, as illustrated in FIG. 44. The arm 195 carries a finger 201 in position to engage an arm 202 on a shaft 200. An arm 203 on the shaft 200 engages a clutch 204 when rocked by the arm 202 upon the downward movement of the finger 201 and arm 195 to cause the gear 153 to be driven. The clutch provides a driving connection from a shaft 205 driven by a gear 206, from an idler gear 207 and a gear 208 on a shaft 209 extending from the gear box 22. As the gear 153 advances the rotatable race 149, the delivered pin is moved from the platform 199 which moves upwardly along with the finger 201 and the clutch 204 is disengaged by the released finger 203, thereby positioning the next adjacent cup 158 in alignment with the end of the pin delivering mechanism 14. In this manner, the cups 158, 159 are advanced until the nine pins are delivered thereto. The platform 199 is prevented from moving downwardly when the ninth pin rests thereon to prevent the further rotation of the race 149 and the delivery of the tenth pin from the delivery mechanism 14.

Figure 23:
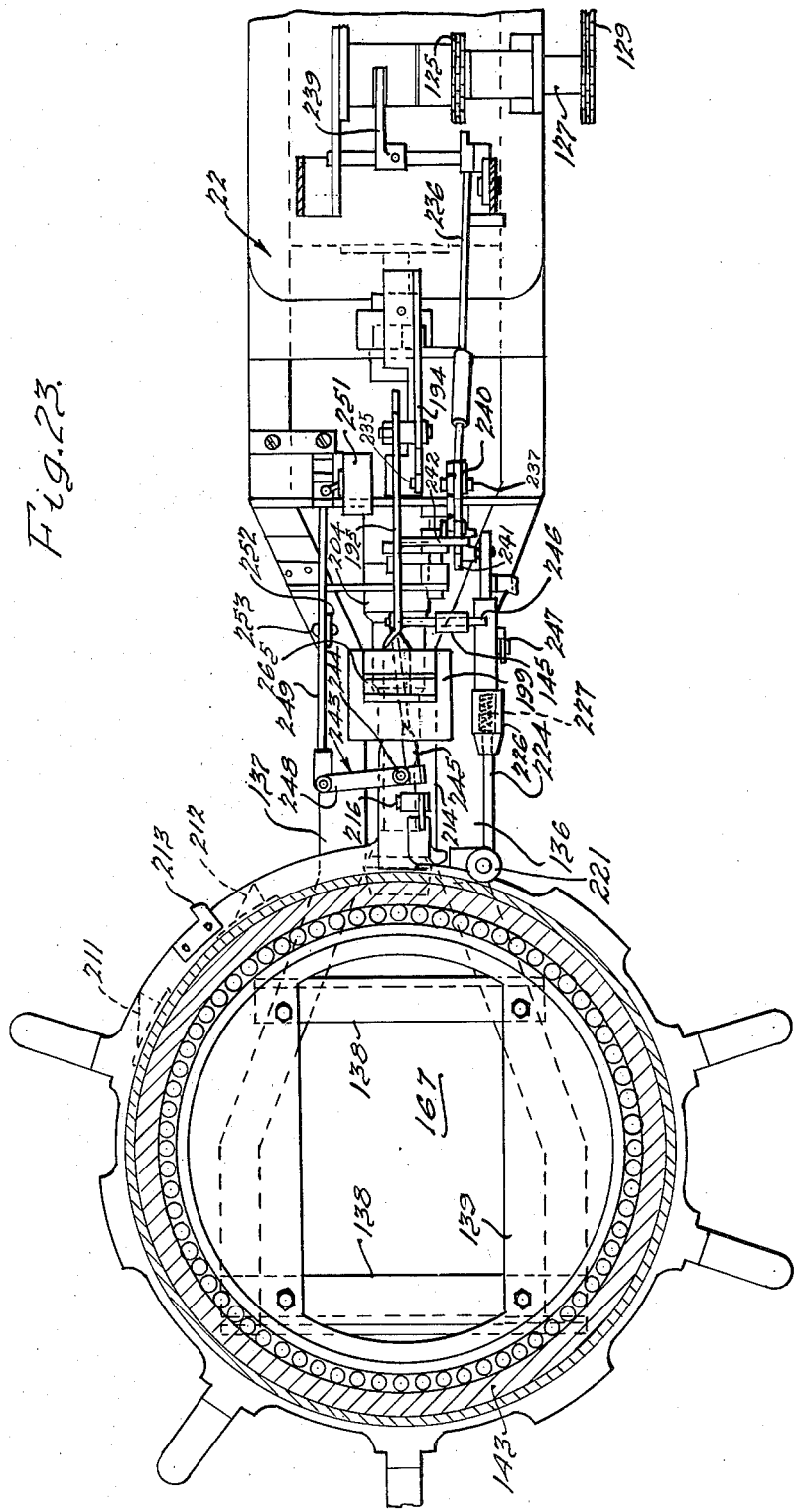
FIG. 23 is a sectional view of the structure illustrated in FIG. 1, taken on the line 23—23 thereof.
Figure 26:
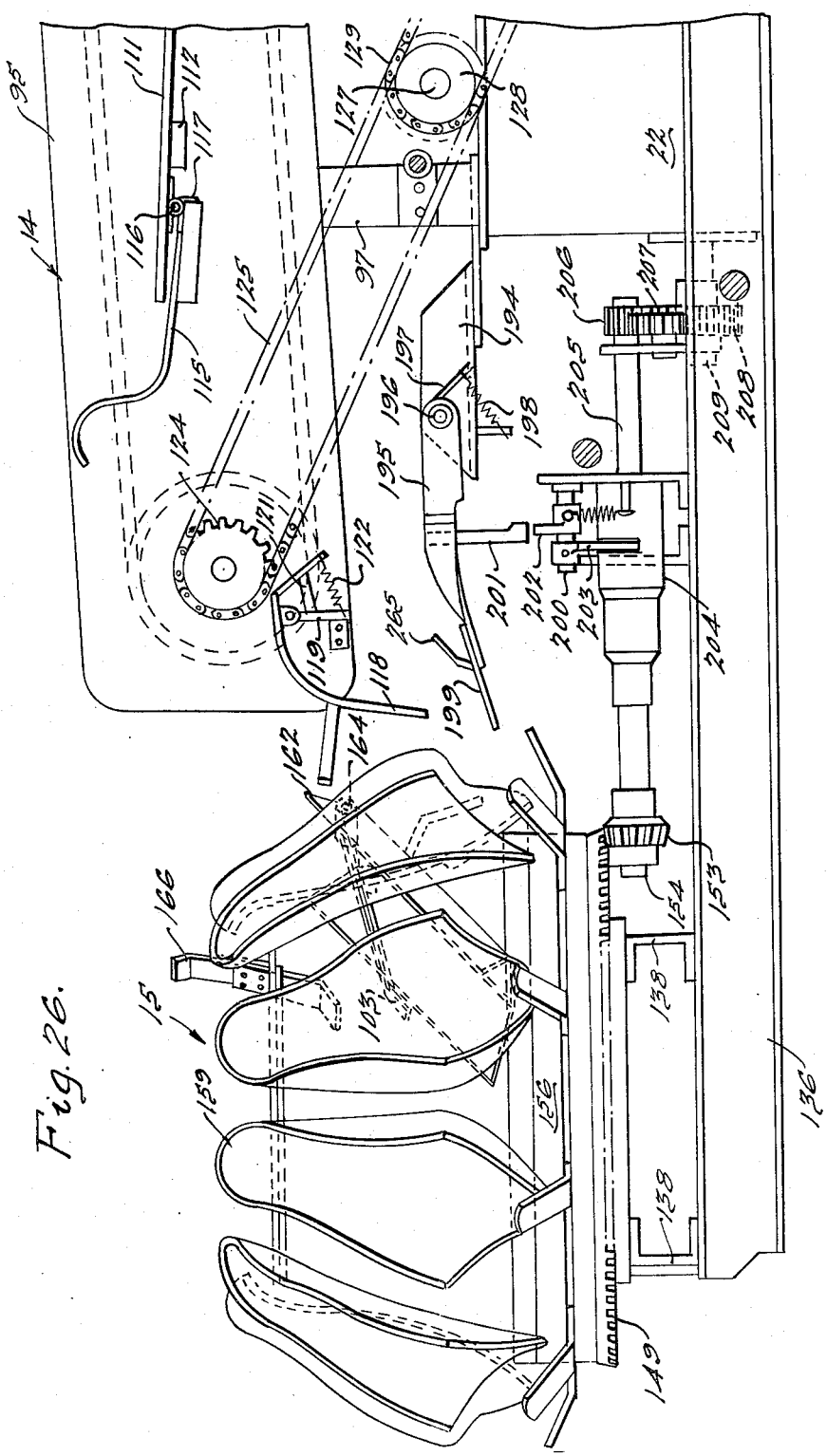
FIG. 26 is a view of the structure, similar to that illustrated in FIG. 24, with parts removed.

Referring more specifically to FIGS. 28 to 33, the rotatable race 149 has mounted thereon cams 211 and 212 in angularly and vertically spaced relation to each other, with a stop element 213 mounted therebetween on the ring 156. A supporting block 214 is mounted upon the angle frame members 136, 137 on which an arm 215 is secured on a pivot 216. The upper end 217 of the arm 215 is disposed in position to be engaged by the stop element 213 to thereby hold the ring 156 stationary as the rotatable race 149 is advanced to the next successive position. In this manner, the six fingers 157 are retained stationary as the cups 158 move therebeyond, moving the pins off of the fingers and permitting them to slide downwardly from the cups. During this movement, the three cups 159 are swung outwardly and the fingers 182 released, as pointed out above. Near the end of the advancing movement of the rotatable race 149, the cam 212 strikes a finger 218 projecting from the arm 215 and rocks the arm clockwise to move the stop portion 217 from engagement with the stop element 213, thereby to permit a spring 219, secured between the ring and the race 149, to return the ring to its initial position, with the fingers 157 aligned with the centers of the cups 158 and the fingers 182 secured in alignment with the retracted cups 159 which occurs due to the relative reverse rotation between the ring and race. Prior to the engagement of the stop element 213 with the stop portion 217 of the arm 215, the cam 211 engages a roller 221 supported on the end of a lever 222 which is secured by a pivot 223 to the channel element 136. The lever 222 is rocked clockwise and moves an arm 224 secured thereto by a pivot 225 lengthwise within a sleeve 226 into abutting engagement with a compression spring 227 mounted therein, as illustrated in FIG. 23. The opposite end of the sleeve is secured by a pivot 228 to a link 229 which is pivoted at 231 to a bracket 232. A laterally projecting arm 233 on the upper end of the lever 229 has a pin 230 thereon engaged in a slot 230A of a bell crank 234 which is mounted on a pivot 235. A telescoped rod 236 is biased by a spring 143 and is secured to the upper end of the bell crank 234 on a pivot 237, the opposite end being pivoted to an arm 238 for controlling the position of a clutch dog 239 which controls the driving of the sprocket wheel 126 which drives the chain 125 for operating the pin delivering mechanism 14. The spring permits the end of the rod to move after the dog 239 has been advanced to clutched position to eliminate the necessity for accurate adjustment. When the roller 221 is engaged by the cam 211, the lever 222 is moved clockwise, moving the lever 229 counterclockwise and the bell crank 234 clockwise to release the clutch dog 239 and moving the end portion 241 of the bell crank in position to be engaged by a finger 242 on the arm 195. When a pin drops upon the platform 199, the finger 242 striking on the projecting end 241 of the bell crank 234 causes the bell crank to rock in a counterclockwise direction, drawing the rod 236 to the left, as viewed in FIG. 24, which movement drops the clutch dog 239 downwardly into stop position, to thereby interrupt the pin delivering mechanism. When a separate motor is employed for driving the pin delivering mechanism, a switch is operated by the engagement of the finger 242 with the projecting end 241 to interrupt the flow of the current to the motor. When in this position, the pin receiving tray of the rack is full of pins, as well as the cups 158 and 159 of the pin delivering mechanism. A bell crank 243 (FIG. 23) is pivoted upon the supporting block 214 on a pivot 244, one arm 245 of which supports a rod 246 for lengthwise movement in an aperture of a supporting block 145 in position to engage a pivoted finger 247 mounted upon the sleeve 226 for preventing the counterclockwise movement of the link 229 while permitting the clockwise movement of the link 222 by having the rod 224 actuated thereby compress the spring 227 and thereby prevent the stopping of the pin delivering mechanism. This is desirable when the rack is empty so that pins will be continuously delivered to the cups 158 and 159. The arm 248 of the bell crank 243 operates a rod 249 which actuates a micro switch 251. The rod 249 has an actuating rod 252 secured thereto by a pivot 253. The actuating rod 252 is secured to the channel element 137 by a pivot 254 and has the lower end formed inwardly at 255, as illustrated in FIG. 25. A rod 256, having its end bent at 255 as illustrated more specifically in FIG. 43, is secured directly to the rod portion on the end of the sleeve 226 to move therewith when the sleeve is actuated by the clockwise movement of the link 222. When the rod 256 is moved forwardly by the plate 257 when the plate is aligned with the end 255, the link 229 is moved clockwise compressing the spring 227 and releasing the platform 199. The rod 249 is moved to the left, as viewed in FIG. 24, when the rod 256 is moved toward the right by the plate 257 pivotally carried by a tray 267 on the setting rack 16 as the tray 267 moves to the right near the end of the upward movement of the rack 16. The plate 257 strikes the ends 255 of the arms 252 and 256 near the end of the upward and forward movement of the tray on which the plate is pivoted when at a level beneath that shown in FIG. 25, to carry the rods forwardly along therewith. At the final upward movement of the rack, the plate 257 is above and clears the ends 255 so that the rods 252 and 256 are thereafter free to move in the opposite direction. The bell crank 234 is moved to its original position by the movement of the rod 252 returning the rod 246 from a position of engagement with the finger 247 on the sleeve 226 permitting the sleeve thereafter to actuate the link 229. After all of the nine pins have been delivered into the cups 158 and 159, and with the chute 162 in position to be advanced to a position at the end of the pin delivering mechanism 14 to receive the next pin to be delivered, and with the dog 239 in lowered position, as illustrated in FIG. 24, and with the pin receiving tray full of pins, the pin delivering mechanism is in "stop" position.

Upon the delivery of the pins by the rack to the alley bed, the movement of the arms 252 and 256 by the plate 257 rocks the link 229 clockwise and moves the dog 239 to latched position and the projecting element 241 moves from a position of engagement with the finger 242. This permits the weight of the ninth pin resting upon the platform 199 to move the arm 195 downwardly, thereby to have the finger 201 engage and rock the arms 202 and 203, to thereby engage the clutch 204, as pointed out hereinabove. This advances the chute 162 in position to receive the next pin to be delivered and direct it through the center of the pin distributor 15 onto the receiving rack at a point which corresponds to spot five position on the alley. As the pin passes over the tray 162, the arm 163 moves downwardly about the pivot 164, moving the angle-shaped rod 261 downwardly therewith to cause the end 262 thereof to strike the platform 199 and rock the arm 202 to engage the clutch 204 and index the table to advance a cup 158 to the end of the pin delivering mechanism 14. The rod 261 is secured to the arm 163 by a pivot 263, the opposite end being guided through an aperture in an arm 264. An arm 265 is mounted on the platform 199 for preventing the butt end of the pin from moving rearwardly on the platform. When the pins are ejected from the cups 158 and 159, they are directed into sleeves 266 which are made of plastic, rubber or other sound-deadening type of material, or a composite of metal and such material.

The sleeves 266 are carried by a tray 267 which is mounted upon a rack frame 268 which is carried on a pair of rods 269. The tray 267 is supported on the rack frame 268 by four links 270 which are pivoted on brackets 271 on the tray for forward and rearward movement relative to the frame. Adjacent to each of the sleeves 266, brackets 272 are mounted on the tray 267 for supporting rods 273 in vertical position, having thereon pressure plates 274 which are biased downwardly by springs 275 disposed about the rods. A layer of sponge rubber or other like material 276 is secured to the bottom side of the plates 274. The frame 268 is provided with cross members 277, having arcuate recesses 278 therein in position to retain the pins in the sleeves, as illustrated in FIG. 82, and permit them to slide from the sleeves in the direction of movement of the tray 267 into setting position.

A forked finger supporting tray 279 is carried by rollers 281 on a forward projecting track 282 of the frame 268 and by rollers 283 on track portions 284 of the frame 268, as illustrated in FIG. 84. As illustrated in FIGS. 95 and 98, the tray 279 carries ten forked fingers 285 secured on pivots 286 having an arm 287 fixed thereto and biased by springs 288 to center the forked arms relative to the pin spots. The ends of the forks have cam portions 289 for pivoting the arms in a position to have a pin engage in a slot 291 thereof when the tray is advanced relative to the frame. This pick-up arrangement between the fingers 285 and the pressure plates 274 is illustrated, described and claimed in the patent issued to Ernest Hedenskoog, No. 2,531,429, issued November 28, 1950, and will not be described herein in detail.

A bottom plate 292 is carried by the bottom of the frame on arms 293 which are secured to the frame 268. The plate has a plurality of openings 294 therein which align with the pin spots on the alley. The edges of the openings are provided with downwardly projecting flanges 295 having saw teeth 296 on the edge thereof. The flange and saw teeth are described and claimed in the copending application of Ernest Hedenskoog et al., Serial No. 333,898, filed January 29, 1953, for Control for Bowling Pin Resetting Machine, now Patent No. 2,723,123, issued November 8, 1955, and will not be described further herein in detail. Pads 297 are provided on the bottom of the plate 292 for engagement with the alley, for the purpose of preventing the teeth 296 from moving into engagement therewith.

When the pins are released from the cups 158, they slide directly to the circularly located sleeves 266. The pins in the cups 159 are ejected outwardly from the pin delivering mechanism and directed into the sleeves 266 corresponding to the number 1, 7 and 10 positions. The pin which is delivered to the center of the pin distributor 15 passes into the central sleeve 266 corresponding to the 5 spot position. In this manner, the sleeves 266 of the rack are simultaneously loaded with the ten pins required for the pin setting operation.

The sweep mechanism 21, as illustrated in FIGS. 1 to 3, comprises a sweep element 301 which extends across the alley bed, supported on brackets 302 from spaced bosses 303 which are secured to a pair of parallel arms 304 by pivots 305. Casters 308 are supported at each end of the sweep element, disposed in position to engage the alley bed, while wings 309 extend downwardly at each end of the sweep element to project into the troughs at each side of the bed. The rods 304 are secured to one arm of a bell crank 310 by pivots 311, the end of the opposite arm being secured by a pivot 312 to a supporting rod 313, while a parallel supporting rod 314 is secured to the lower of the pivots 311. Rod 313 is pivoted to frame 19 on a pivot 310 (FIG. 75). The rod 314 is secured to the frame element 19 by a pivot 315. The rod 314 has an extending end 316 connected by a link 317 to an arm 318 which is secured to a shaft 319 extending across the frame elements 19 of the supporting frame. An arm 321, secured to the shaft 319, is connected to a link 322, having a slot 323 therein in which a pin 324 extends. The pin 324 is secured to an arm 325 connected to a shaft 326 extending from the gear box 22 (see FIG. 49). A cam 327 (see FIGS. 75 and 78), secured on a shaft 328 of the gear box, is aligned with a roller 329 carried on a pivoted arm 331 having a plate 332 in engagement with the end of the link 322. When the cam is operated, the arm 331 is swung to have the plate 332 push the link 322 forwardly to have the slot 323 thereof ride over the pin 324. When this occurs, the rods 313 and 314 are moved counterclockwise, thereby to drop the guard and sweep element 301 onto the alley bed. To retain the rods 304 from pivoting on the upper of the pivots 311, rods 333 are secured at one end to the pivots 305, the opposite end extending through an aperture in a pivoted boss 334 carried on the rod 314 and biased by spring 335. An arm 336 (see FIG. 75) is secured to the link 318 and is connected by a chain 337 to a counterbalancing spring or set of springs 338 contained within a tube 339 adjustably secured by an eye bolt 341 to a bracket 342 of the frame. The counterbalancing of the mechanism occurs during the upward and downward movement of the sweep and is rendered substantially inoperative when the sweep is on the alley bed by a plate 343 carried by the arm 336 which engages the chain and prevents it from passing below the shaft 319. An arm 344 on the shaft 319 has a pin engaged in a slot in a piston rod 345 which operates in a cylinder 346 to cushion the raising of the sweep produced by the counterbalancing springs 338. The sweep is dropped upon the alley bed to prevent the pins from rolling forwardly of the sweep and to warn a bowler against bowling a second ball immediately after a ball has been rolled.

The operation of the arm 325 through the rotation of the shaft 326 produces a further movement of the link 322, link 317 and the rods 313 and 314 to have the sweep pass from its initial dropped position ahead of the setting rack to and from the rear edge of the alley bed, thereby sweeping all of the pins on the bed or in the troughs into the pit. The end 316 of the rod 314 has a detent 347 (see FIGS. 77 and 78) extending therefrom which, when the sweep 301 is initially dropped into engagement with the alley bed, engages a finger 348 on the end of an arm 349 pivoted to the frame on a pivot 351. A spring 352 rocks the arm 349 into a position in which it will be engaged by the detent 347. The rods 269 attached to the setting rack 16 are mounted in sleeves 353 at each side of the machine, secured to the supporting frame 19. The rods have bosses 354 at the top end from which stub shafts 355 extend to support an annular boss 356 on an operating rod 357. The sleeves support a container 300 for a spring pressed ball which enters a recess in the supporting rod 269 for retaining the rod in raised position. The operating rod 357 has a boss 358 mounted thereon on which a bell crank arm 349 is secured by a pivot 361, see FIGS. 77 and 78. A projecting finger 362 on the arm 359 is so positioned as to engage the arm 349 on the upward movement of the rod 357 to rock the arm counterclockwise and thereby move the finger 348 from the detent 347. Upon the downward movement of the rod 357, the finger 362 swings clockwise and rides over the finger 349 and is returned to operating position by a spring 363. Once the sweep mechanism is dropped, it will remain located on the alley bed until the finger 349 is moved by the roller 362 upon the upward movement of the rack. When the detent 347 is released, the tension of the spring 338 pulls the sweep upwardly to raised position. A spring 364 is secured between the link 322 and the pin 324 for retaining the pin in the forward end of the slot 323. The operating rods 357 on the rack supporting rods 269 are connected at their lower ends to operating arms 365 at each side of the machine. The arms 365 are connected to a shaft 366 secured to the supporting frame 19. An arm 367 on the shaft 366 is operated in a manner to be described for rotating the shaft and actuating the arms 365 to move the rods 357 and the rack supporting rods 269 upwardly and downwardly.

The tray 267 of the rack, as illustrated in FIGS. 75, 76, 99 and 100, has a boss 368 secured thereto and connected by a link 369 to an arm 371 on an angle-shaped link 372 which is secured by a pivot 373 to the rack frame. A rod 374 is secured by a pivot 370 to the end of the angle link 372 and is guided through an aperture in a boss 375. A spring 376 is provided around the rod which is tensioned as the rack is lowered. A latch 377 is pivoted to an arm on the frame at 378, having a detent 380 which engages and latches a finger 379 on the frame 267. A latch releasing rod 381 is secured to the end of the latch 377, with the rod passing through an aperture in a bracket 382 which is engageable by an adjustable collar 383 on the upper end of the rod. When so engaged, the latch releases the finger 379 when the rack is in substantially its lowermost position to permit the tension in the spring 376 to pull the rod 374 upwardly, thereby to advance the tray 267 rearwardly toward the pit into pin setting position. Upon the raising of the rack, a spring 384 beneath the boss 375 causes the rod 374 to be moved downwardly and move the tray 267 forwardly to its initial position. The tray is secured in initial position by the engagement of the latch 377 with the finger 379.

The cushion 24 at the back of the pit has an extending arm 385 which is engageable with a finger 386 pivoted on a shaft 387, having a clutch dog 388 thereon. The clutch dog releases a clutch 389 which is driven by a shaft 391 from a chain and sprocket connection to a shaft 392 of the gear box. As soon as a ball strikes the cushion 24, the clutch dog 388 is released, causing a shaft 328 having the cam 327 to advance the link 322 forwardly, thereby lowering the sweep board onto the alley bed.

It will be noted in FIGS. 75 and 76 that a limit switch 393 is operated by a finger on the shaft 326 at the end of a complete cycle of rotation. This switch is in series with a micro switch 394 carried by the frame in position to be actuated by the arm 365. It will be noted that after the dog 388 is released, it immediately returns to dogging position to permit only a single revolution of the cam 327.

Figure 49:
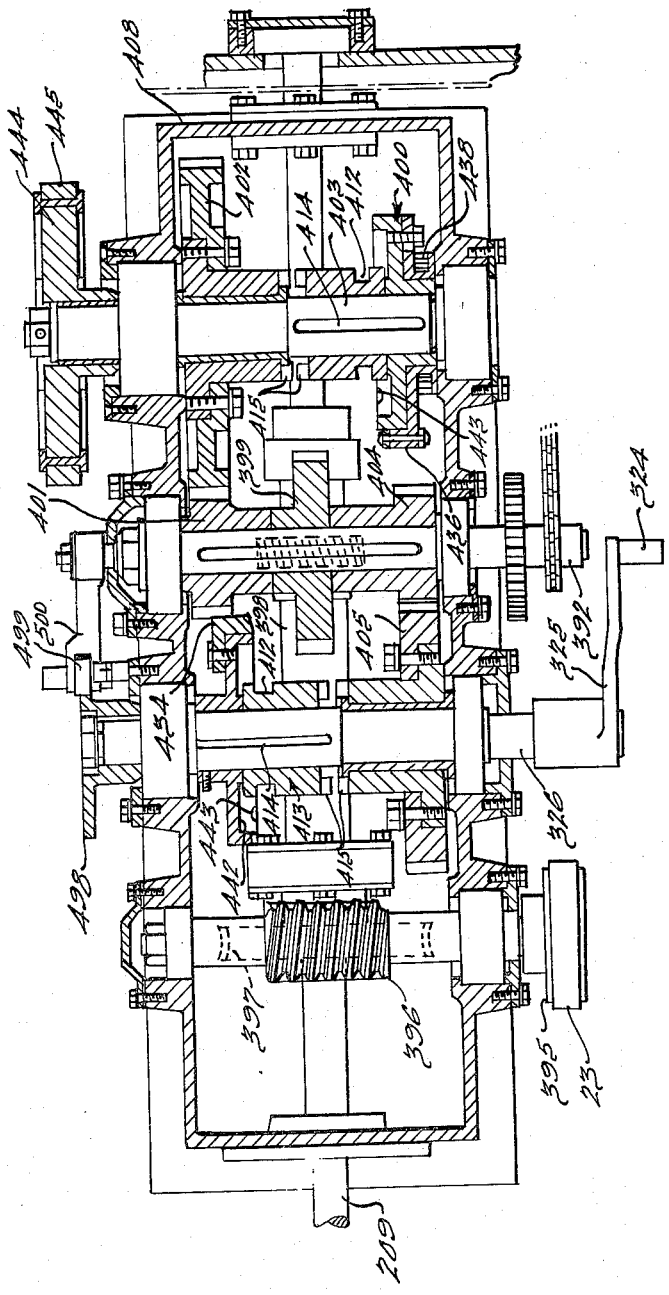
FIG. 49 is a sectional view of the structure illustrated in FIG. 48, taken on the line 49—49 thereof.
Figure 69:
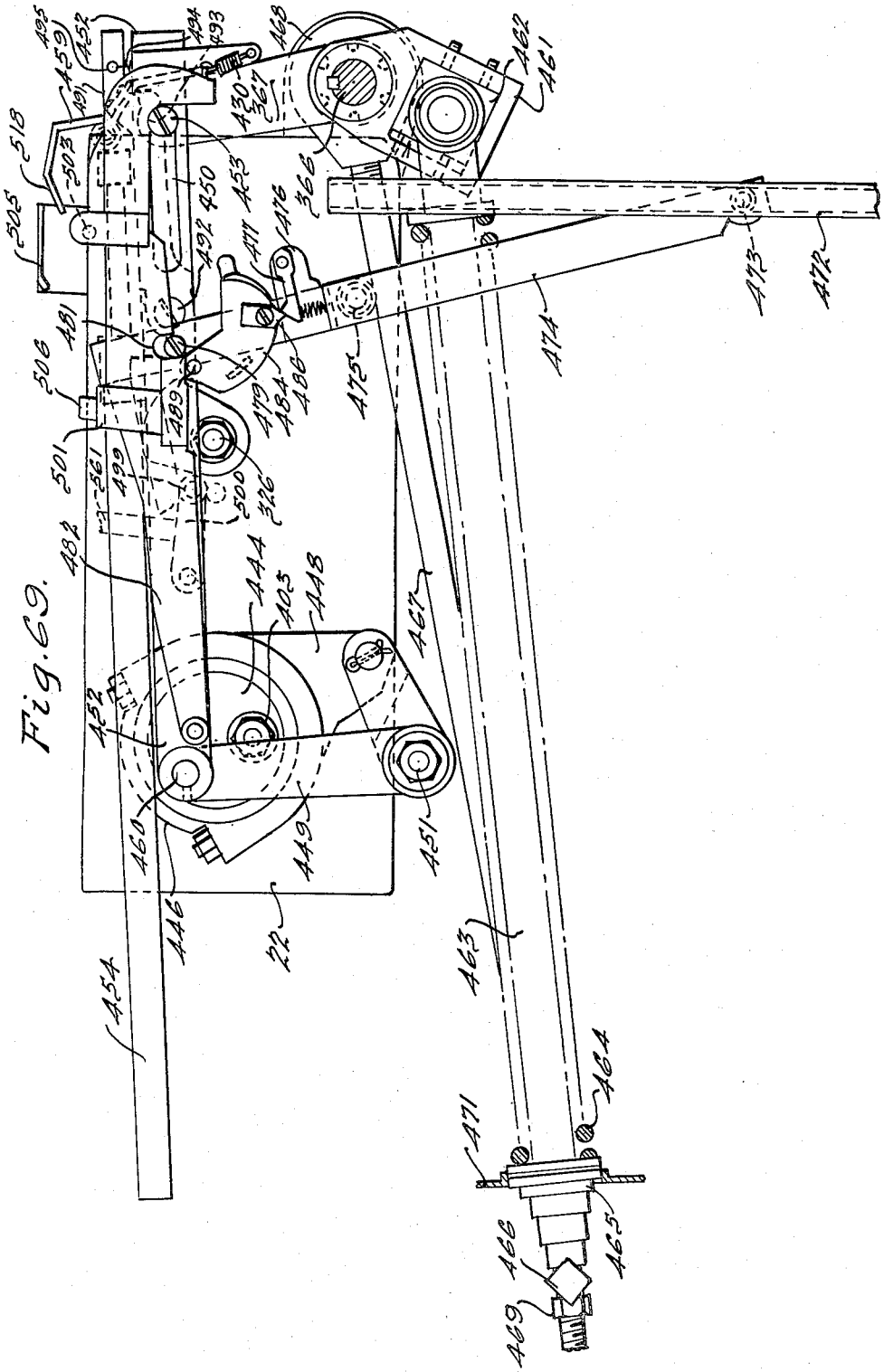
FIG. 69 is a view of the structure illustrated in FIG. 56, showing the first position of operation.

The belt 23 from the motor 30 drives the elements of the gear box through a pulley 395 which drives a worm 396 and worm wheel 397, as best seen in FIG. 49. The worm wheel drives a power shaft 398 for driving a helical set of gears 399 which drives a shaft 392. The shaft 392 has a gear 401 keyed thereto for driving a gear 402 freely mounted upon a shaft 403. A gear 404, keyed to the shaft 392, drives a gear 405 which is freely rotatable upon the shaft 326. In FIGS. 47 and 48, rods 406 and 407 are illustrated extending longitudinally of the gear box casing 408 above the shafts 326 and 403. The rod 406 has a forked clutch operating mechanism 409 engaging pins 410 of a split washer 411 which extends within a recess 412 of a clutch element 400. The rod 407 has a similar forked mechanism 409, 410 and 411 engaged in the slot 412 of a clutch element 413. Upon arcuate movement of the rods 406 and 407, the clutch elements 400 and 413 are shifted along keys 414 of their respective shafts, to have the mateable teeth 415 move into engagement for driving the shafts 403 and 326.

Referring to FIGS. 40 to 42, a solenoid 416 is illustrated connected to the arm 417 of the rod 407, while a solenoid 418 is connected to the arm 419 of the rod 406. A spring 421 maintains the arm 419 in counterclockwise rotated position. A spring 422 is connected to an arm 423 of the arm 417 for biasing the arm clockwise. A Bowden wire 424 is connected to the end of the arm 417 for a purpose which will be explained hereinafter. Solenoid armature arms 425 have a rod 426 extending thereacross in position to engage the arm 417 near its free end upon the initial upward movement thereof. The armature arms 425 are limited in downward movement by a stop finger 427 positioned to engage the lower end of one of the arms 425 (FIGS. 40 and 41). As illustrated in FIG. 42, the forward extending end 209 of the power shaft 398 drives the gear 208 which operates through the idler gear 207 to drive the gear 206 which drives the shaft 205 (see FIG. 45) for driving the pin delivery mechanism, as above described. Upon operating the solenoid 416 for setting a new set of pins, referred to hereafter as "new set," the rod 407 is rotated and clutch 413 is moved into engagement, thereby to drive the gear 405 and the arm 325 for actuating the link 322 and the sweeper 301 after which the clutch disengages. An extending cam 434 on the clutch element 413 engages a roller on an arm 435 on rod 406 to cause the rod to rotate and thereby engage the clutch 400 which drives the shaft 403 to complete the "new set" operation. In "deadwood" operation, a cam element 436 on a spring 438 associated with the clutch 400 is disposed in position to operate an arm 437 attached to the rod 407 to rotate the rod 407. In case the solenoid 418 is actuated for a "deadwood" operation, arm 419 is raised, rotating the shaft 406 to shift the clutch 400, which thereby winds up the spring 438 until it picks up and carries the cam element 436 therewith to cause it to engage the roller on the arm 515 and rock the arm 437 to rotate the rod 407 and shift the clutch 413 into engaged position (see FIGS. 47 and 48). The winding of the spring 438 provides a mechanical time delay and the wound spring returns the cam element 436 back to its initial position when the clutch 400 is released. The yokes 409 have a projecting arm 439 which carries a roller 441 that rides upon the faces 442 of the clutch elements 400 and 413. The faces have a recess 443 into which the rollers are moved by the tension of the springs 421 and 422 on the arms 417 and 419 upon each revolution, to thereby move the clutches out of engaged position. With this arrangement each clutch rotates through 360° each time it is engaged to rotate the shafts 326 and 403 a single revolution.

A selector switch is provided having a star wheel which in "deadwood" position energizes the solenoid 418 and causes the rack to move down and pick up the standing pins, operates the sweep on the alley and resets the picked up pins thereon. Thereafter, the star wheel is advanced and the "deadwood" contacts separate. Upon the throwing of the next ball, the star wheel is advanced to close the contacts for "new wood" position resulting in the energization of the solenoid 416, which causes the alley to be swept and a new set of pins delivered thereto.

Referring to FIGS. 53 to 74, the projecting end of the shaft 403 carries an eccentrically mounted cam plate 444 on which a split ring 445 is secured by a cap portion 446 secured thereto by nuts 447. An arm 448 on the ring 445 is pivoted to one arm of a bell crank 449 which is secured on a fixed pivot 451. The other arm of the bell crank is secured by a pivot 460 to a link 452 which is supported near its opposite end by a slot 450 which receives a pin 453 secured on the end of the arm 367 which rotates the shaft 366 of the rack raising and lowering mechanism. The link 452 has a tube 454 secured thereto containing, as illustrated in FIGS. 66 and 67, a spring 455 which abuts a plunger 456 and forces the end thereof against a roller 457 on an arm 458 attached to the arm 367 for applying a pressure to hold the tray down and thereby counteract the pressure of the springs on the pressure pads. The arm 458 also carries an angle-shaped bracket 459. It will also be noted in FIGS. 65, 66 and 71 that the arm 367 has an extending end 461 containing an adjustable bearing 462 from which a rod 463 extends having a heavy coil spring 464 disposed thereabout. The coil spring abuts a head plate 465 mounted against a cross member 466, having a pair of rods 467 extending therethrough and supported on a pair of heads 468 mounted on ball bearings on the shaft 366. The tension of the spring may be adjusted by the nuts 469 on the rods for counterbalancing the weight of the rack when supported by the shaft 366. A pair of straps 471 is connected to the head 465 to suspend it from the supporting frame.

A channel 472 projects upwardly from the forked finger carrying tray 279 in which a roller 473 operates. The roller is supported on a lever 474 which is pivoted on a stub shaft 475 to the side of the gear box 22. A bracket 476 on the lever 474 pivotally supports a detent 477 having a compression spring 478 engaged therewith to urge the detent upwardly. The lever, as illustrated in FIG. 60, has a pin 479 on its upper end which is engageable in a slot 481 of a link member 482 which is pivoted to the link 452 by a pivot 483. The link 474 has a rocker member 484 secured thereon by a pivot 485 and has a projecting finger 486 thereon which moves to one or the other side of the detent 477 where it is maintained in one or the other position. A finger 487 is mounted on one end of the rocker member 484 and a projecting finger 488 is provided near the other end thereof. A roller 489 is mounted on the upper end of the rockable member on a stub shaft secured thereto. As the link 452 is advanced to the right, a link 491 (see FIGS. 61 and 62) pivoted at 492 thereto has a notch 493 which engages the pin 453 to advance the arm 367 in a clockwise direction. A spring 494 on the pin 495 (see FIG. 74) retains the link with the notch 493 in engagement with the pin 453. When the rack has been stopped in its downward movement produced by the movement of the link 452 to the right, the arm 367 can no longer rotate clockwise, and the surface of the slot 493 acts as a cam relative to the pin 453 to cause the link 491 to pivot upwardly and to thereby release the arm 367. The continued movement of the link 452 to the right causes the notch 481 in the link 482 to drop over the pin 479 of the link 474 and to rock the link forwardly therewith. The roller 473 moves within the channel element 472 advancing the channel element to the left to carry the forked supporting tray 279 to the left toward the rear end of the alley. At the end of the forward movement of the link 452, the roller 489 on the rocker member 484 strikes the cam surface 496 of the link 482, causing the link to be raised and move the forward edge of the notch 481 above the pin 479. Upon the following rearward movement of the link 452, the riding of the roller 489 on a surface 497 of the link 482 prevents the re-engagement of the notch with the pin 479, thereby permitting the link 452 to retract without returning the lever 474 to its initial position. Upon the rearward movement of the lever 452, the pin 453 is engaged by the forward end of the slot 450 in the link 452 and the arm 367 is returned to its initial position, moving the rack to raised position. With this arrangement, the pins left standing after the first ball is thrown are picked up from the alley and thereafter the alley is swept by the sweeper mechanism because of the rotation of the rod 407 by the cam on the clutch 400, thereby engaging clutch 413. During the time the sweep is operating, a cam 498 carried on the sweeper shaft 326, see FIGS. 49 and 72, rotates to engage a roller 499 on a pivoted inverted U-shaped element 500. A projecting finger 429 is aligned with a bar 428 supported on one arm of a U-shaped element 501 (FIG. 57) the other arm of which is secured to the link 482. When the finger 429 is raised by the engagement of the cam 498 with the roller 499 the link 482 is raised to raise a pin 503 on a bracket 504 on the forward end of the link 482, sufficiently to rest upon a supporting flange 505 carried by the gear box 22 which is in alignment therewith. The pin 503 is held in raised position by the flange 505 during the second advancing movement of the link 452 to prevent interference by the link 482. This second movement is set in operation by the clutch 413, the cam 434 of which rotates the shaft 406 of the gear box, shifting the clutch 400 and driving the shaft 403 and the eccentric plate 444.

When a strike occurs or a pin has moved too far from spot position the link 482 is raised causing the rack's downward movement to be stopped before it normally would if the pins engaged the pressure plates, a projecting finger 506 on the element 501 is raised as the pin 503 rides up the sloping end 518 of the angle bracket 459 upon the movement of the link 482 to the right. The link 482 is retained in raised position near the end of its travel by the roller 489 riding on the surfaces 496 and 497 of the link. The finger 506 is in position to engage a lever 507 on the gear box (see FIGS. 47 and 57) to operate a rod 508 and a link 509 pivoted on the arm 437 (see FIGS. 47 and 48). The link 509 has a finger 510 which projects in a slot 511 in a bracket 512 carried on arm 437. The bracket has a vertical notch 513 intersecting the slot 511 for receiving a projecting pin 514 which is retained in the vertical slot by the finger 510. The pin is mounted on the side of a roller supporting arm 515 which is urged in rotated counterclockwise position by a spring 516 and locked to the arm 437 when the finger 510 is in the slot 511. When the lever 507 is engaged by the finger 506, the link 509 is moved clockwise to move the finger 510 from the slot 511, thus releasing the pin 514 for movement in the vertical notch 513 and the arm 515 which swings independent of the arm 437 and thereby prevents the rotation of the rod 407 by the cam element 436 of the clutch 400, preventing the engagement of the clutch 413 and the operation of the sweep mechanism through the sweeping operation.

Figure 73:
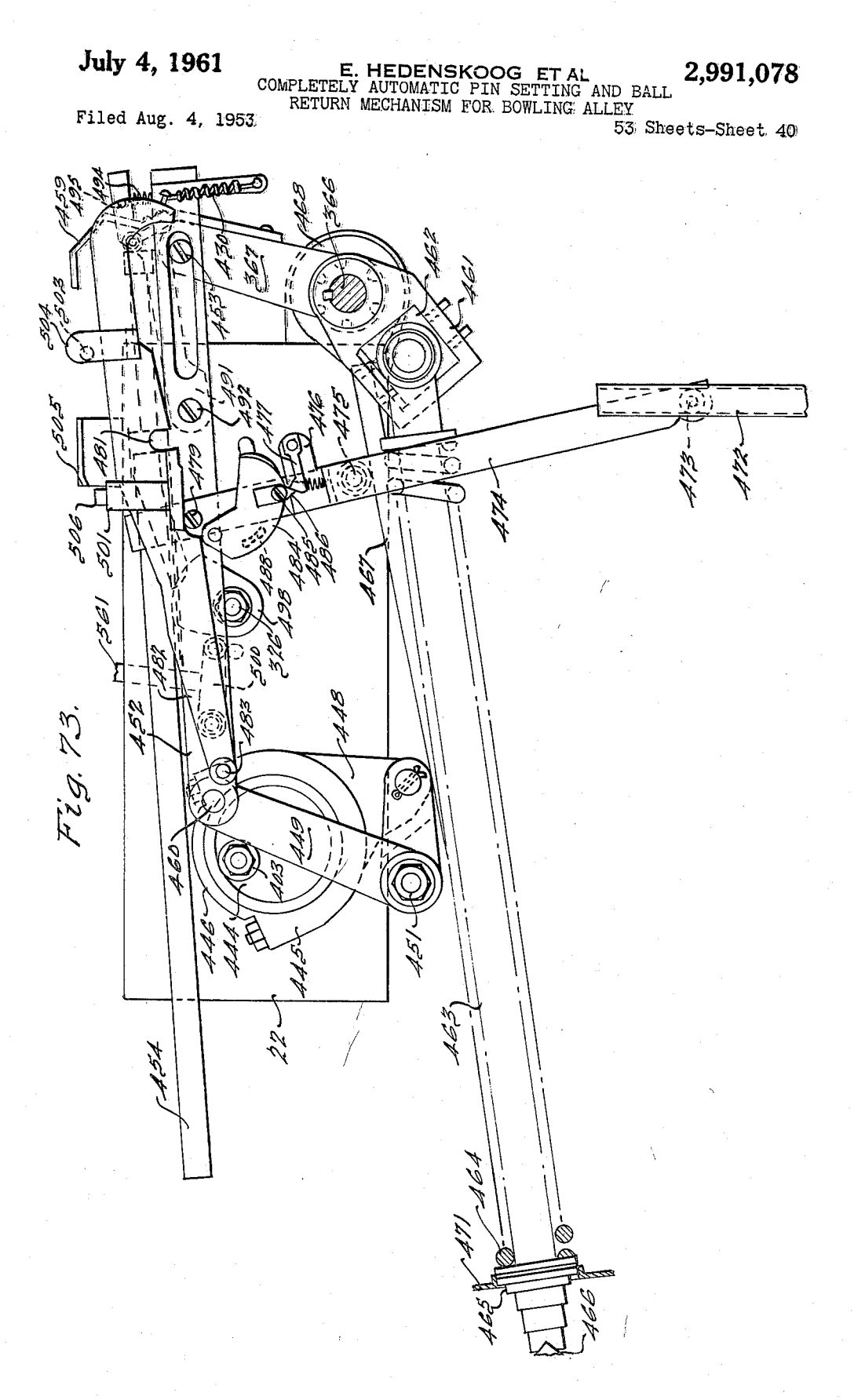

Referring now to FIGS. 56 and 69 to 74 inclusive, various positions of the mechanically actuated control mechanisms are illustrated. FIG. 73 discloses the control mechanism positioned with the rack down to place a "new set" of pins on the alley. FIG. 74 discloses the control mechanism positioned as a result of a too-far-off-spot pin. In FIG. 56 the mechanism is in neutral position, with the rack and sweep disposed in raised position. In this position, the tray and distributor may or may not be loaded with pins. If the machine is started up, the pins will be picked up by the pin and ball pick-up mechanism, and if a ball is present in the pit it will be delivered to the return rack. The pins then will be delivered to the distributor until filled, and when filled it will immediately drop the pins into the receiving tray of the rack and the pins will be continued to be delivered to the distributor until the nine cups thereof are again filled. The tenth pin will be held in the delivering mechanism which is then stopped by the interlocking mechanism 243 if the rack is filled with pins but will immediately drop the pin in the rack and continue to operate if the rack is empty.

Figure 70:
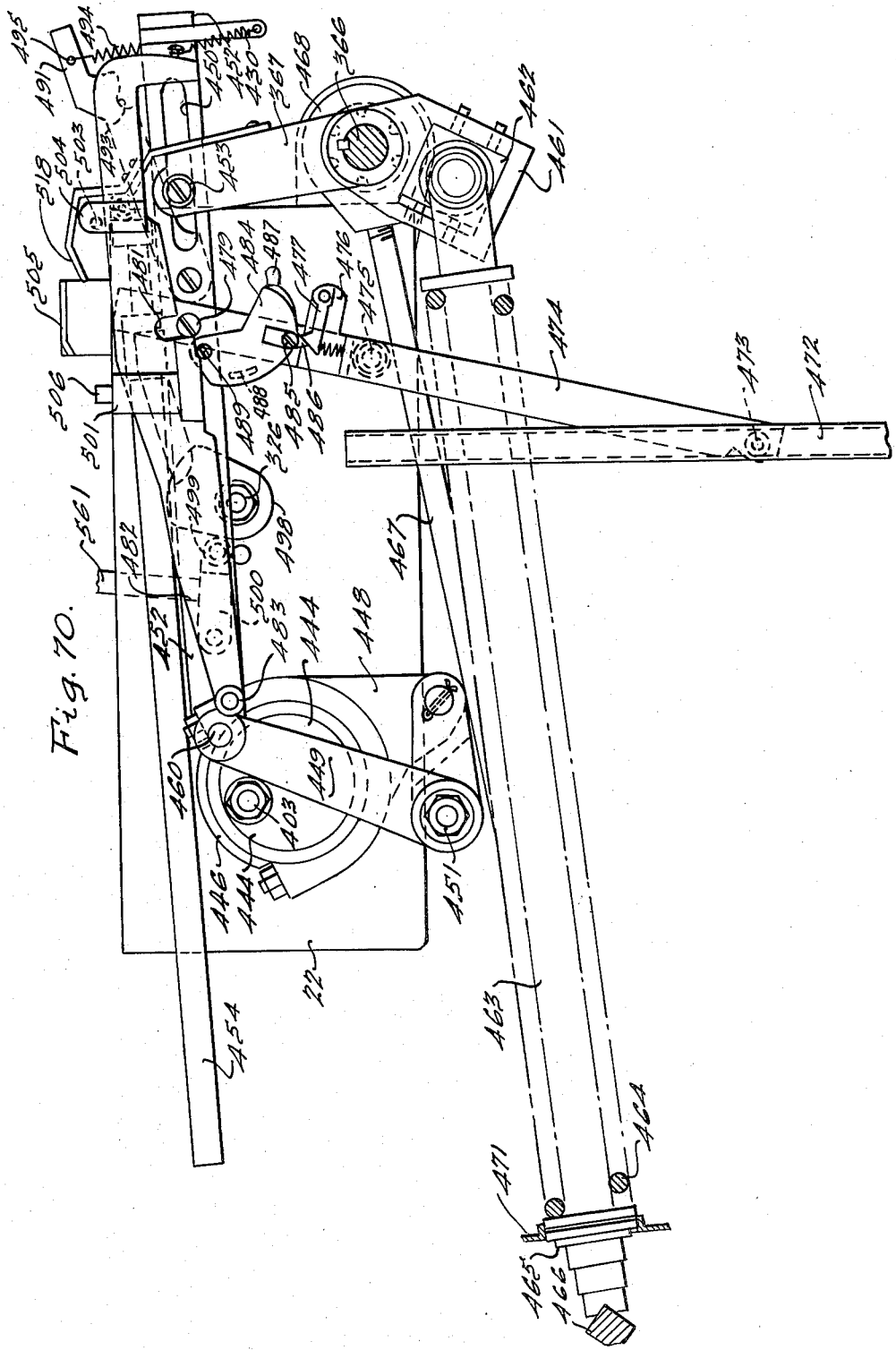
FIG. 70 is a view of the structure illustrated in FIG. 56, showing a second position of operation.

When a ball is thrown and a spare is made, leaving one or more pins standing, the striking of the ball against the cushion of the pit will cause the sweep to be lowered into guard position through the engagement of the clutch which operates the cam 327 to push the link 322 forwardly. Thereafter, the "deadwood" solenoid 416 is energized in a manner to be explained hereafter with reference to the wiring diagram after the ball has passed into the pit to have the contacts of a microswitch close as the ball actuates the bar 86. Thereupon, the mechanism is in the position illustrated in FIG. 69, with the lever 452 advanced to the right and with the arm 367 stopped in its movement by the engagement of the pressure plates 274 with the top of the standing pins. It will be noted in this arrangement that the finger 506 moves in a straight forward direction as the pin 503 does not contact the inclined end 518 of the element 459 or the plate 505 and the link 482 is free to have its notch 481 drop over the pin 479. Upon the complete engagement of the notch and pin, the lever 474 is carried forwardly while the link 491 and notch 493 are cammed upwardly from the pin 453 to release the pin and the now stationary arm 367. The further movement of the mechanism to the right carries the lever 474 to its forward position, as illustrated in FIG. 70. In this figure it will be noted that the link 491 is in raised position against the tension of the spring 494 and that the forward edge of the notch 481 has been raised above the pin 479 by the engagement of the roller 489 of the rocker mechanism 484 with the cam surface 496.

The continued rotation of the eccentric plate 444 produces the counter reciprocation of the arm 448 which retracts the link 452, permitting the slot 481 to move past the pin 479 until the pin 453 of the arm 367 is engaged by the forward end of the slot 450 at the righthand end of the link 452. Thereupon, the arm 367 is rotated in a counterclockwise direction to raise the rack. Due to the clockwise movement of the link 474, the forked finger supporting tray 279 was moved rearwardly to have fingers engage the neck of any standing pins while being held against the floor by the pressure plates 274. When so held, the pins will not shift when engaged by the fingers as the tray moves rearwardly, as explained in the above mentioned copending application. At the end of the return movement of the link 452, all the operating parts are in the position illustrated in FIG. 71 the same as in FIG. 56, with the exception that the link 474 is in its forward position. As the rack moved upwardly, the cam 436 on the clutch 400 was delayed from action by the spring 438 and now engages the roller on the arm 515 and causes the clutch 413 to move to engaged position, thereby operating the arm 325 to cause the sweep to pass rearwardly across the alley bed beneath the rack and return to its starting position. At the end of the operating cycle for raising the rack, the roller 441 of the clutch 400 drops into a notch 443 thereof and thereby disconnects the clutch 400 from the driving gear 402. Near the end of the sweeping operation, the cam 434 engages the roller on the arm 435 and rocks the shaft 406 to connect the clutch 400 with the driving gear 402 to start a new cycle of operation of the control mechanism.

Figure 71:
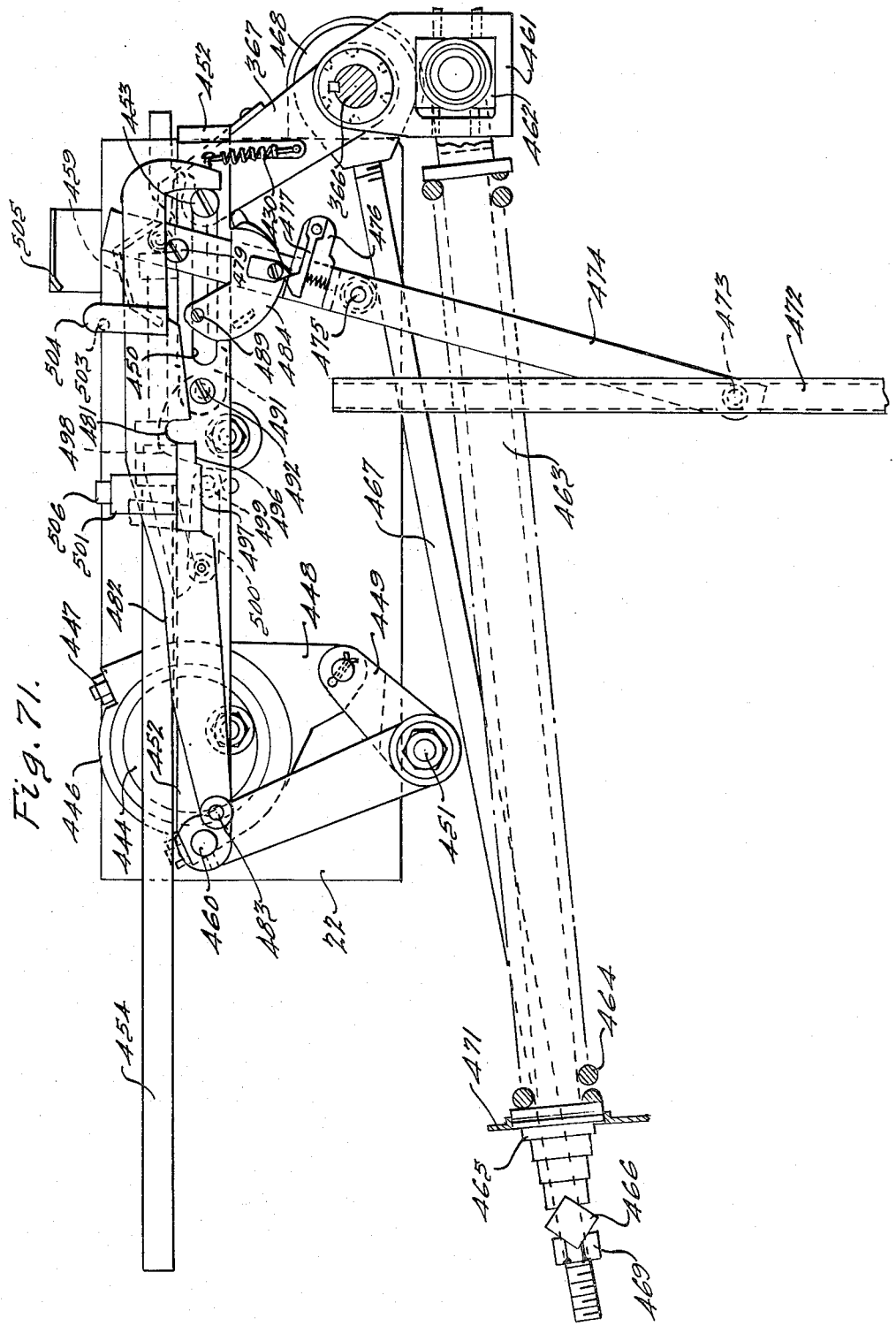
FIG. 71 is a view of the structure illustrated in FIG. 56, showing a third position of operation.
Figure 72:
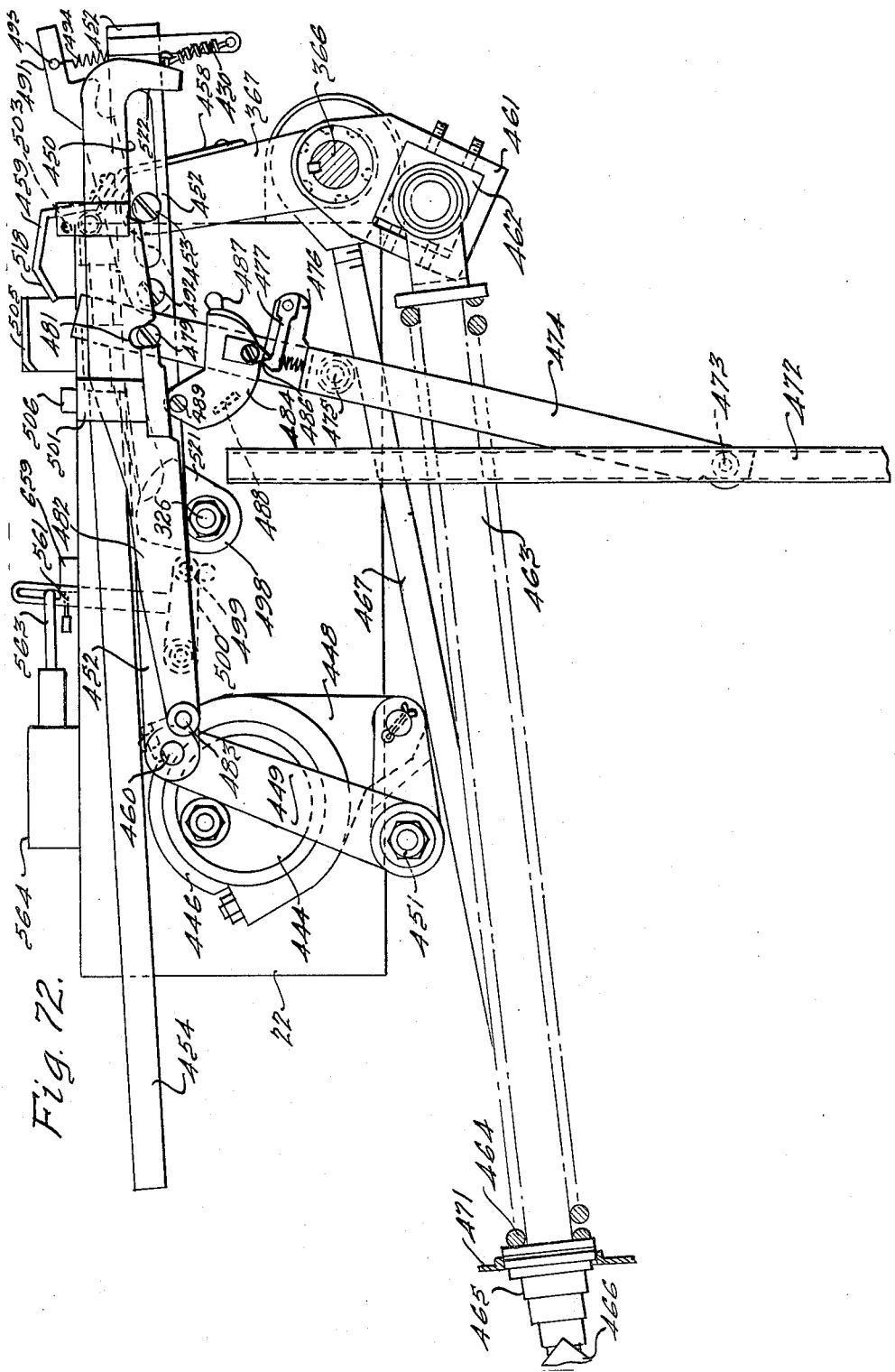
FIG. 72 is a view of the structure illustrated in FIG. 56, showing a fourth position of operation.
Figure 88:
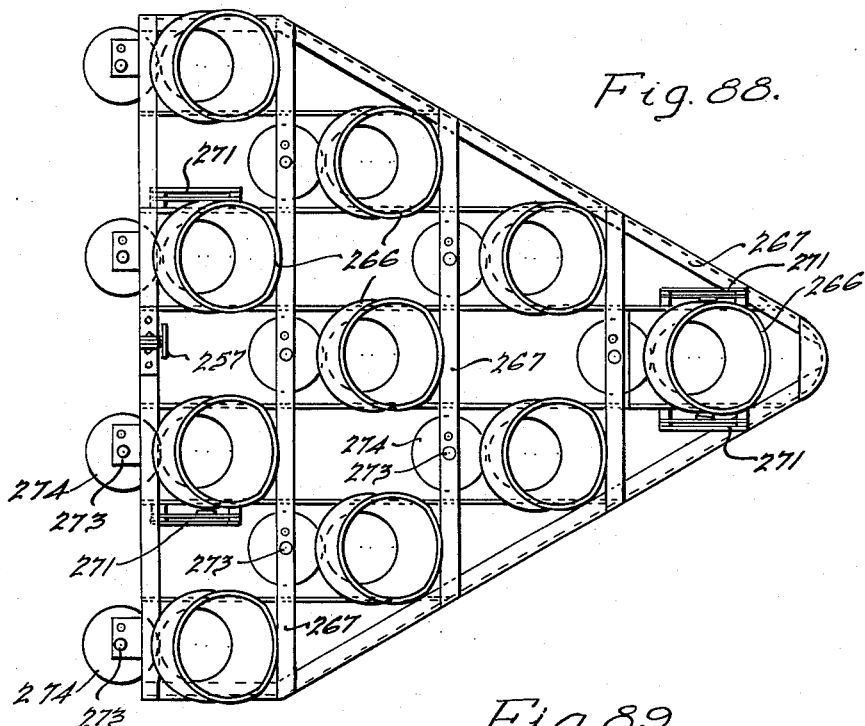
FIG. 88 is a plan view of the frame portion of the rack, having the pin receiving sleeves mounted thereon.
Figure 89:
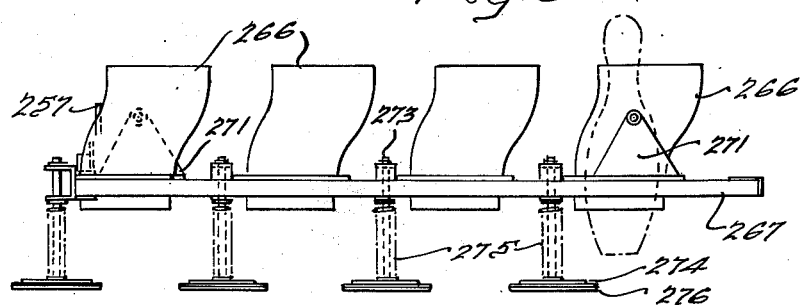
FIG. 89 is a side view of the structure illustrated in FIG. 88.
Figure 90:
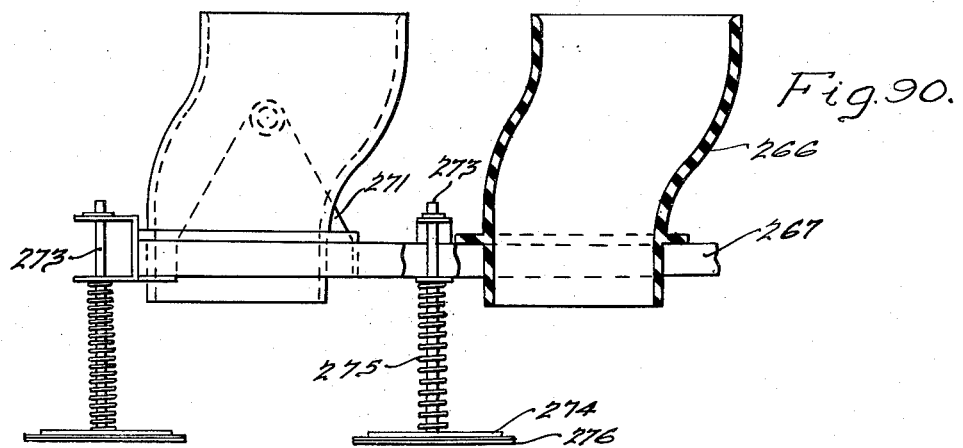
FIG. 90 is an enlarged broken view of the structure illustrated in FIG. 89.
Figure 99:
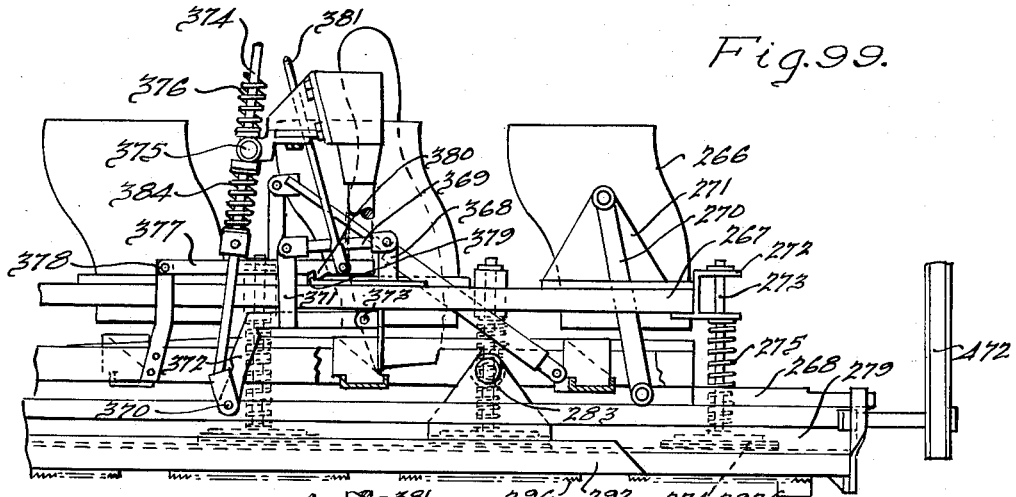
FIG. 99 is a broken sectional view, in side elevation, of the rack prior to delivering pins on the alley surface.
Figure 100:
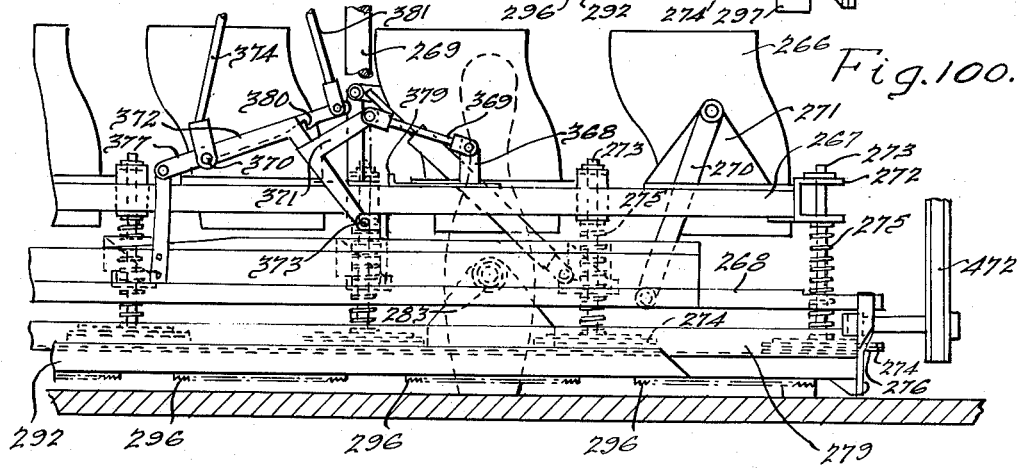
FIG. 100 is a view of the structure illustrated in FIG. 99, showing the rack elements in position after the pins have been set upon the alley surface.
Figure 101:
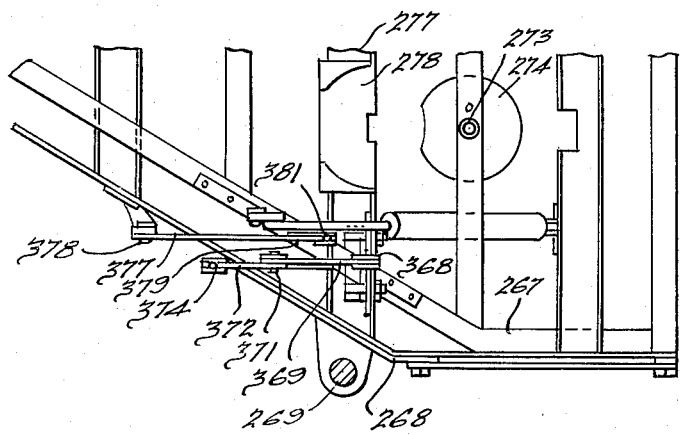
FIG. 101 is a broken plan view of the pin receiving portion of the rack and the operating elements thereof.

Upon the throwing in of the clutch 400, the mechanism moves from the position illustrated in FIG. 71 into the position as illustrated in FIG. 72 with the rack down and still holding pins previously picked up. During this movement the link 452 is again moved forwardly and the cam 498, on the opposite end of the shaft 326 from the arm 325, engages the roller 499 on the arm 500 and causes the arm to swing upwardly to thereby have the finger 429 engage the bar 428 on the free end of the bracket 501 (FIGS. 57 and 58) and swing the link 482 upwardly, thereby raising the pin 503 to a sufficient height to have it ride over the plate 505. During this movement, the arm 367 is rotated clockwise to lower the rack to a position to reset the pins picked up during the prior described cycle of the mechanism. When the downward movement is stopped through the engagement of the pins with the floor, the movement of the arm 367 is arrested and the latch 491 is forced upwardly over the pin 453, permitting the continued movement of the link 482 with the pin 503 leaving the plate 505 and passing over the sloping cam element 518 of the supporting element 459. The pin 503 drops off cam element 518 and, in this position, the notch 481 engages the pin 479 of the link 474, which is made possible by the counterclockwise movement of the rocker element 484 through the engagement of the finger 488 with the bottom edge of the link 452, as illustrated in FIG. 71. Thereafter, the return movement of the link 482 moves the link 474 counterclockwise to advance the forked finger carrying tray 279 forwardly to release the forked fingers 285 from the pins. Through the engagement of the pin 453 with the forward end of the slot 450, the rack is moved to raised position and the mechanism is again in the position illustrated in FIG. 56, with the slot 481 raised and disengaged from the pin 479 by the engagement of the pin 453 with the cam surface 522 at the forward end of the link 482 against the tension of a spring 430. The engagement causes the link 482 to rotate counterclockwise a sufficient degree to clear the pin 479 from the slot 481.

When a second ball is thrown, the striking of the ball against the cushion again drops the sweep to guard position upon the alley and the "new set" solenoid 416 is energized, engaging the clutch 413 to actuate the arm 325 to sweep the alley of fallen pins. Substantially at the end of this operation, the clutch 400 is engaged in a manner as pointed out hereinabove, to cause the rack to be lowered, and upon the lowering of the rack to set a new set of pins, the pin setting tray is moved forwardly from the position illustrated in FIG. 99 through the release of the latch 377 to the position illustrated in FIG. 100 due to the tension of the spring 376 on the operating rod 374. The continued operation of the link 452 to retracted position raises the rack and through the operation of the spring 384 the rod 374 is moved downwardly to retract the pin setting tray from the position illustrated in FIG. 100 to latched position illustrated in FIG. 99. In this manner, the cycle of rolling the first ball, the picking up of the standing pins, the sweeping of the alley, the resetting of the standing pins to "on" or "off" spot position, as the case may be, the throwing of the second ball, the sweeping of the alley and the setting of a new set of pins upon the alley, is completed.

When the solenoid 416 is actuated, the Bowden wire 424 is drawn through its sheath to actuate an arm 523 to which the opposite end is connected, as illustrated in FIGS. 77 to 81. The arm 523 extends from a plate 524 secured by a pivot 525 to a bracket 526. A link 527 is secured by a pivot 528 to the plate 524, the opposite end having an aperture 529 through which a rod 531 extends. The rod extends from a cylinder 532 containing a piston on the end of a rod 533 which engages a spring within the cylinder and a fluid, such as oil, for reducing any shock by metering the oil through an aperture in the piston. The cylinder is secured to a bracket 534 by a pin 535 on which it is free to pivot. A head 536 on the upper end of the rod 533 is disposed in position to be engaged by a finger 537 carried by the rack actuating rod 357. Such engagement will occur when the plate 524 is in its clockwise rotated position, as illustrated in FIG. 78, and engagement will be avoided when in its counterclockwise rotated position, as illustrated in FIGS. 77 and 80. Upon the return of the rack to raised position, the operation of the return and locking mechanism 368 and 383 for the pin delivering tray 267 (see FIG. 75), causes the tilting of the rod 374 forwardly or to the right, as viewed in FIG. 80, to thereby have the rod strike the edge 538 and rotate the plate 524 clockwise to move the cylinder from the position illustrated in FIG. 77 to the position illustrated in FIG. 78. The head 536 carries a rod 539 which is guided in an aperture in a bracket 541 mounted on the cylinder. The rod carries a conical cam element 542 which, in the lower position of the head 536, engages a roller 543 of a micro switch 652 which closes a circuit to the selector star wheel relay 609 as will be explained hereafter. Thus, the cylinder 532 is in position when a strike is obtained by a first ball thrown to change the cycle from "dead wood" to "new set," and the sweep 21 is not operated from guard position. The switch 652 is actuated by the cam 542 as the rack moves beyond the position where it would normally be stopped if it engaged standing pins. The operation of the switch changes the circuit from "dead wood" to "new set" position, and the rack will return immediately without the "dead wood" cycle being completed. Therefore, if a strike is made with the first ball thrown, the rack can move downwardly a sufficient degree to cause the closing of the switch 652 due to the position of the head 536, as illustrated in FIG. 78. The switch produces the advancement of the selector star wheel to have the contacts thereof energize the "new set" solenoid 416. In this arrangement, the sweep is on the alley bed in guard position which occurred when the ball struck the cushion. Upon the return of the rack a "new set" cycle is started which moves the sweep through its sweeping operation upon the rotation of the arm 325. Thereafter, a new set of pins will be immediately set upon the alley in the manner described above for the "new set" or second cycle of operation of the mechanism.

Should the rack be lowered into engagement with a pin which has moved so far from "on spot" position as to be beyond the pickup position, the striking of the plate 292 against the head of this pin limits the angular movement of the arm 367 and stops the downward movement of the rack. When this occurs, the lever 482, as illustrated in FIG. 74, is raised by the finger 503 engaging the cam end 518 of the finger 459, permitting the link 452 to move forwardly without the engagement of the notch 481 with the pin 479 and be retained in raised position by the engagement of the pin 479 with the surface 496 as illustrated in the figure. The completion of the rotation of the eccentric plate 444 returns the arm 367 to its original position, thereby raising the rack and stopping any further operation of the mechanism, leaving the pin standing in "off spot" position. The pins on the alley bed must then be removed by hand.

The arm 500 has an upwardly directed finger 561 fixed thereto in position to be engaged by a armature 563 of a solenoid 564 (FIG. 72). The solenoid is energized by the closing of contacts of switch 652 which closes the contacts of switch 659 due to the movement of the armature 563 to pulse the selector switch 609 which changes the circuit from solenoid 418 ("dead wood") to solenoid 416 ("new set") so that a new set of pins will be placed on the alley bed, as soon as the rack returns. The upward movement of the arm 500 raises the finger 506 to a position of engagement with the link 507 to render the sweep mechanism inoperative so that it will not sweep until the "new set" cycle is initiated. In this arrangement the mechanical mechanism is capable of immediately sweeping the alley bed and setting a new set of pins if a strike occurs upon the rolling of the first ball or of picking up the standing pins, sweeping the alley and resetting the pins if a spare is made. Upon throwing of the second ball after a spare is made, the alley bed is immediately swept and a new set of pins set on the bed the same as when a strike occurred. In case a spare is made and a pin has moved too far from spot position, the rack immediately returns, shifts the mechanism to "new set" and stops, permitting pins lying on the alley to be manually removed without knocking down or shifting the standing pins.

To more clearly understand the operation of the mechanical mechanism which produces the completely automatic operation of the pin setting mechanism, reference may be had to the wiring diagram of FIG. 106. The wiring system for the machine is such that the machine may be operated under manual control or under complete automatic control. When in manual control the machine is completely automatic the same as when in automatic control in that it will set a "new set" of pins after the second ball or after a strike is made or go into "dead wood" operation after the first ball has produced a spare. The supply circuit is illustrated by the conductors 600 and 601, and to set the system for manual or automatic control a manually actuated switch is employed. The switch has contact bars 602 and 603 which when shifted to the left, as viewed in the figure, produce automatic control by bridging contacts 604 and 605 or manual control when shifted to the right by bridging contacts 606 and 607. When the switch is shifted to automatic control position bridging contacts 604 and 605, the rolling of the ball on the alley will produce an operation of the machine to take care of any one of a plurality of conditions that might be produced thereby. The ball when passing from the pit into the ball and pin lifting mechanism will operate switch 608 and set the "dead wood" selector relay 609 closing the "dead wood" contacts 610. The relay embodies a star wheel 611 which engages and disengages a spring arm 612. When the arm 612 is engaged by the end of the start, the contacts 610 are closed, and when the end passes from the arm 612 the contacts 610 are open and the "new set" contacts 613 are closed. For producing the stepped movement of the star wheel 611 to engaged and released positions, a ratchet wheel 614 is utilized having twice the number of teeth as the star has ends. The teeth are advanced one position by the movement of a rod 615 on a solenoid 616 which is retracted by a spring 617 when de-energized. When the switch 608 is closed a circuit is also completed through a timer lock relay 618, the circuit being completed through the closed contacts 622. The energization of the relay 618 pulls the contact arms 621 downwardly engaging the contacts 623 and disengaging the contact 622 to open the circuit through the switch 608 preventing the switch from being again closed by the action of the ball if it rolls about the pit. The closed contacts 623 complete a circuit to the coil of the timer lock relay 618 through the contacts 619 to retain the relay in energized position. The contacts 624 of the relay 618 close and bridge across the upper set of open motor control contacts 625 of the time delay mechanism 620 to start the motor 626. In this manner when the coil of the relay 618 is energized, the motor 626 which drives the time delay mechanism 620 begins operation to drive a disk 627 in rotation. The disk 627 has a plurality of pins 628 extending upwardly from the face thereof and offset from the same number of teeth 629 provided on the periphery of the disk. The teeth 629 of the disk contact an arm 630 which is raised to close the contacts 619 and open the contacts 625. The pins 628 move an arm 631 to close the contacts 632 of the switch 633. The spacing between the pins and the spacing between the teeth is such as to produce a time delay of approximately four seconds before changing the positions of the contacts 619, 625 and 632 when the motor is operated. This time delay is desirable to make certain that all of the life has passed from the pins so that they will not move further on the alley or fall down and cause other pins to be knocked down. The particular time delay mechanism shown forms no part of the present invention, and it is understood that other timing mechanisms known in the art to be suitable could be provided for delaying the operation after the relay 618 is closed.

As the disk 627 is rotated and after the passage of four seconds of time the contacts 619 will open and contacts 625 will close. The opening of the contacts 619 de-energizes the solenoid of the relay 618 which thereby opens the circuit to the motor 626 through the contacts 624 of the relay 618. It will be noted, however, that the circuit to the motor 626 is retained closed through the upper contacts 625 which are now closed. Prior to the time the arm 630 is actuated by a tooth 629 on the periphery of the disk 627 one of pins 628 will rock the arm 631 and close the contacts 632 of the switch 633. As the arm 630 is thereafter raised the contacts 619 are closed and the contacts 625 are opened, thereby interrupting the circuit to the motor 626 stopping the operation of the time delay mechanism 620. The contacts 632 of the switch 633 are closed four seconds after the switch 608 is closed by the passing of the ball from the pit to the ball and pin lifting mechanism 11, to thereby complete a circuit to the coil 634 of the latch relay 635 through the contacts 636 of the pulsing relay 609, closing contacts 637 and 638 and opening contacts 637a and 638a of the latch relay 635. The closing of the contacts 637 completes a circuit to the "dead wood" solenoid 418 thereby initiating a "dead wood" cycle. As pointed out hereinabove, the first operation of the "dead wood" cycle after the guard is dropped lowers the rack which thereby closes the contacts of the switch 639 completing the circuit to the coil 640 of the relay 641 which shifts the contacts 637 and 638 to open contact 637 and thereby interrupts the circuit to the "dead wood" relay 418 and permits the cycle to be performed by the mechanical mechanism. The rack continues to lower to pick up any standing pins, to have the alley swept and to reset the pins thereby completing the "dead wood" cycle.

Upon the throwing of the second ball the switch 608 is again closed thereby energizing the pulsing relay 609 closing the contacts 613 and 644 and also a circuit to the coil of the relay 618 to start the motor 626 as stated above. After the elapse of four seconds, contacts 632 of the switch 633 are closed completing a circuit to the coil 642 of the "new set" latch relay 643 through the now closed contacts 644 of the pulsing relay 609. This closes contacts 645 and opens contacts 646, while opening contacts 645a and closing contacts 646a. The contacts 645 and 646 of the "new set" latch relay 643 are retained in a position with contact 645 closed by the latching relays 647, the arm 648 thereof intercepting an arm 649 of the contacts the same as the contacts 637 and 638 of the latch relay 635. The engaged arms hold the contacts 645 and 646 and contacts 637 and 638 in the same position after the solenoid 642 or 634, as the case may be, is de-energized. When the relay 647 or 640 is energized the retraction of the arm 648 permits the closed contacts of the relays 635 or 643 to open. The closed contacts 645 complete a circuit to the "new set" solenoid 416 through the then closed switch 650 setting up the operating mechanism for a "new set" cycle. In this cycle the sweep is moved from guard position rearwardly and forwardly to sweep the alley and closes a switch 651 which completes a circuit to the latching relay 547 retracting the arm 648 and permitting the contact 645 of the "new set" relay 643 to resume its normal open position as illustrated in the figure. The contacts 645 when in open position interrupt the circuit to the "new set" solenoid 416, and the "new set" cycle continues through its complete cycle of operation carried out by the mechanical mechanism. The machine is now ready for the next bowler and upon throwing the next ball the switch 608 will be closed to energize the pulsing relay 609 to have the star wheel 611 move the arm 612 to close the contacts 613 and energize the coil of the relay 618 so as to start the time delay motor 626 and set up the mechanism for a "dead wood" cycle as described above. If a strike is obtained upon the throwing of the first ball, the rack will move down beyond the position where it would be stopped by the standing pins if a spare had been made, and because of this further downward movement of the rack, a switch 652 will be closed causing the rack release relay 653 to have its coil 654 energized and at the same time energizing a coil 655 of the relay 656 causing contacts 657 and 658 to move to closed position. The contacts 657 complete a circuit to the pulsing relay 609 opening the contacts 610 and closing the contacts 613 which, as pointed out above, energizes relay 618. This causes the motor 626 to operate and by its actuation to close contacts 619 and to open contacts 625 and to close the contacts 632 of relay 633, all of which will produce no results since the energy required to pull in the "new set" lock relay 643 will come from the contacts 659 when the coil 654 of the rack relay solenoid 653 is energized. The circuit to the coil 642 of the relay 643 when the contacts 659 are closed, can be completed only when the contacts 613 and 644 of the pulsing relay 609 are closed. The circuit is from line 600 through contacts 665 and 658, closed by coil 655, to the left hand side of solenoid 642 and from solenoid 642 through contact 638, contact 644, contact 659, contact 613 to line 601. An interlocking switch 660 is open when the rack is lowered, and to complete the circuit to the "new set" latch relay 643 when the contacts 659 are closed, the interlocking switch 660 is bypassed by contacts 658 upon the operation of the relay 656. Thus, when the coil 654 of the rack release relay 653 is energized, the rack returns to its upper position and the "dead wood" cycle is interrupted. Since the contacts 645 of the latching relay 643 are closed the circuit to the "new set" solenoid 418 is completed after the rack reaches its uppermost position when the switch 650 will be closed permitting the machine to be again set up for a "new set" cycle.

Thus, as hereinabove described, when the first ball produces a strike the machine will start the "dead wood" cycle and finding no pins standing as it lowers, the rack will immediately return to its uppermost position, the "dead wood" cycle will be discontinued and the "new set" cycle immediately set up. Thus the machine will continuously operate through a bowling game and will pick up and reset standing pins after the alley is swept if a spare is made, and will immediately go into a "new set" cycle if after a first ball is thrown the rack moves down and finds no pins standing upon the alley bed.

If a standing pin is moved too far off spot position, the rack will be interrupted in its downward movement as pointed out hereinabove and the cam and link mechanisms will complete their movement through the "dead wood" cycle and the rack will be returned to its upper position with the machine set up for a "new set" cycle. This permits the fallen pins which remain on the alley to be removed manually without in any manner disturbing the standing pins so that no arguments will result as to how many and in what positions pins were left from a "spare" ball if they were knocked down by the machine which would otherwise occur when the pins are moved too far off "spot" position. After the bed has been cleared manually of the fallen pins, the second ball may then be thrown starting the machine through a "new set" cycle.

In the eleventh frame when a strike is not made and a second ball is not to be thrown and a new set of pins is to be set upon the alley, this can be accomplished by the use of a rotary sleeve switch 661 which is preferably mounted about a push button switch 662 which is located near the front end of the alley. After the first ball is thrown, the selector relay contacts 613 are open in the "dead wood" position and while a "new set" of pins could be caused to be set upon the alley by the rolling of a second ball, the use of the switch 661 makes this unnecessary. Hence, by the rotation of the switch the contact 663 will close and the selector relay 609 will be operated to pulse the star wheel 611 and close the contacts 613 which will cause a "new set" cycle to be immediately performed since the contact 650 will be closed. The rotary switch 661 is spring pressed so that when it is released it will return to its initial position.

When the machine is set for manual operation the operator will have complete control of the machine in that he alone will decide what cycle it will perform. This will permit him to wait until he is completely satisfied that there is no more action left in the standing pins before setting up the next cycle of operation. It is to be understood that during manual operation the switch 608 has its circuit open so that when the ball actuates the switch to closed position no circuits will be completed thereby. However, the contact bar 603 will bridge the contacts 607 thereby opening the contacts 605. This places the circuit closed by the contacts 607 in circuit with the contacts 664 which are closed by depressing the push button 662. Upon closing the contacts 664 the machine is started into operation the same as when the ball closed the switch 608 when the machine was set for automatic operation. When the contacts 664 are closed the circuits to the time control relay 620 and all of the other relays and switches are operated in the same manner as if the machine were set for automatic operation under the control of the switch 608 when closed by the ball. When in the eleventh frame a "new set" is desired when the machine is set for manual operation the operation of the rotary switch 661 closes the contacts 663 and because contact bars 602 and 603 are shifted to bridge contacts 606 and 607 operation of push button 662 is required to close contacts 664 to cycle the machine through "new set." The machine is started and in its operation it will continue through the particular cycle of operation without interference because of an interlocking switch 665 on the sweeper mechanism and the switch 660 on the rack which will open the circuits to the "new set" and "dead wood" relays 635 and 643 and prevent their operation. While either the sweeper mechanism or the rack are in motion, mechanical clutch means 239 described above or a switch 666 will prevent the "dead wood" or "new set" solenoid 416 or 418 from being energized until a full complement of pins has been delivered to the distributor. The coils 640 and 647 of the locking relays will remain energized and will retain the contacts 637 and 645 of relays 635 and 643 respectively, closed for any period of time until the last pin required to fill the distributor enters the distributor and closes the switch 666 to complete the circuit to either the "dead wood" or "new set" solenoid. Thus, while the machine is of the mechanical type being operated by cam and link means for producing the functional operation of the sweeper mechanism and rack, the use of interlocking switches and relays is necessary for controlling the sequence of the different cycles and changing the sequence when necessary. The circuit switches and relays, however, are of the simplest form and are procurable as standard equipment in the electric art.

Further it is to be understood that in case a photoelectric device is to be employed at the foul line, a set of contacts 667 which are closed thereby are in parallel to the switch 652 and close the circuit normally closed by the switch 652 when a strike is made on the first ball thrown. In this manner the operation of the machine is changed to "new set" and a new set of pins set on the alley bed upon the making of a foul when either the first or the second ball is rolled. Should the foul occur when the first ball is thrown, upon the rolling of a second ball of the frame a procurement of a spare would cause the machine to go through a "dead wood" cycle of picking up and resetting the standing pins. Since a new set of pins is required, the rotary switch 661 may then be operated to have the machine reset the new set of pins.

It is to be understood that the motors 30 and 90 which operate the various mechanisms of the machine are energized by closing a switch 669. These motors continue to operate as long as the resetting mechanism is in use. At the end of the day or during the day when not in use, the switch 669 is open. When the machine is to be used, the switch 669 is closed and the "Manual-Automatic" switch is shifted to have the contact bars 602 and 603 thereof close the contacts to either "automatic" or "manual" position.

What is claimed is:

1. In a bowling pin handling machine to be located at the rear end of a bowling alley bed, a guard and sweep mechanism on said machine, a rack on said machine mounted for raising and lowering movement relative to the bed, means on said machine for delivering ten pins to said rack, pickup means on said rack for engaging standing pins and retaining said pins when so engaged to be raised with the rack, mechanism for operating said pickup means to pin engaged and released positions, a mechanically actuated device for operating said rack including a driven shaft, cam means on said shaft, link means operated by said cam means having a first setting for raising and lowering said rack through a "new set" cycle for setting ten pins on the alley bed and a second setting for moving the rack through a "dead wood" cycle including operation of the pickup means for raising the standing pins from the alley and delivering them back to the bed after a spare is made, means for lowering the guard and sweep mechanism to the alley bed when a first ball is thrown, means causing the cam and link means in the second setting to lower the rack to perform the "dead wood" cycle, and means actuated in response to movement of the rack below the normal position of engagement with standing pins for shifting said link means to the "new set" setting to discontinue the "dead wood" cycle including the operation of the pin pickup means and return the rack and thereafter lower the rack to set a new set of pins.

2. In a pin handling machine on an alley, a frame, a rack supported by said frame, means for raising pins from the pit in rear of the alley and delivering them to the rack, horizontally movable means carried by said rack for engaging standing pins beneath the heads and positively securing the pins in fixed position on the rack, guard and sweep means carried by the frame and movable to engagement with the alley bed and rearwardly and forwardly thereof for sweeping the alley, mechanical means for operating said rack and said guard and sweep means, said mechanical means embodying a rotatable shaft, cam means on said shaft, a first link operated by said cam means for raising and lowering a second link operated by said cam means lowering the rack between an upper position and a lower position beneath a pin engaging level and for horizontally advancing the standing pin engaging means into engagement with the standing pins, means responsive upon the engagement of the standing pins to render said first link for lowering the rack temporarily inoperative during the horizontal movement of the pin engaging means while permitting the cam means and second link to continuously operate for horizontally shifting said pin engaging means.

3. In a pin handling machine, a frame, a rack supported by said frame, means for raising pins from the pit in rear of the alley and delivering them to the rack, horizontally movable means carried by said rack for engaging standing pins beneath the head and positively securing the pins in fixed position on the rack, guard and sweep means carried by the frame and movable to engagement with the alley bed and rearwardly and forwardly thereof for sweeping the alley, mechanical means for operating said rack and said guard and sweep means, said mechanical means embodying a rotatable shaft, cam means on said shaft, link means including a pair of links operated together by said cam means one for raising and lowering the rack and the other for horizontally advancing the standing pin engaging means into engagement with the standing pins, means responsive upon the engagement of standing pins to render said link for lowering the rack inoperative while permitting the cam means and other link to continuously operate for horizontally shifting said pin engaging means, said cam means and one link raising the rack and the pins secured by the engaging means, and means actuated after the rack and pins are raised for operating the guard and sweep means for removing the pins from the alley bed, said cam means and said one link lowering the rack after the sweeping operation to reset the pins upon the alley bed, said cam means and other link releasing and horizontally returning the standing pin engaging means from engagement with the reset pins.

4. In a pin handling machine on an alley, a frame, a rack supported by said frame, means for raising pins from the pit in rear of the alley and delivering them to the rack, laterally movable means carried by said rack for engaging standing pins beneath the head and positively securing the pins in fixed position on the rack, guard and sweep means carried by the frame and movable to engagement with the alley bed and rearwardly and forwardly thereof for sweeping the alley, mechanical means for operating said rack and said guard and sweep means, said mechanical means embodying a rotatable shaft, cam means on said shaft, a pair of links operated by said cam means for raising and lowering the rack between an upper position and a lower position beneath a pin engaging level and the other for advancing the standing pin engaging means into engagement with the standing pins, means responsive upon the engagement of the standing pins to render said one link for lowering the rack temporarily inoperative during the horizontal movement of the pin engaging means while permitting the cam means and other link to continuously operate for horizontally shifting said pin engaging means, said cam means and links raising the rack and the pins secured by the engaging means, and means controlling said cam means and other link for immediately raising the rack if no pins are standing on the alley bed after the first ball is thrown without shifting said pin engaging means and for permitting said cam and said one link to set a new set of pins upon the alley bed.

5. In a pin handling mechanism having a rack for setting a new set of pins on an alley bed and for picking up standing pins when a spare is made, selectively operable pin pickup means on said rack, a guard and sweep mechanism supported by said mechanism, mechanically actuated mechanism for controlling the operation of the rack, the pin pickup means and the guard and sweep mechanism, said mechanically actuated mechanism embodying a rotatable shaft, cam means operated by said shaft, a reciprocable link actuated by said cam means, a pair of pivoted links carried by said reciprocable link to reciprocate therewith, a shaft having an arm thereon operable by one of said pivoted links through a predetermined angle sufficient to move the rack between an upper position and a lower position beneath a pin engaging level, a rack raising and lowering mechanism secured to said shaft, said one of said pivoted links having cam engagement with said arm which permits the link to be released from the arm when the rack is stopped in its descent by a standing pin and means for operating said pin pickup means including said other pivoted link subsequent to release of said one link.

6. In a pin handling mechanism having a rack, horizontally movable pickup means on said rack for picking up standing pins when a spare is made, a guard and sweep mechanism supported by said mechanism, mechanically actuated mechanism for controlling the operation of the rack and guard and sweep mechanism, said mechanically actuated mechanism embodying a rotatable shaft, cam means operated by said shaft, a reciprocable link actuated by said cam means, a pair of pivoted links carried by said reciprocable link to reciprocate therewith, a shaft having an arm thereon operable by said reciprocable link and one of said pivoted links through a predetermined angle sufficient to move the rack between an upper position and a lower position beneath a pin engaging level, rack raising and lowering mechanism secured to said shaft, a balancing mechanism connected to said shaft to counteract the weight of the rack, said one of said pivoted links having cam engagement with said arm which permits the link to be released from the arm when the rack is stopped in its descent by a standing pin, and a link connecting the pin pickup means with the other of said pivoted links if the rack is stopped by standing pins for horizontally moving the pin pickup means into a position of engagement with the standing pins.

7. In a pin handling mechanism having a rack for setting a new set of pins on an alley bed and for picking up standing pins when a spare is made, a guard and sweep mechanism supported by said mechanism, mechanically actuated mechanism for controlling the operation of the rack and guard and sweep mechanism, said mechanically actuated mechanism embodying a rotatable shaft, cam means operated by said shaft, a reciprocable link actuated by said cam means, a pair of pivoted links carried by said reciprocable link to reciprocate therewith, a shaft having an arm thereon operable by one of said pivoted links through a predetermined angle, rack raising and lowering mechanism secured to said shaft, a balancing mechanism connected to said shaft to counteract the weight of the rack, said one of the pivoted links having cam engagement with said arm which permits the link to be released from the arm when the rack is stopped in its descent by a standing pin, means for engaging said arm and initiating return thereof to its initial position upon the return movement of the reciprocable link to raise the rack, means including the other of said pivoted links operable after said one pivoted link is released for positively securing the pins to the rack to that they will be raised therewith in the position in which they were standing upon the bed, means actuated upon the raising of the rack for operating the sweep for removing the pins from the alley bed, means actuated during the sweeping operation for setting up the cam and link means for lowering the rack thereafter and releasing the pins and thereafter raising the rack and the guard and sweep mechanism, and means shifting said mechanism and changing the cycle of operation from "deadwood" to "new set" when the rack is lowered after the throwing of the first ball and no pins are standing for sweeping the alley, setting a new set of pins, and raising the guard and sweep mechanism.

8. In a bowling pin handling machine for returning pins from the pit to the setting rack, a sweep, a cyclically operable drive for the sweep, a cam and link mechanism including a shiftable link to prevent the sweep operation when shifted for raising and lowering the rack through the "dead wood" and "new set" cycles including operation of the sweep, means carried by said rack for interrupting its downward movement when engaging a pin which has moved too great a distance from "on spot" position, and means including said shiftable link engaged and shifted by the rack when interrupted which prevents the functional operation of the sweep as the cam and link mechanism completes the "dead wood" cycle and returns the rack to its initial raised position and which shifts the mechanism for a "new set" cycle without causing the sweep to sweep the alley bed or disturb the pins left standing thereon.

9. In a bowling pin handling machine, a pin delivering mechanism for advancing pins lengthwise therealong, means in said mechanism for turning the pin when necessary so as to assure delivery thereof butt first, a turret type distributor having nine pin supporting cups and a chute for a tenth pin thereon, means for advancing said distributor by increments to position the cups seriatum at the end of the delivering mechanism until all nine of the cups are filled and to then advance the chute to the end of the delivering mechanism, a movable rack for receiving pins from the distributor for placement on an alley bed, means actuated upon the delivery of a pin to the ninth cup for stopping the delivering mechanism when the rack is filled, and means actuated upon the return of the rack after setting the pins on the alley bed for advancing the distributor and starting the operation of the delivering mechanism so that a tenth pin may be delivered to the distributor.

10. In a bowling pin handling machine on an alley and having means for returning a ball and for raising the pins which have entered the pit at the end of the alley bed, rack means, means for delivering the raised pins to the rack means, means for raising and lowering the rack for setting the pins on the alley bed during a "new set" cycle of operation, means on said rack for engaging standing pins which are raised with the rack from the alley bed and returned thereto after the alley bed is swept, means for sweeping the alley bed, a mechanical mechanism for operating said rack, pin engaging means and sweep means, said mechanism comprising cam means and link means which produce the functional operation of the rack and sweep means during the "new set" cycle and a "deadwood" cycle of operation, and an operating-control link for operating the pin engaging means and controlling the performance of the "deadwood" cycle, an electrical system for setting up the mechanical mechanism for either the "deadwood" or "new set" cycles, means responsive to the rack descending to a position beneath the normal position for engaging standing pins to shift said operating-control link to discontinue the "deadwood" cycle functions including the operation of the pin engaging means and means in the electrical system responsive to the rack descent below said normal position to set up the mechanical mechanism for a "new set" cycle.

11. In a bowling pin handling machine, a sweep, a rack having means for interrupting its downward movement when engaging a pin which has moved too great a distance from "on spot" position, means for raising and lowering the rack, means including a selectively engageable clutch for moving the sweep through its cycle of operation, means for engaging said clutch after the rack is lowered and raised, a control link, cam means for moving said link, means movable with the rack and positionable by said rack when its movement is interrupted to engage and shift said control link to a position for rendering said clutch engaging means inoperative.

References Cited in the file of this patent

UNITED STATES PATENTS

| | | |
|---|---|---|
| 1,573,643 | Proch | Feb. 16, 1926 |
| 2,015,428 | Hedenskoog | Sept. 24, 1935 |
| 2,341,476 | Para et al. | Feb. 8, 1944 |
| 2,514,457 | Schmidt | July 11, 1950 |
| 2,525,766 | Broekhuysen | Oct. 17, 1950 |
| 2,530,385 | Frye | Nov. 21, 1950 |
| 2,531,429 | Hedenskoog | Nov. 28, 1950 |
| 2,550,835 | MacFarland | May 1, 1951 |
| 2,595,988 | Simpson | May 6, 1952 |
| 2,620,187 | Whipple et al. | Dec. 2, 1952 |
| 2,622,879 | Frye | Dec. 23, 1952 |
| 2,628,098 | Bauerschmidt | Feb. 10, 1953 |
| 2,657,929 | Auchincloss et al. | Nov. 3, 1953 |
| 2,688,486 | Hedenskoog | Sept. 7, 1954 |
| 2,697,605 | Montooth et al. | Dec. 21, 1954 |
| 2,736,554 | Fluke et al. | Feb. 28, 1956 |